(12) United States Patent
Fuchie et al.

(10) Patent No.: US 8,295,347 B2
(45) Date of Patent: Oct. 23, 2012

(54) INFORMATION PROCESSING APPARATUS AND INFORMATION PROCESSING METHOD, RECORDING MEDIUM, AND PROGRAM

(75) Inventors: Takaaki Fuchie, Kanagawa (JP); Kyohei Koyabu, Kanagawa (JP); Hiromi Yoshinari, Kanagawa (JP)

(73) Assignee: Sony Corporation, Tokyo (JP)

( * ) Notice: Subject to any disclaimer, the term of this patent is extended or adjusted under 35 U.S.C. 154(b) by 1645 days.

(21) Appl. No.: 11/660,871

(22) PCT Filed: Aug. 22, 2005

(86) PCT No.: PCT/JP2005/015204
§ 371 (c)(1),
(2), (4) Date: Feb. 22, 2007

(87) PCT Pub. No.: WO2006/022221
PCT Pub. Date: Mar. 2, 2006

(65) Prior Publication Data
US 2008/0019444 A1    Jan. 24, 2008

(30) Foreign Application Priority Data

Aug. 25, 2004 (JP) ................. 2004-245374
Aug. 25, 2004 (JP) ................. 2004-245378

(51) Int. Cl.
*H04N 7/12* (2006.01)
(52) U.S. Cl. ............... 375/240.07; 375/240.25
(58) Field of Classification Search .......... 375/240, 375/240.07, 240.25
See application file for complete search history.

(56) References Cited

U.S. PATENT DOCUMENTS

| 6,137,834 | A  | * | 10/2000 | Wine et al. ............. 375/240 |
| 6,301,428 | B1 | * | 10/2001 | Linzer ................... 386/278 |
| 6,330,392 | B1 | * | 12/2001 | Nakatani et al. ........ 386/288 |
| 6,347,117 | B1 |   | 2/2002  | Kato et al. |
| 6,414,998 | B1 |   | 7/2002  | Yoshinari et al. |
| 6,414,999 | B1 |   | 7/2002  | Igi et al. |
| 6,529,550 | B2 |   | 3/2003  | Tahara et al. |
| 6,567,471 | B1 |   | 5/2003  | Yoshinari |

(Continued)

FOREIGN PATENT DOCUMENTS

CN    1236522    11/1999

(Continued)

OTHER PUBLICATIONS

Brightwell et al: "Flexible Switching and Editing of MPEG-2 Video Bitstreams", International Broadcasting Convention, London, GB, Sep. 12, 1997, pp. 547-552, XP002098561.

(Continued)

*Primary Examiner* — Techane Gergiso
(74) *Attorney, Agent, or Firm* — Frommer Lawrence & Haug LLP; William S. Frommer; Paul A. Levy

(57) ABSTRACT

An information processing apparatus and method for splicing first compressed image data with second compressed image data. The method includes performing a decoding process for a first decoding interval that includes a first editing point set to the first compressed image data to produce a first non-compressed image signal. A second decoding process includes a second editing point set to the second compressed image data to produce a second non-compressed image signal. A re-encoding process re-encodes an interval of a third non-compressed image signal and the first and second non-compressed image signals are spliced at the first and second editing points to produce third compressed image data.

24 Claims, 39 Drawing Sheets

U.S. PATENT DOCUMENTS

| | | | |
|---|---|---|---|
| 6,580,755 B1* | 6/2003 | Morimoto et al. | 375/240.02 |
| 6,587,506 B1* | 7/2003 | Noridomi et al. | 375/240.12 |
| 6,792,047 B1* | 9/2004 | Bixby et al. | 375/240.26 |
| 6,831,949 B1* | 12/2004 | Brightwell et al. | 375/240.12 |
| 6,983,015 B1* | 1/2006 | Saunders et al. | 375/240.1 |
| 7,027,516 B2* | 4/2006 | Anderson et al. | 375/240.26 |
| 2001/0026677 A1* | 10/2001 | Chen et al. | 386/68 |
| 2002/0061184 A1* | 5/2002 | Miyamoto | 386/68 |
| 2002/0133486 A1* | 9/2002 | Yanagihara et al. | 707/3 |
| 2005/0259946 A1* | 11/2005 | Kitamura | 386/46 |

FOREIGN PATENT DOCUMENTS

| | | |
|---|---|---|
| CN | 1237066 | 12/1999 |
| EP | 0 923 243 | 6/1999 |
| EP | 0 935 395 | 8/1999 |
| EP | 1 045 589 | 10/2000 |
| EP | 1 058 262 | 12/2000 |
| EP | 1 079 631 | 2/2001 |
| GB | 2 353 653 | 2/2001 |
| JP | 10 66085 | 3/1998 |
| JP | 10 98713 | 4/1998 |
| JP | 10 112840 | 4/1998 |
| JP | 11 74799 | 3/1999 |
| JP | 11 289541 | 10/1999 |
| JP | 11 341435 | 12/1999 |
| JP | 2001 54110 | 2/2001 |
| JP | 2001 119305 | 4/2001 |
| JP | 2003 52040 | 2/2003 |
| JP | 3617177 | 11/2004 |
| JP | 3709721 | 8/2005 |
| JP | 3736808 | 11/2005 |
| KR | 1999 072461 | 9/1999 |
| KR | 2000 068626 | 11/2000 |
| TW | 411712 | 11/2000 |
| WO | WO 97 39588 | 10/1997 |
| WO | WO 99 05864 | 2/1999 |

OTHER PUBLICATIONS

Meng J et al: "Buffer Control Techniques for Compressed-Domain Video Editing", 1996 IEEE International Symposium on Circuits and Systems (ISCAS). Circuits and Systems Connecting the World. Atlanta, May 12-15, 1996; [IEEE International Symposium on Circuits and Systems (ISCAS)], New York, IEEE, US, May 12, 1996, pp. 600-603, XP000948201.

Wee S J et al. "Splicing MPEG Video Streams in the Compressed Domain", IEEE Workshop on Multimedia Signal Processing. Proceedings of Signal Processing Society Workshop on Multimedia Signal Processing, XX, XX, Jun. 23, 1997, pp. 225-230, XP000957700.

Weiss S M: "Switching Facilities in MPEG-2: Necessary but Not Sufficient", SMPTE—Motion Imaging Journal, Society of Motion Picture and Television Engineers, White Plains, NY US, vol. 104, No. 12, Dec. 1, 1995, pp. 788-802, XP000543847.

Hurst N et al: "MPEG Splicing: A New Standard for Television—SMPTE 312M", SMPTE—Motion Imaging Journal, Society of Motion Picture and Television Engineers, White Plains, NY, US, vol. 107, No. 11, Nov. 1, 1998, pp. 978-988, XP000804761.

* cited by examiner

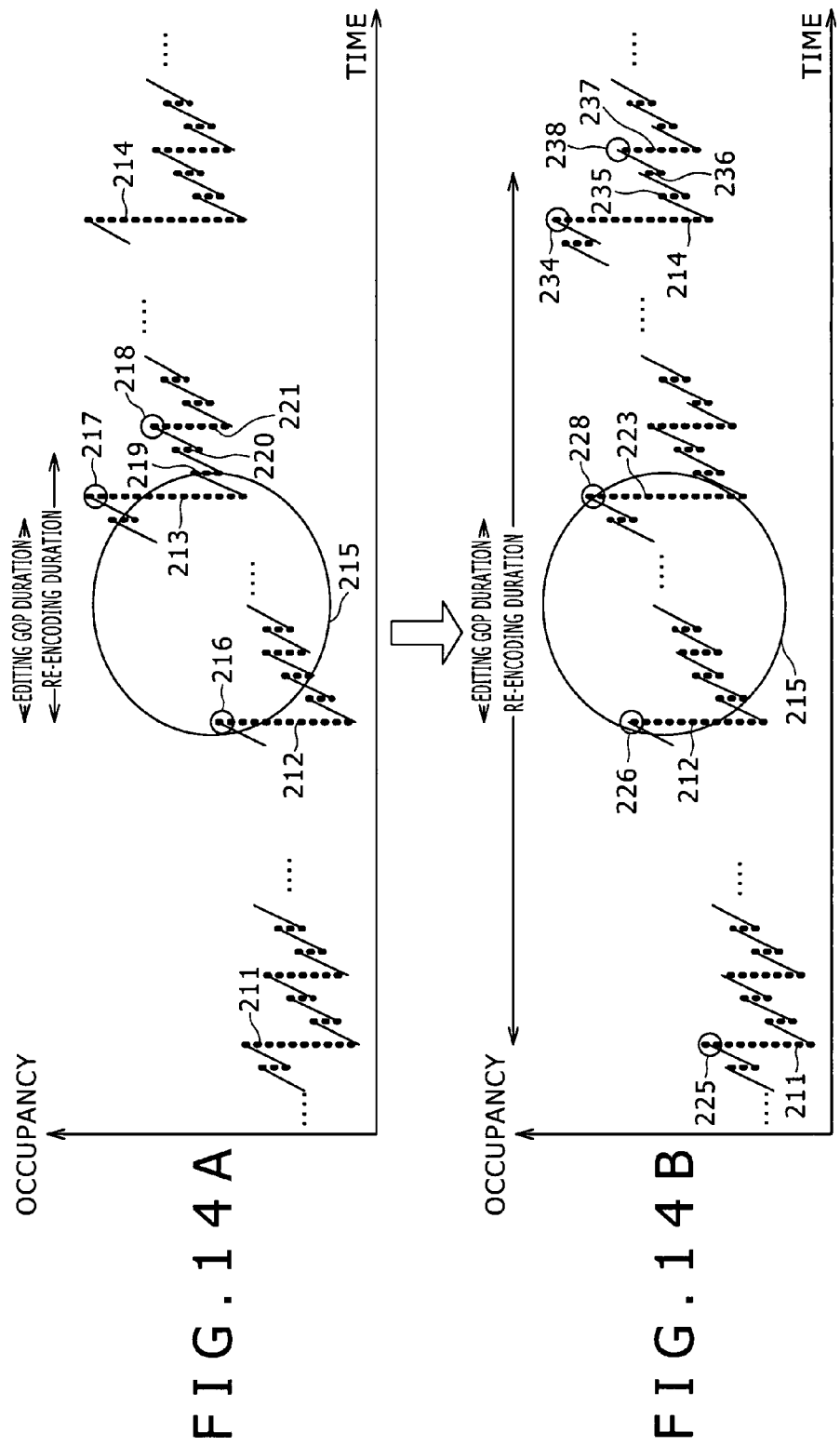

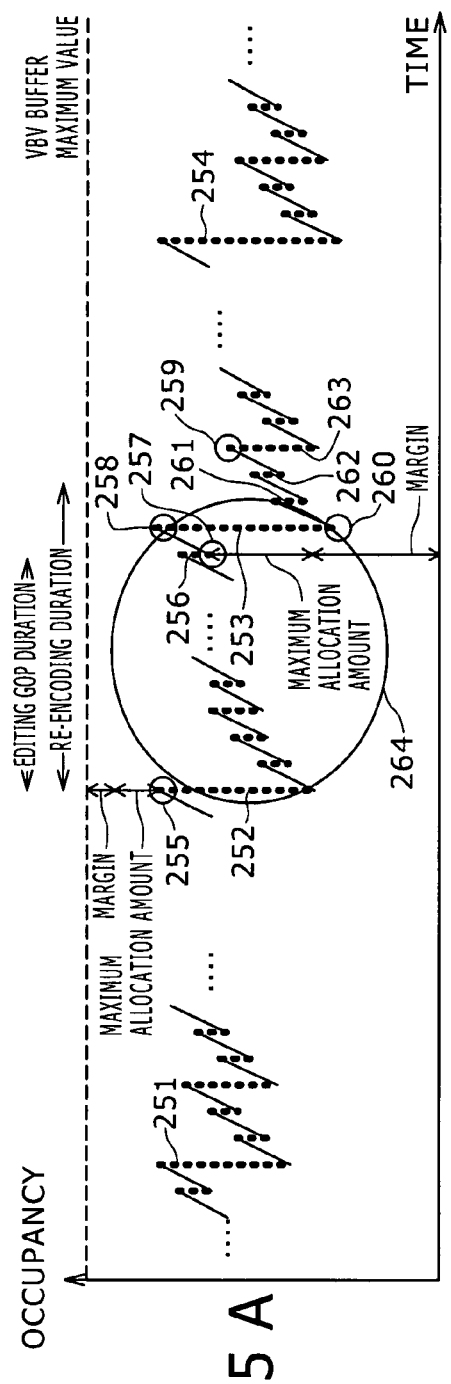
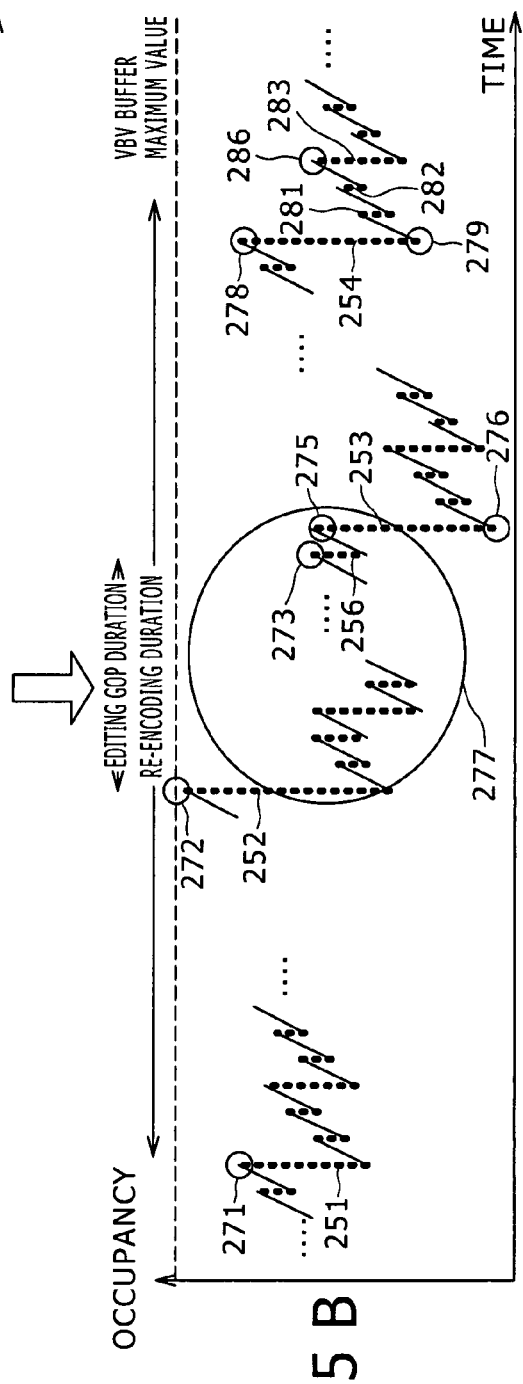
FIG. 15A
FIG. 15B

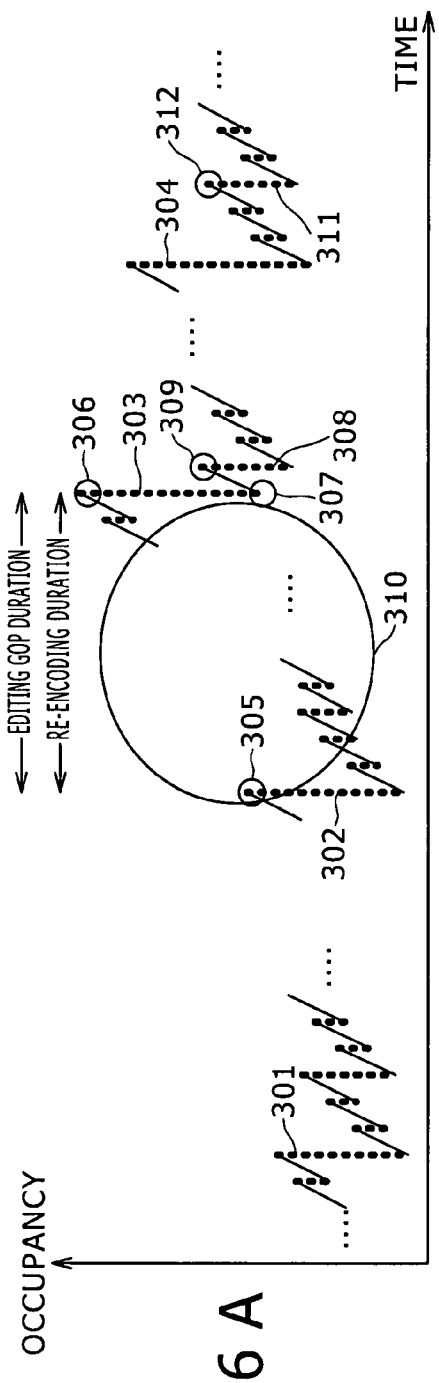
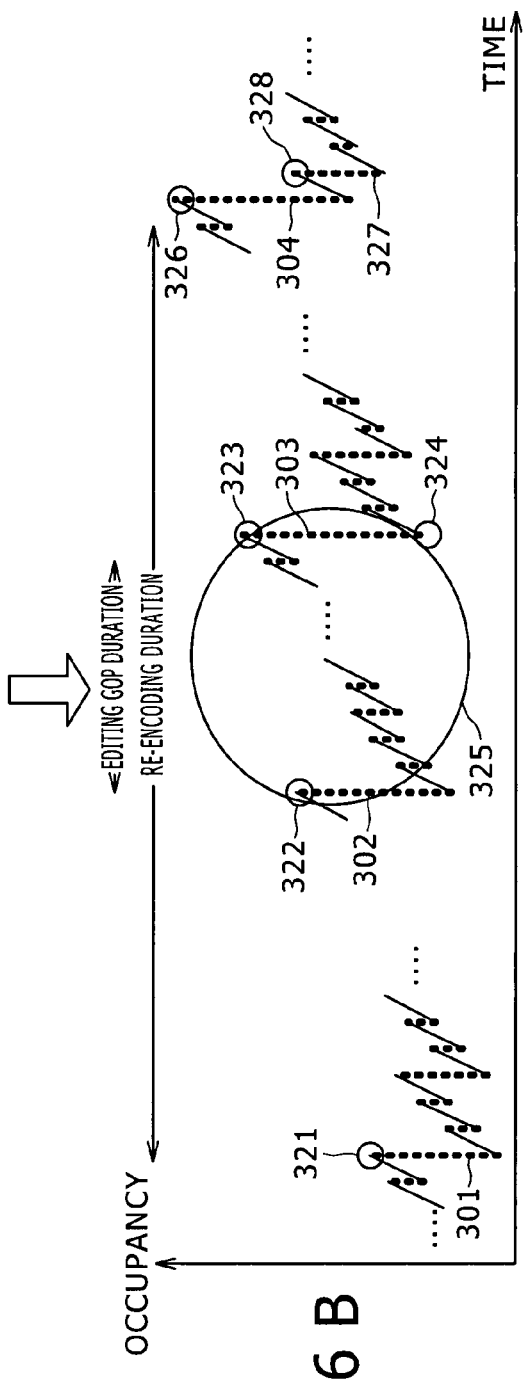
FIG. 16A
FIG. 16B

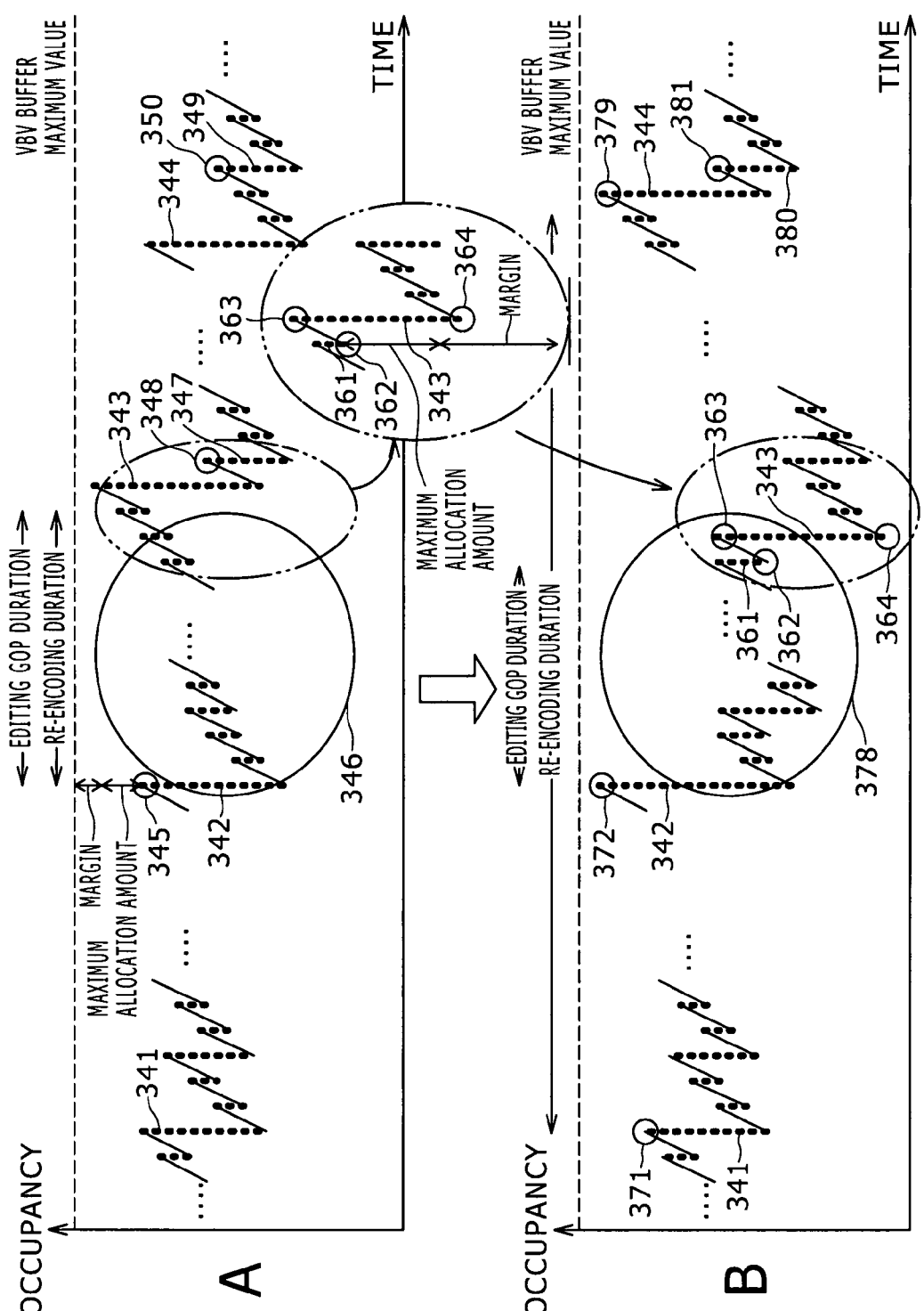

FIG.26

| Syntax | Bits | Mnemonic |
|---|---|---|
| User_data(){ | | |
| Data_ID | 8 | b |
| BVdata() | | |
| while(nextbits()!='00000001') { | | |
| User_data | 8 | imsb |
| } | | |
| } | | |

FIG.27

| Syntax | Bits | Mnemonic |
|---|---|---|
| BVdata(){ | | |
| Data_ID | 8 | b |
| BVBuffer Occupancy | 8 | imsb |
| } | | |

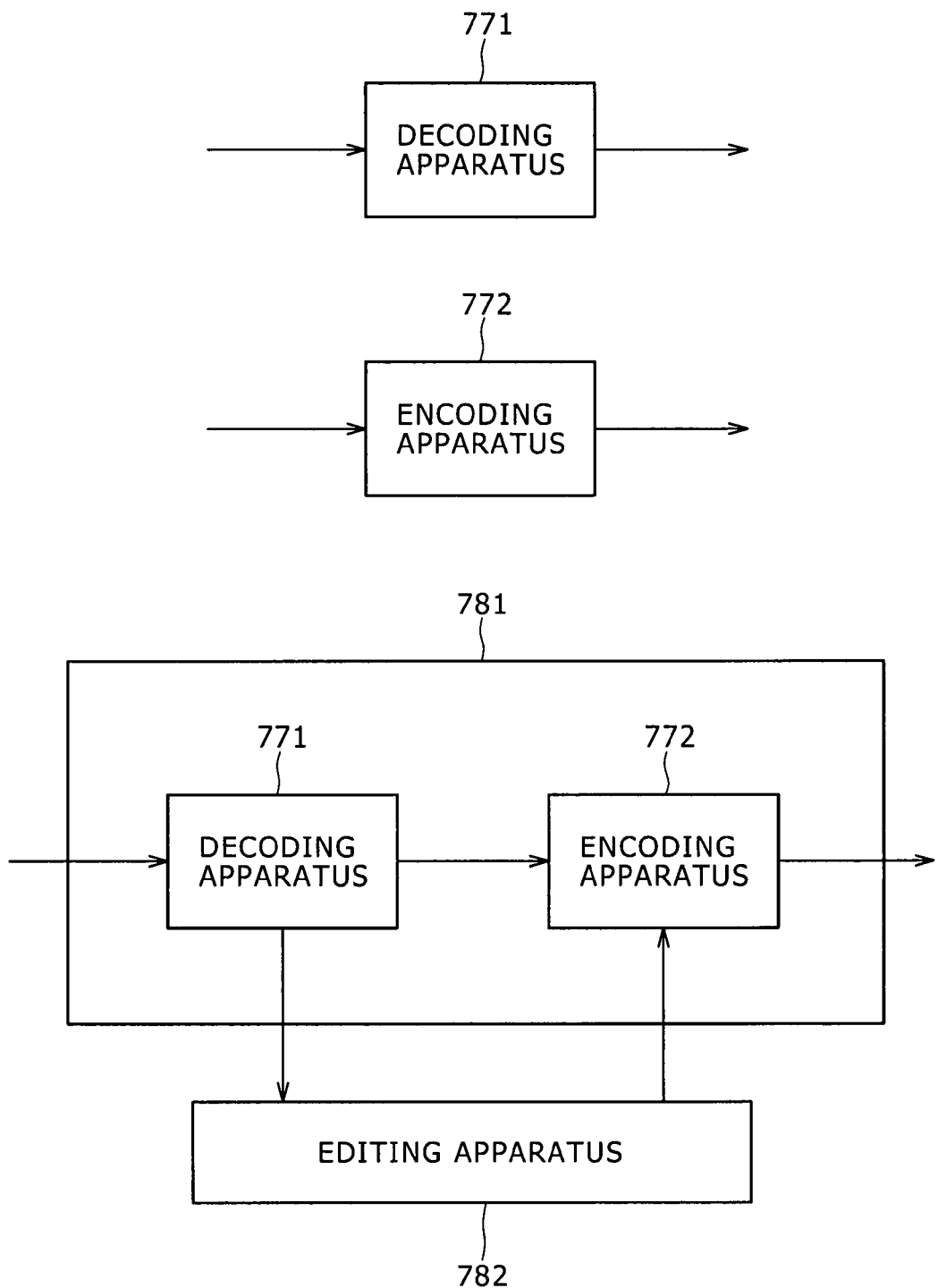

INFORMATION PROCESSING APPARATUS AND INFORMATION PROCESSING METHOD, RECORDING MEDIUM, AND PROGRAM

TECHNICAL FIELD

This invention relates to an information processing apparatus and an information processing method, a recording medium, and a program, and more particularly to an information processing apparatus and an information processing method, a recording medium, and a program suitable for use where video data compressed bidirectional interframe prediction are edited.

BACKGROUND ART

Image compression methods represented by an MPEG (Moving Picture Coding Experts Group/Moving Picture Experts Group) method achieve a high compression efficiency by compression encoding an image signal using interframe prediction. However, where it is intended to edit images, since compressed image materials formed using interframe prediction cannot be spliced together while they remain in the form of a compressed image signal because they have a relationship of compressed signals by prediction between frames. Therefore, a system which is configured taking it into consideration in advance to edit image materials usually performs encoding using only compression within a frame without using interframe prediction.

However, where an image signal of a high definition having a large information amount is handled like, for example, a high definition (HD) signal, if only interframe compression is used for encoding, then only a low compression efficiency is obtained. Therefore, in order to transmit or store a large amount of data, an expensive system is required in that a high transfer speed is required, a large storage capacity is required or a high processing speed is required. In other words, in order to allow an image signal of a high definition having a large amount of information to be handled by a less expensive system, it is necessary to use interframe prediction to assure high compression efficiency.

In the MPEG system, a compression coding system which uses bidirectional interframe prediction and involves I pictures, P pictures and B pictures is called compression of the Long GOP (Group of Pictures) system.

An I picture is an interframe coded picture coded independently of any other picture, and an image can be decoded from information only of an I picture. A P picture is an interframe forward predictive coded picture represented by a difference from a preceding frame (in the forward direction) with respect to time. A B picture is a bidirectional predictive coded picture coded by motion compensation interframe prediction making use of preceding (in the forward direction), succeeding (in the reverse direction) or preceding and succeeding (in the opposite directions (bidirectional)) pictures with respect to time.

Since the P picture and the B picture have a smaller data amount than the I picture, if the GOP is made longer (that is, if the number of pictures which form a Long GOP is increased), then the compression ratio of the image can be raised. Therefore, the P picture and the B picture are suitable for utilization in digital broadcasting applications and DVD (Digital Versatile Disk) video applications. However, if the GOP is excessively long, then the editing control in the frame accuracy becomes difficult, and a problem in operation takes place in editing in business applications.

A process of splicing two image data compressed by the Long GOP method each other at predetermined editing points is described with reference to FIG. 1.

First, for each of editing object compressed image data 1 and editing object compressed image data 2, partial decoding of a portion in the proximity of an editing point is performed. Consequently, partial non-compressed image signal 1 and image signal 2 are obtained. Then, the non-compressed image signal 1 and image signal 2 are spliced each other at the editing points, and an effect is applied to the portion in the proximity of the editing point as occasion demands and then re-encoding is performed. Then, the re-encoded compressed image data is spliced with the compressed image data which have not undergone the decoding and re-encoding processes (compressed image data other than the portion for which the partial decoding is performed).

The method described above with reference to FIG. 1 is advantageous in that deterioration of the picture quality by re-encoding can be suppressed locally and the editing processing time can be reduced significantly when compared with those of an alternative method wherein all image data of compressed editing materials are decoded and then the image signals are connected to each other at the editing points, whereafter all of the image signals are re-encoded to obtain edited compressed video data.

However, if such a method as described above with reference to FIG. 1 is used to perform editing and re-encoding, then this gives rise to a problem that a picture cannot be referred to at a joint between a portion for which re-encoding is performed and another portion for which no re-encoding is performed.

The following method is known as a countermeasure for the problem described. In particular, where compression is performed using a method (Long GOP) which involves predictive encoding between frames, in order to implement editing comparatively and simply, the interframe prediction is limited so as to adopt a Closed GOP structure such that a picture is referred to only within a GOP but is not referred to across GOPs.

A case wherein limitation to interframe prediction is applied is described with reference to FIG. 2. FIG. 2 illustrates a list of pictures in a display order in regard to data of the compressed material image 1 and data of the compressed material image 2 of an object of editing, data of partially re-encoded data of compressed pictures in the proximity of the editing points after the editing and data of compressed images of a portion for which re-encoding is not performed in order to indicate a relationship between interframe prediction and editing. An arrow mark in FIG. 2 indicates a referencing direction of a picture (this similarly applies also to the other figures). In FIG. 2, 15 pictures of BBIBBPBBPBBPBBP of the display order form one GOP, and referencing to a picture is performed only within the GOP. This method inhibits prediction across GOPs thereby to eliminate the relationship of compressed data by prediction between GOPs thereby to allow re-splicing of compressed data in a unit of a GOP (determination of a range within which re-encoding is to be performed).

In particular, the range for re-encoding is determined in a unit of one GOP including an editing point for data of the compressed material image 1 and data of the compressed material image 2 which are an object of editing, and the data of the compressed material image 1 and the data of the compressed material image 2 which are an object of editing within the re-encoding ranges determined in a unit of one GOP are decoded to produce signals of the non-compressed material image 1 and the non-compressed material image 2. Then, the signal of the non-compressed material image 1 and the signal of the non-compressed material image 2 are spliced each other at the cut editing point, and the material image 1 and the material image 2 spliced together in this manner are partly re-encoded to produce compressed image data. Then, the compressed image data are spliced with the compressed video data of the portions which have not been re-encoded thereby to produce compressed edited image data.

Actually encoded data are arrayed in a coding order as illustrated in FIG. 3, and splicing of compressed image data is performed in the coding order. Referring to FIG. 3, the compressed image data produced by partially re-encoding the material image 1 and the material image 2 spliced together and the compressed image data which have not been re-encoded are spliced at a B13 picture which is the last picture in the coding order in the data of the compressed material image 1 in the portion which has not been re-encoded and is the fourteenth picture in the display order and an I2 picture which is the first picture in the coding order in the compressed image data produced by the re-encoding and is the third picture in the display order. Further, a B12 picture which is the last picture in the coding order in the compressed image data produced by the re-encoding and is the thirteenth picture in the display order and the I2 picture which is the first picture in the coding order in the data of the compressed material image 2 in the portion which has not been re-encoded and is the third picture in the display order are spliced each other. In other words, the compressed image data produced by re-encoding of the material image 1 and the material image 2 spliced together and the compressed image data in the portion which has not been re-encoded are connected at GOP changeover portions to produce compressed edited image data.

On the other hand, a GOP structure which does not have the Closed GOP structure, that is, a Long GOP structure where an image is referred to across GOPS, is called Open GOP.

Also a technique for splicing two bit streams of the Open GOP structure while preventing otherwise possible deterioration of the picture quality at splicing portions when bit streams of MPEG encoded pictures having the Open GOP structure are spliced together is available. When two bit streams of the Open GOP structure are edited, or more particularly when a bit stream Y is inserted into another bit stream X, a B picture preceding to an I picture which forms the first GOP of the bit stream Y (a B structure which appears before an I picture is displayed) is deleted and the temporal references of the remaining pictures which form the GOP are changed so that the B picture prior to the I picture which is predicted using a picture which forms the last GOP of the bit stream X may not be displayed to prevent such deterioration of the picture quality (referred to, for example, Patent Document 1).

[Patent Document 1]
Japanese Patent Laid-Open No. Hei 10-66085
Disclosure of the Invention
Problems to be Solved by the Invention However, according to the editing method wherein the Closed GOP structure wherein prediction across GOPs is inhibited as described hereinabove with reference to FIGS. 2 and 3 is utilized, limitation is applied to the prediction direction at a starting portion and an ending portion of a GOP.

On the other hand, the technique disclosed in Patent Document 1 has a problem in that, since a B picture at a splicing portion is not displayed, the picture misses as much.

Further where editing of a compressed image signal compressed in accordance with the Open GOP system by which a high compression efficiency is obtained and produced using bidirectional interframe prediction is to be performed, a buffer must be prevented from breaking down by observing a restriction to the VBV buffer. However, the picture quality must not be deteriorated as a result of observation of a restriction to the VBV buffer.

The present invention has been made in view of such circumstances as described above and makes it possible to prevent deterioration of the picture quality by executing editing of compressed image signals compressed in accordance with the Open GOP system of a Long GOP, by which a high compression efficiency is obtained, and formed using bidirectional interframe prediction by allocating an optimum generation code amount while observing restrictions to a VBV buffer.

[Means for Solving the Problems]

According to a first aspect of the present invention, there is provided an information processing apparatus for executing a process of splicing first compressed image data with second compressed image data, including decoding means for performing a decoding process for a first decoding interval including a first editing point set to the first compressed image data to produce a first non-compressed image signal and performing a decoding process for a second decoding interval including a second editing point set to the second compressed image data to produce a second non-compressed image signal, re-encoding means for performing a re-encoding process for a predetermined re-encoding interval of a third non-compressed image signal wherein the first and second non-compressed image signals are spliced at the first and second editing points to produce third compressed image data, control means for setting the re-encoding interval extended from a basic encoding interval based on a generation code amount upon the re-encoding process by the re-encoding means to control the re-encoding process by the re-encoding means, and editing means for alternatively outputting compressed image data in an interval for which the re-encoding process is not performed from within the first and second compressed image data and the third compressed image data produced by the re-encoding by the re-encoding means to produce edited editing compressed image data.

The control means may control allocation of a generation code amount in the re-encoding process in the re-encoding interval by the re-encoding means, and set, where a generation code amount to be allocated to the basic encoding interval from within the re-encoding interval is smaller than a predetermined amount, the re-encoding interval extended from the basic encoding interval to control the re-encoding process by the re-encoding means.

The control means may control the allocation of the generation code amount in the re-encoding process in the re-encoding interval by the re-encoding means so that the generation code amount to be allocated to the basic encoding interval becomes greater than the predetermined amount.

The control means may control the allocation of the generation code amount in the re-encoding interval based on a difference value in occupancy between a start point and an end point of the re-encoding interval so that the code amount to be allocated to the reference encoding range may be increased.

The control means may control the allocation of the generation code amount in the re-encoding interval based on a value which increases in proportion to the number of pictures in the reference encoding interval but increases substantially in inverse proportion to the number of pictures in the re-encoding interval so that the code amount to be allocated to the reference encoding range may be increased.

The control means may control the allocation of the generation code amount in the re-encoding interval so that the generation code amount to be allocated to any interval other than the reference encoding interval from within the re-encoding interval may be decreased.

Where an effect is to be performed for the reference encoding range, the control means may set the re-encoding interval extended from the basic encoding range in response to a type of the effect to be performed for the reference encoding interval to control the re-encoding process by the re-encoding means.

The control means may set the re-encoding interval extended from the basic encoding interval based on a rate of rise of a degree of difficulty in encoding of the reference encoding range to control the re-encoding process by the re-encoding means.

Where an effect is to be performed for the reference encoding range, the control means may control the allocation of the generation code amount in the re-encoding process in the re-encoding interval by the re-encoding means in response to a type of the effect to be performed for the reference encoding range so that the generation code amount in the reference encoding range may be increased.

The control means may control the allocation of the generation code amount in the re-encoding process of the re-encoding interval by the re-encoding means based on a rate of rise of a degree of difficulty in encoding of the reference encoding range so that the generation code amount in the reference encoding range may be increased.

The control means may acquire information regarding the occupancy of the first and second compressed image data and control the allocation of the generation code amount in the re-encoding process in the re-encoding interval by the re-encoding means based on the information regarding the occupancy.

The information regarding the occupancy may be information regarding the occupancy of pictures corresponding to top and end positions of the re-encoding interval.

The information regarding the occupancy may be multiplexed in a user data region of the first and second compressed image data, and the control means may acquire the information regarding the occupancy multiplexed in the user data region of the first and second compressed image data.

The control means may acquire information with which an apparatus which has encoded pictures corresponding to top and end positions of the re-encoding interval from within the first and second compressed image data in the past can be specified, and detect a position at which the information regarding the occupancy is described using the acquired information with which the apparatus can be specified.

The control means may acquire information indicative of a picture type of pictures corresponding to top and end positions of the re-encoding interval from within the first and second compressed image data, and detect a position at which the information regarding the occupancy is described using the acquired information indicative of the picture type.

The control means may decide whether or not the first and second compressed image data are format converted and acquire, where it is decided that the first and second compressed image data are format converted, information indicative of a picture type of pictures corresponding to top and end positions of the re-encoding interval and then detect a position at which the information regarding the occupancy is described using the acquired information indicative of the picture types.

The information regarding the occupancy may be recorded in an associated relationship with the first and second compressed image data on a predetermined recording medium, and the control means may acquire the information regarding the occupancy from the recording medium.

The information processing apparatus may further include acquisition means for acquiring a code amount of the first compressed image data in the proximity of a start point of the re-encoding range and the second compressed image data in the proximity of an end point of the first range, analysis means for analyzing, based on the code amounts acquired by the acquisition means, a first locus of a virtual buffer occupation amount where it is assumed that an occupation amount of a virtual buffer at the start point reaches a lower limit value when the re-encoding process is performed for the first compressed image data in the proximity of the start point and analyzing a second locus of the virtual buffer occupation amount where it is assumed that the occupation amount of the virtual buffer at a picture next to the end point reaches an upper limit value when the re-encoding process is performed for the second compressed image data in the proximity of the end point, and determination means for determining, based on the first and second loci analyzed by the analysis means, the upper limit value to the occupation amount of the virtual buffer at the start point and the lower limit value to the occupation amount of the virtual buffer at the end point when the first range is re-encoded.

The determination means may determine an occupation amount of the virtual buffer at the start point in a third locus obtained by correcting the first locus in a direction in which the occupation amount of the virtual buffer increases by a code amount of a maximum underflow in a region which is not included in the re-encoding range from within the first locus as an upper limit value to the occupation amount of the virtual buffer at the start point when the re-encoding process is performed for the re-encoding range.

The determination means may determine an occupation amount of the virtual buffer at the end point in a third locus obtained by correcting the second locus in a direction in which the occupation amount of the virtual buffer decreases by a code amount determined from a period of time in which the occupation amount of the virtual buffer reaches a maximum value in a region which is not included in the re-encoding range from within the second locus and an integrated value of maximum bit rates as a lower limit value to the occupation amount of the virtual buffer at the end point when the re-encoding process is performed for the re-encoding range.

An information processing method and a program according to the first aspect of the present invention include a re-encoding interval setting step of setting a re-encoding interval extended from a basic encoding interval based on a generation code amount upon a re-encoding process, a decoding step of performing a decoding process for a first decoding interval including a first editing point set to the first compressed image data to produce a first non-compressed image signal and performing a decoding process for a second decoding interval including a second editing point set to the second compressed image data to produce a second non-compressed image signal, a re-encoding step of performing a re-encoding process for the re-encoding interval set by the process at the re-encoding interval setting step in a third non-compressed image signal wherein the first and second non-compressed image signals are spliced at the first and second editing points to produce a third compressed image data, and an editing step of alternatively outputting compressed image data in an interval for which the re-encoding process is not performed from within the first and second compressed image data and the third compressed image data produced by the re-encoding process through the process at the re-encoding step to produce edited editing compressed image data.

In the first aspect of the present invention, a re-encoding interval extended from a basic encoding interval is set based on a generation code amount upon a re-encoding process, and a decoding process for a first decoding interval including a first editing point set to the first compressed image data is performed to produce a first non-compressed image signal. Further, a decoding process for a second decoding interval including a second editing point set to the second compressed image data is performed to produce a second non-compressed image signal. Then, a re-encoding process is performed for the re-encoding interval set in a third non-compressed image signal wherein the first and second non-compressed image signals are spliced at the first and second editing points to produce a third compressed image data. Then, compressed image data in an interval for which the re-encoding process is not performed from within the first and second compressed image data and the third compressed image data produced by the re-encoding process are alternatively outputted to produce edited editing compressed image data.

According to a second aspect of the present invention, there is provided an information processing apparatus for executing a process of splicing and re-encoding first compressed image data with second compressed image data, including decoding means for performing a decoding process for a first decoding interval including a first editing point set to the first compressed image data to produce a first non-compressed image signal and performing a decoding process for a second decoding interval including a second editing point set to the second compressed image data to produce a second non-compressed image signal, re-encoding means for performing a re-encoding process for a predetermined re-encoding interval of a third non-compressed image signal wherein the first and second non-compressed image signals are spliced at the first and second editing points to produce third compressed image data, and control means for setting the re-encoding interval extended from a basic encoding interval based on a generation code amount upon the re-encoding process by the re-encoding means to control the re-encoding process by the re-encoding means.

An information processing method and a program according to the second aspect of the present invention include a re-encoding interval setting step of setting a re-encoding interval extended from a basic encoding interval based on a generation code amount upon the re-encoding process, a decoding step of performing a decoding process for a first decoding interval including a first editing point set to the first compressed image data to produce a first non-compressed image signal and performing a decoding process for a second decoding interval including a second editing point set to the second compressed image data to produce a second non-compressed image signal, and a re-encoding step of performing the re-encoding process for the re-encoding interval set by the process at the re-encoding interval setting step in a third non-compressed image signal wherein the first and second non-compressed image signals are spliced at the first and second editing points to produce a third compressed image data.

In the second aspect of the present invention, a re-encoding interval extended from a basic encoding interval is set based on a generation code amount upon the re-encoding process, and a decoding process is performed for a first decoding interval including a first editing point set to the first compressed image data to produce a first non-compressed image signal. Further, a decoding process is performed for a second decoding interval including a second editing point set to the second compressed image data to produce a second non-compressed image signal. Then, the re-encoding process is performed for the re-encoding interval set by the process at the re-encoding interval setting step in a third non-compressed image signal wherein the first and second non-compressed image signals are spliced at the first and second editing points to produce a third compressed image data.

[Effects of the Invention]

According to the first aspect of the present invention, compression encoded data can be edited, and particularly since the range for re-encoding can be extended based on a generation code amount provided to the reference encoding range, deterioration of the image in the proximity of the editing point can be prevented without allowing the buffer to fail.

According to the second aspect of the present invention, compression coded data can be spliced and re-encoded, and particularly since the range for re-encoding can be extended based on a generation code amount provided to the reference encoding range, deterioration of the image in the proximity of the editing point can be prevented without allowing the buffer to fail.

BRIEF DESCRIPTION OF THE DRAWINGS

FIGS. 14A and 14B are views illustrating a code allocation amount when a re-encoding range is extended.

FIGS. 15A and 15B are views illustrating a maximum value of a code allocation amount.

FIGS. 16A and 16B are views illustrating a code allocation amount when the re-encoding range is extended.

FIGS. 17A and 17B are views illustrating a maximum value of a code allocation amount.

FIG. 26 is a view illustrating a syntax for describing the occupancy.

FIG. 27 is a view illustrating arrays of pictures in a display order in the partial re-encoding and editing process in FIG. 5.

FIG. 40 is a block diagram showing a configuration of different apparatus to which the present invention can be applied.

Figure 1:
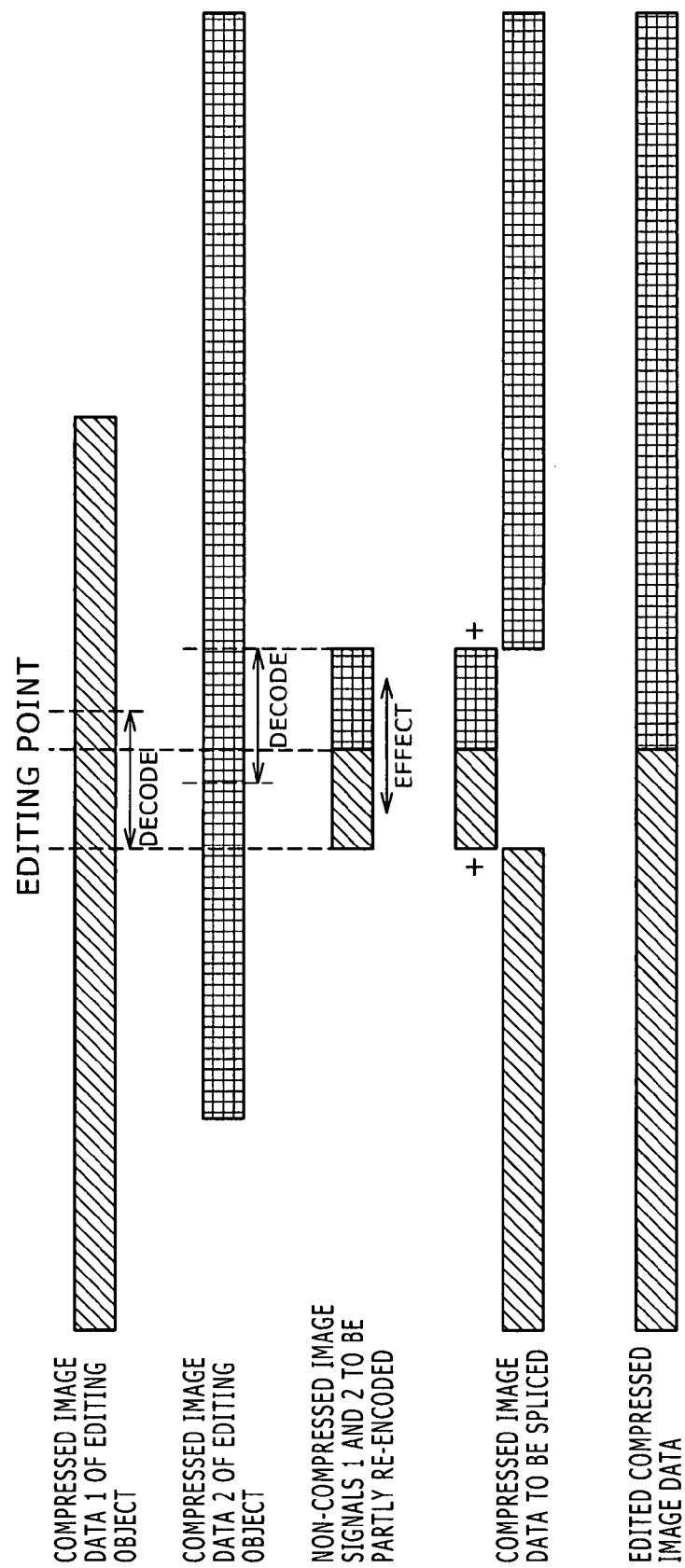
FIG. 1 is a diagrammatic view illustrating editing and partial re-encoding.
Figure 2:
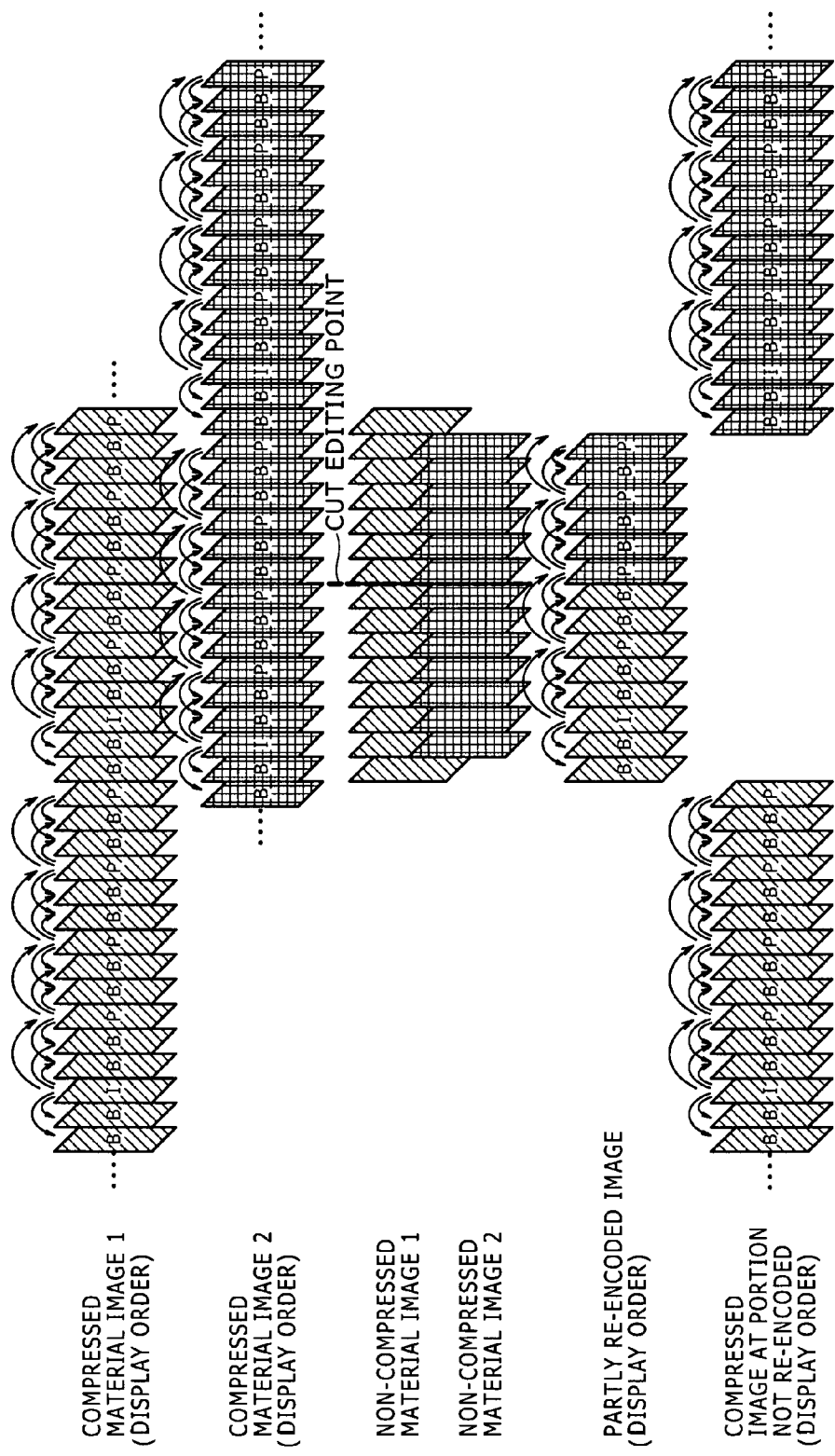
FIG. 2 is a view illustrating editing and partial re-encoding where the Closed GOP structure is used.
Figure 3:
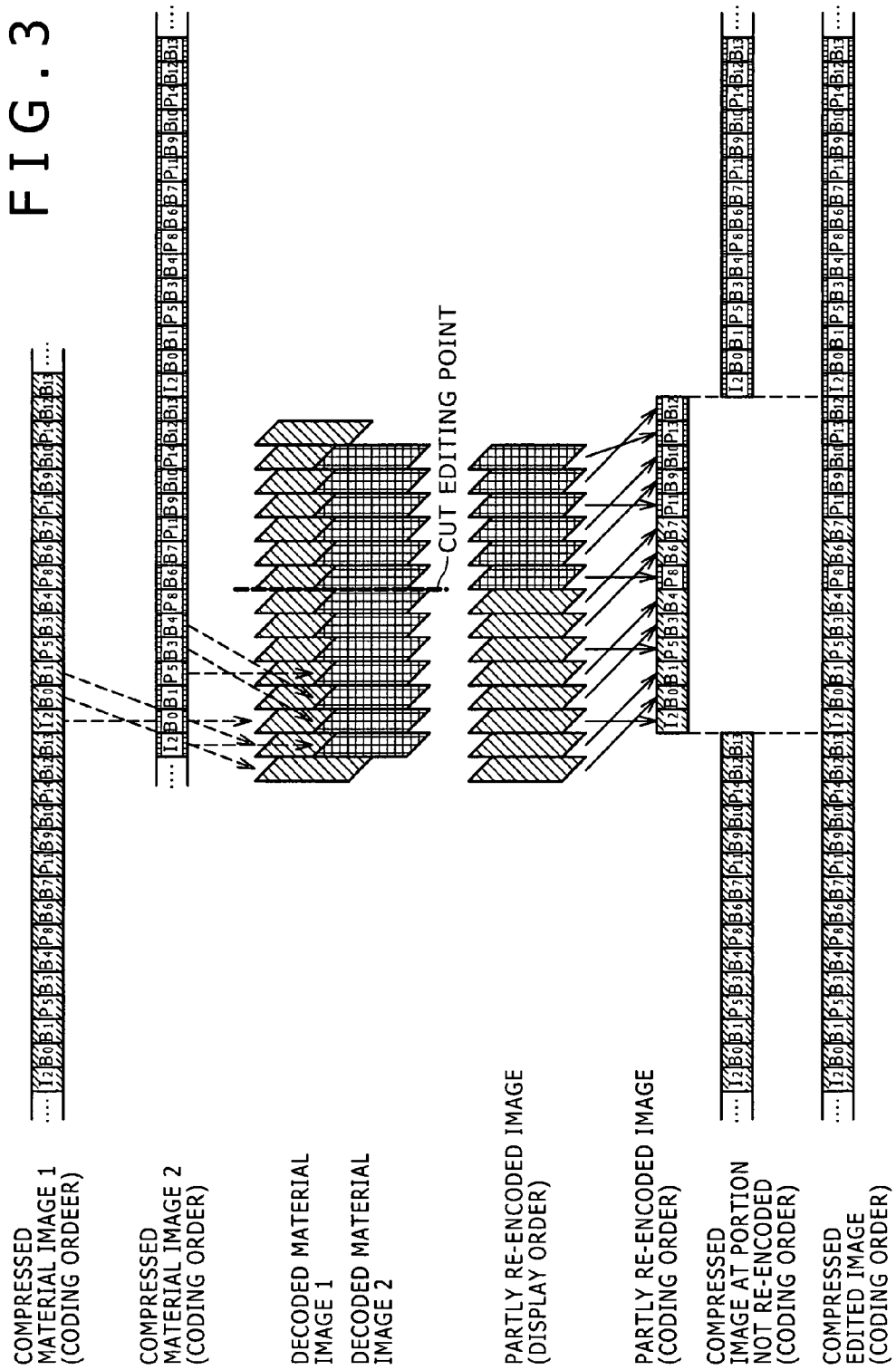
FIG. 3 is a view illustrating arrays of pictures in a display order in editing and partial re-encoding where the Closed GOP structure is used.

DESCRIPTION OF REFERENCE NUMERALS 1 editing apparatus, 11 CPU, 16 HDD, 20 CPU, 22 to 24 decoders, 25 stream splicer, 26 effect/switch, 27 encoder, quantization section 175, 183 quantization control section, 191 intra AC calculation section, 192 generation code amount calculation section, 193 GC calculation section, 194 target code amount calculation section, 195 ME residual calculation section, 401 editing apparatus, 427 encoder, 428 input terminal, 451 MPEG_ES_editing_information, 461 MXF Header, 462 Elementary Stream Header, 551 generation code amount detection section, 552 buffer occupation amount analysis section, 553 buffer occupation amount determination section, 554 command and controlling information production section

[Best Mode for Carrying Out the Invention]

In the following, an embodiment of the present invention is described with reference to the drawings.

Figure 4:
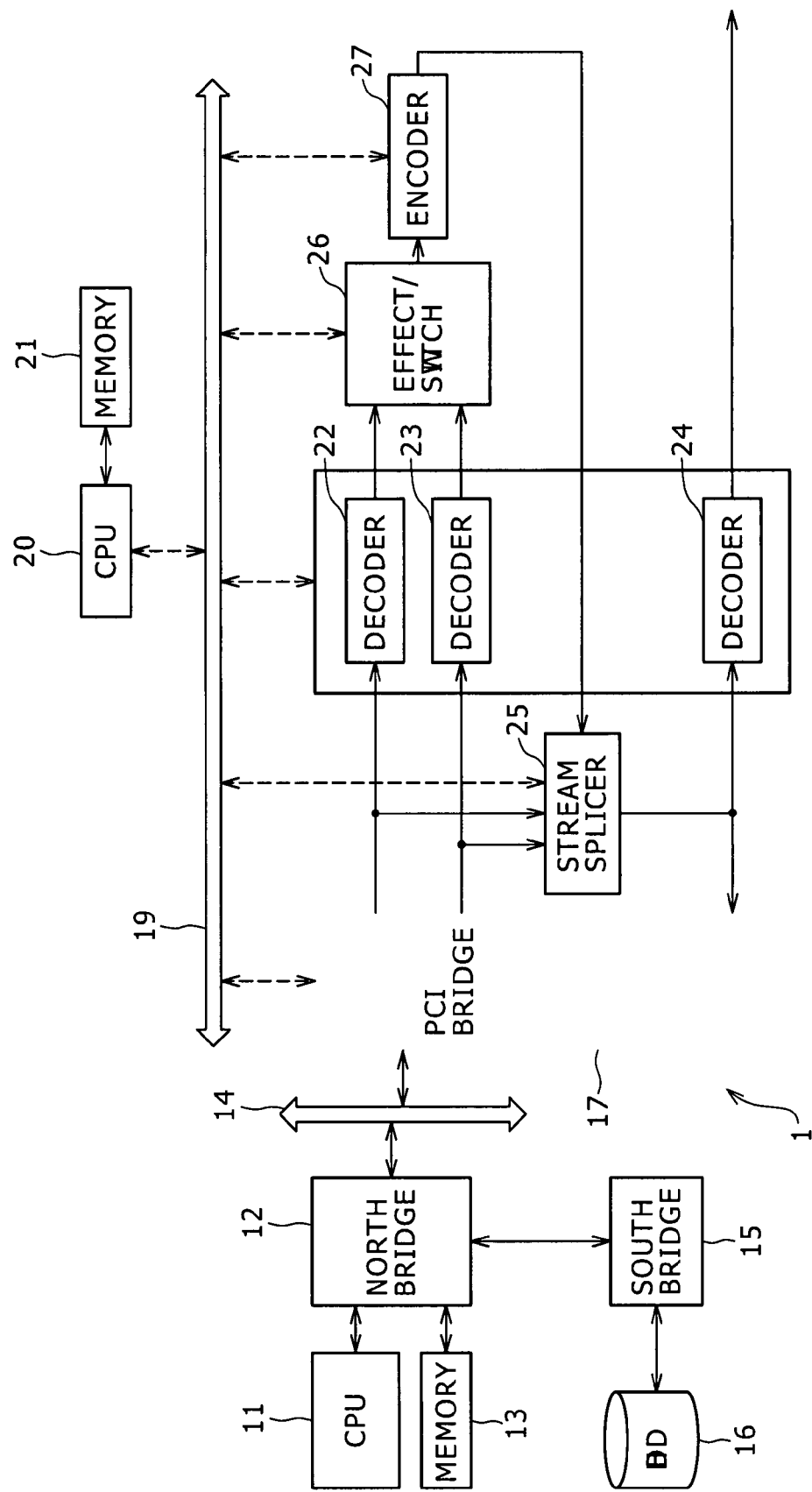
FIG. 4 is a block diagram showing a configuration of an editing apparatus 1 to which the present invention is applied.

FIG. 4 is a block diagram showing a hardware configuration of an editing apparatus to which the present invention is applied.

A CPU (Central Processing Unit) 11 is connected to a north bridge 12 and controls processes such as, for example, a reading out process of data stored in an HDD (hard disk drive) 16, and produces and outputs a command for controlling an editing process to be executed by another CPU 20. The north bridge 12 is connected to a PCI (Peripheral Component Interconnect/Interface) bus 14, and, for example, receives supply of data stored in the HDD 16 through a south bridge 15 and supplies the received data to a memory 18 through the PCI bus 14 and a PCI bridge 17 under the control of the CPU 11. The north bridge 12 is connected also to a memory 13 and supplies and transfers data necessary for processing of the CPU 11 to and from the memory 13.

The memory 13 stores data necessary for processing to be executed by the CPU 11. The south bridge 15 controls writing and reading out of data into and from the HDD 16. The HDD 16 has compression coded materials for editing stored therein.

The PCI bridge 17 controls writing and reading out of data into and from the memory 18 and controls supply of compression coded data to decoders 22 to 24 or a stream splicer 25. Further, the PCI bridge 17 controls transfer of data to and from the PCI bus 14 and a control bus 19. The memory 18 stores compression coded data of materials for editing read out from the HDD 16 or compression coded data after editing supplied from the stream splicer 25 under the control of the PCI bridge 17.

The CPU 20 controls processes to be executed by the PCI bridge 17, the decoders 22 to 24, the stream splicer 25, an effect/switch 26 and an encoder 27 in accordance with a command supplied from the CPU 11 through the north bridge 12, PCI bus 14, PCI bridge 17 and control bus 19. A memory 21 stores data necessary for processing by the CPU 20.

The decoders 22 to 24 decode compression coded data supplied thereto and output a resulting non-coded image signal under the control of the CPU 20. The stream splicer 25 splices compressed image data supplied thereto at a predetermined frame under the control of the CPU 20. The decoders 22 to 24 may otherwise be provided as independent apparatus which are not included in the encoder 27. For example, where the decoder 24 is provided as an independent apparatus, it can receive supply of compressed edited image data produced by editing by a process hereinafter described, decode the compressed edited image data and output resulting data.

The effect/switch 26 changes over between non-compressed image signal outputs supplied thereto from the decoder 22 and the decoder 23, that is, splices non-compressed image signals supplied thereto at a predetermined frame under the control of the CPU 20. Further, the effect/switch 26 applies an effect to the resulting image signal as occasion demands and supplies a resulting signal to the encoder 27. The encoder 27 encodes the non-compressed image signal supplied thereto and outputs resulting compression coded compressed image data to the stream splicer 25 under the control of the CPU 20.

Now, operation of the editing apparatus 1 according to the first embodiment is described.

Figure 5:
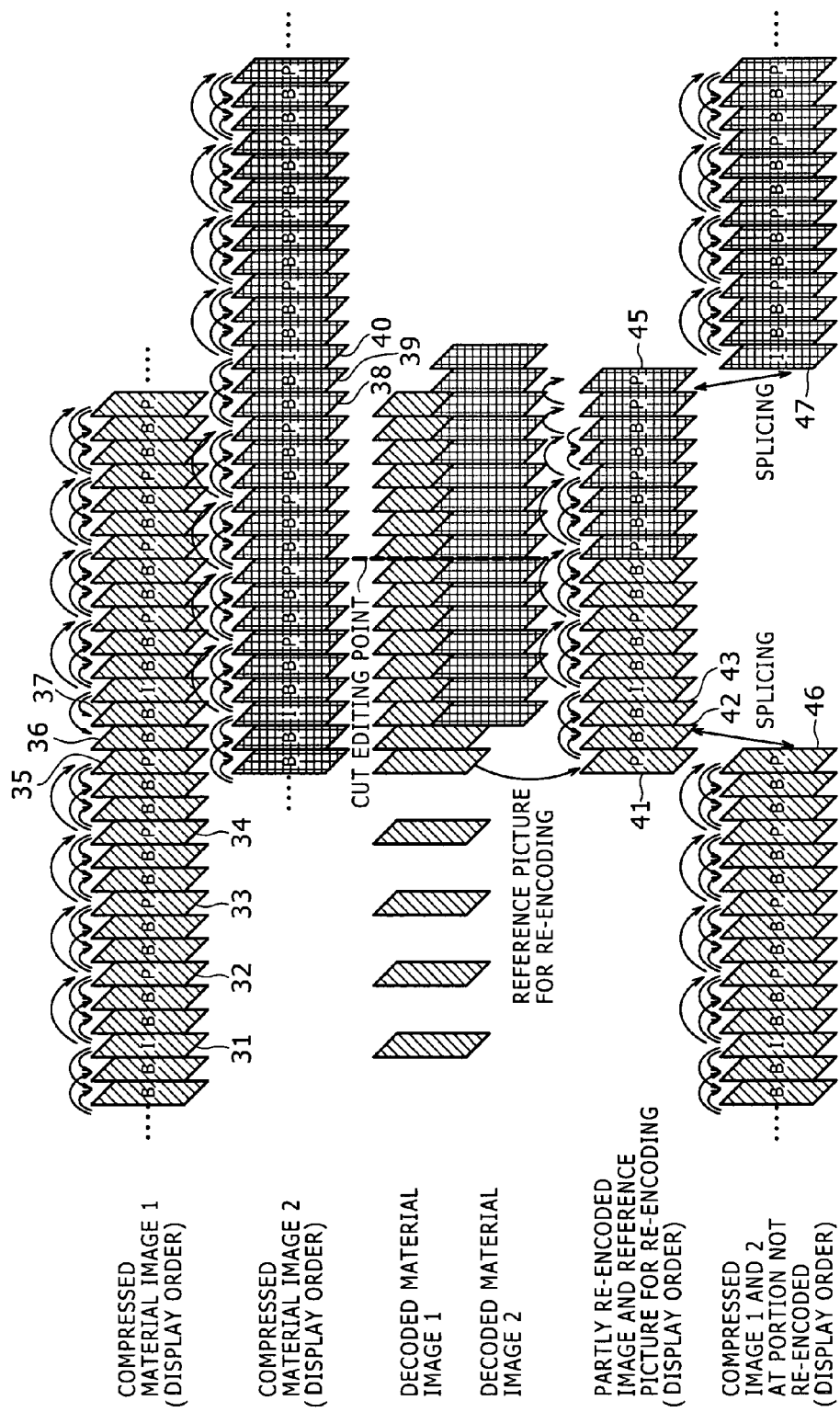
FIG. 5 is a view illustrating partial re-encoding and editing processes which can be executed by the editing apparatus 1 of FIG. 4.

In the HDD 16, data of a compressed material image 1 and a compressed material image 2 compressed in accordance with the Long Open GOP system illustrated in FIG. 5 are stored. Referring to FIG. 5, the compressed material image 1 and the compressed material image 2 are illustrated in an order of pictures to be displayed (in a display order).

The CPU 11 controls the south bridge 15 to read out the data of the compression coded compressed material image 1 and the data of the compression coded compressed material image 2 from the HDD 16 in response to an operation of a user supplied thereto from an operation inputting section not shown and supply the read out data to the memory 18 through the north bridge 12, PCI bus 14 and PCI bridge 17 so as to be stored into the memory 18. Further, the CPU 11 supplies information representing editing points and a command indicating starting of editing to the CPU 20 through the north bridge 12, PCI bus 14, PCI bridge 17 and control bus 19.

The CPU 20 determines, based on the information representative of the editing points supplied thereto from the CPU 11, those ranges of the compression coded data of the compressed material image 1 and the compression coded compressed material image 2 within which re-encoding is to be performed. Then, the CPU 20 controls the PCI bridge 17 to supply, from among the data of the compression coded compressed material image 1 stored in the memory 18, those data of the compressed material image 1 which correspond to pictures for which re-encoding is to be performed and pictures necessary to be referred to to the decoder 22 and, from among the data of the compressed material image 2, those data of the compressed material image 2 which correspond to pictures for which re-encoding is to be performed and pictures necessary to be referred to to the decoder 23.

In particular, at this time, if a B picture 36 and another B picture 37 in the compressed material image 1 are included in a range for which re-encoding is to be performed, then in order to decode the B picture 36 and the B picture 37, also an I picture 31 and a P picture 32 as well as another P picture 35 are decoded. Similarly, if a B picture 38 and another B picture 39 in the compressed material image 2 are included in a range for which re-encoding is to be performed, then in order to decode the B picture 38 and the B picture 39, also an I picture 40 is decoded.

Further, at this time, the CPU 20 controls the PCI bridge 17 to supply those of the compression coded compressed material image 1 and the compression coded compressed material image 2 stored in the memory 18 which are within ranges within which re-encoding is not to be performed to the stream splicer 25.

The CPU 20 controls the decoder 22 and the decoder 23 to decode the compression coded data supplied to them.

The decoder 22 and the decoder 23 decode the data supplied thereto under the control of the CPU 20 and supply signals of the material image 1 and the material image 2 obtained by the decoding to the effect/switch 26. The effect/switch 26 splices the non-compressed signals of the compressed material image 1 with the compressed material image 2 at a predetermined cut editing point (splice point) and applies an effect to the resulting signal as occasion demands to produce a non-compressed edited image signal for re-encoding under the control of the CPU 20. The produced non-compressed edited image signal for re-encoding is supplied to the encoder 27 together with re-encoding reference pictures necessary for re-encoding (in FIG. 5, image data corresponding to a P picture 41 necessary to encode a B picture 42 and another B picture 43).

Further, the decoder 22 and the decoder 23 can extract information necessary for an encoding process by the encoder 27 at the succeeding stage and supply the information to the CPU 20 through the control bus 19. The CPU 20 supplies the information supplied from the decoder 22 or the decoder 23 and necessary for the encoding process by the encoder 27 at the succeeding stage to the encoder 27 through the control bus 19.

The encoder 27 encodes the non-compressed edited image signal for re-encoding supplied thereto from the effect/switch 26 under the control of the CPU 20.

At the time, in order to encode the B picture 42 and the B picture 43 for which bidirectional prediction encoding is to be performed, the encoder 27 must use the immediately preceding P picture 41 as a reference image as seen in FIG. 5.

Further, by determining the picture type such that the last picture in re-encoding may be a P picture, it is possible to eliminate the necessity to use a picture succeeding the last picture in re-encoding as a reference picture for encoding.

In other words, by performing re-encoding with such a picture type that the end point of re-encoding comes to a break of a GOP (that is, with any other picture than a B picture), even where the compressed material image data for editing have the Open GOP structure, the necessity to use a picture succeeding the last picture in re-encoding as a reference picture for encoding is eliminated.

Then, the image data re-encoded by the encoder 27 are supplied to the stream splicer 25. The stream splicer 25 splices, from among the data of the compressed material image 1 and the compressed material image 2 supplied thereto from the PCI bridge 17, those data of the compressed material image 1 and the compressed material image 2 within the ranges for which re-encoding is not to be performed and the encoded image data supplied thereto from the encoder 27 to each other to produce compressed edited image data under the control of the CPU 20.

More particularly, the stream splicer 25 splices the streams each other under the control of the CPU 20 such that the P picture 45 of the encoded image data supplied thereto from the encoder 27 and including the P picture 46 of the compressed material image 1 supplied from the PCI bridge 17 and the B picture 42 of the encoded image data supplied from the encoder 27 and spliced contiguously with the P picture 46 in the display order and the I picture 47 of the compressed material image 2 supplied thereto from the PCI bridge 17 are contiguous to each other in the display order.

Then, the stream splicer 25 supplies the produced compressed edited image data to the PCI bridge 17 so that they are stored into the memory 18, and further supplies the produced compressed edited image data to the decoder 24 so as to be decoded thereby under the control of the CPU 20. The decoded compressed edited image data are outputted from the decoder 24 to a monitor for confirmation of a result of editing so as to be displayed. Further, a base band signal produced by the decoding is outputted to a different apparatus.

If an instruction to store compressed edited image data produced by editing is received from the operation inputting section not shown, then the CPU 11 controls the PCI bridge 17 to read out the compressed edited image data stored in the memory 18 and supply the read out compressed edited image data to the south bridge 15 through the PCI bus 14 and the north bridge 12. Further, the CPU 11 controls the south bridge 15 to supply the compressed edited image data supplied to the same to the HDD 16 so as to be stored into the HDD 16.

Figure 6:
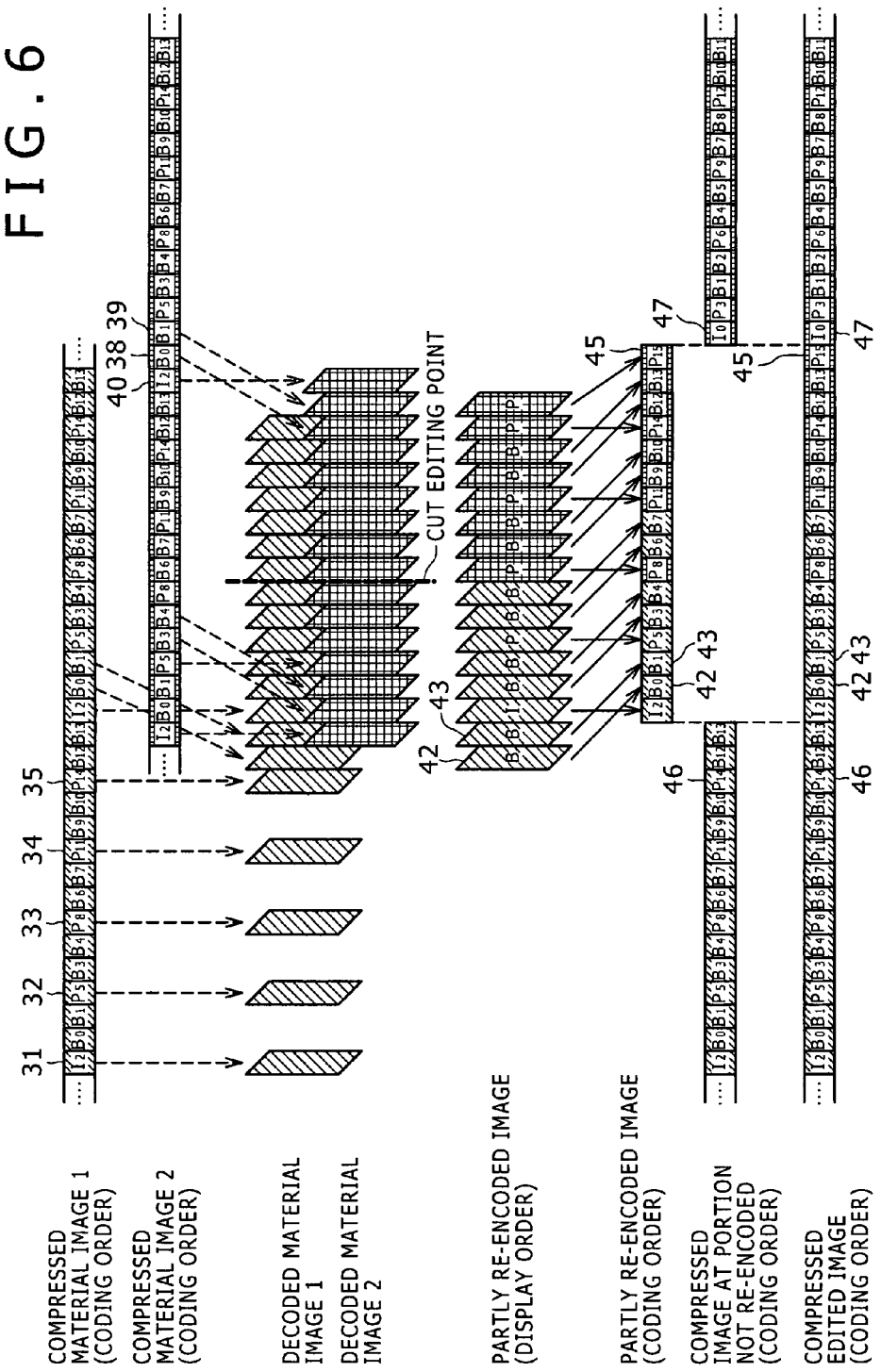
FIG. 6 is a view illustrating arrays of pictures in a display order in the partial re-encoding and editing processes of FIG. 5.

Actual encoding is performed in the coding order and also compressed images encoded by the encoder 27 are outputted in the coding order. FIG. 6 illustrates arrays of pictures in compressed signals in the case described above with reference to FIG. 5 in the coding order.

A re-encoding range including an editing point is determined in data of each of the compressed material image 1 of an object of editing and the compressed material image 2 of another object of editing, and the compressed material image 1 and the compressed material image 2 in the re-encoding ranges are decoded to produce a signal of a non-compressed material image 1 and a signal of a non-compressed material image 2, respectively. Then, the signals of the non-compressed material image 1 and the non-compressed material image 2 are spliced together at the cut editing point, and partial re-encoding of the signals of the non-compressed material image 1 and the non-compressed material image 2 spliced together is performed such that the last picture may be a P picture (or an I picture) thereby to produce compressed image data. Then, the compressed image data are spliced with the compressed image data at the portions for which re-encoding is not performed to produce compressed edited image data.

The compressed image data produced by the partial re-encoding of the material image 1 and the material image 2 spliced together and the compressed image data at one of the portions for which re-encoding is not performed are spliced at the B13 picture which is the last picture in the coding order among the data of the compressed material image 1 at the portion for which re-encoding is not performed and is the fourteenth picture in the display order and the I2 picture which is the top picture in the coding order among the compressed image data produced by the re-encoding and is the third picture in the display order. Further, the compressed image data produced by the partial re-encoding of the material image 1 and the material image 2 spliced together and the compressed image data at the other of the portions at which re-encoding is not performed are spliced together at the P15 picture (P picture 45) which is the last picture in the coding order among the compressed image data produced by the re-encoding and is the sixteenth picture in the display order and the I0 picture (I picture 47) which is the top picture in the coding order in the compressed material image 2 at the portion at which re-encoding is not performed and is the third picture in the display order of the data. In other words, the compressed image data produced by partial re-encoding of the material image 1 and the material image 2 spliced together and the compressed image data at the portions at which re-encoding is not performed are spliced together independently of the changeover position between GOPs to produce compressed edited image data.

In this manner, the P15 picture (P picture 45) which is the last picture in re-encoding in the display order is the last picture in re-encoding also in the coding order. By determining the picture type in this manner, the necessity to use a picture succeeding the last picture in re-encoding as a reference picture for encoding can be eliminated.

It is to be noted here that, although it is described that the compressed material image 1 and the compressed material image 2 within a re-encoding range are decoded, the decoding range may be determined separately from the re-encoding range based on the re-encoding range. In other words, the decoding range may be same as the re-encoding range or may be a greater range including the re-encoding range.

In this instance, it is necessary to perform the re-encoding taking also a VBV (Video Buffering Verifier) buffer into consideration. The VBV buffer when editing is performed is described with reference to FIG. 7.

When encoding is performed, the generation code amount must be controlled so as to be allocated to each picture so that none of an overflow and an underflow may occur with the VBV buffer in order that a decoder at a succeeding stage may perform decoding normally. Particularly where partial re-encoding for editing is performed, the re-encoding must be performed so that none of an overflow and an underflow may occur with the VBV buffer also at a portion for which the partial re-encoding is not performed (particularly in the proximity of a splicing point between a portion at which re-encoding is performed and another portion at which no re-encoding is performed).

Figure 7:
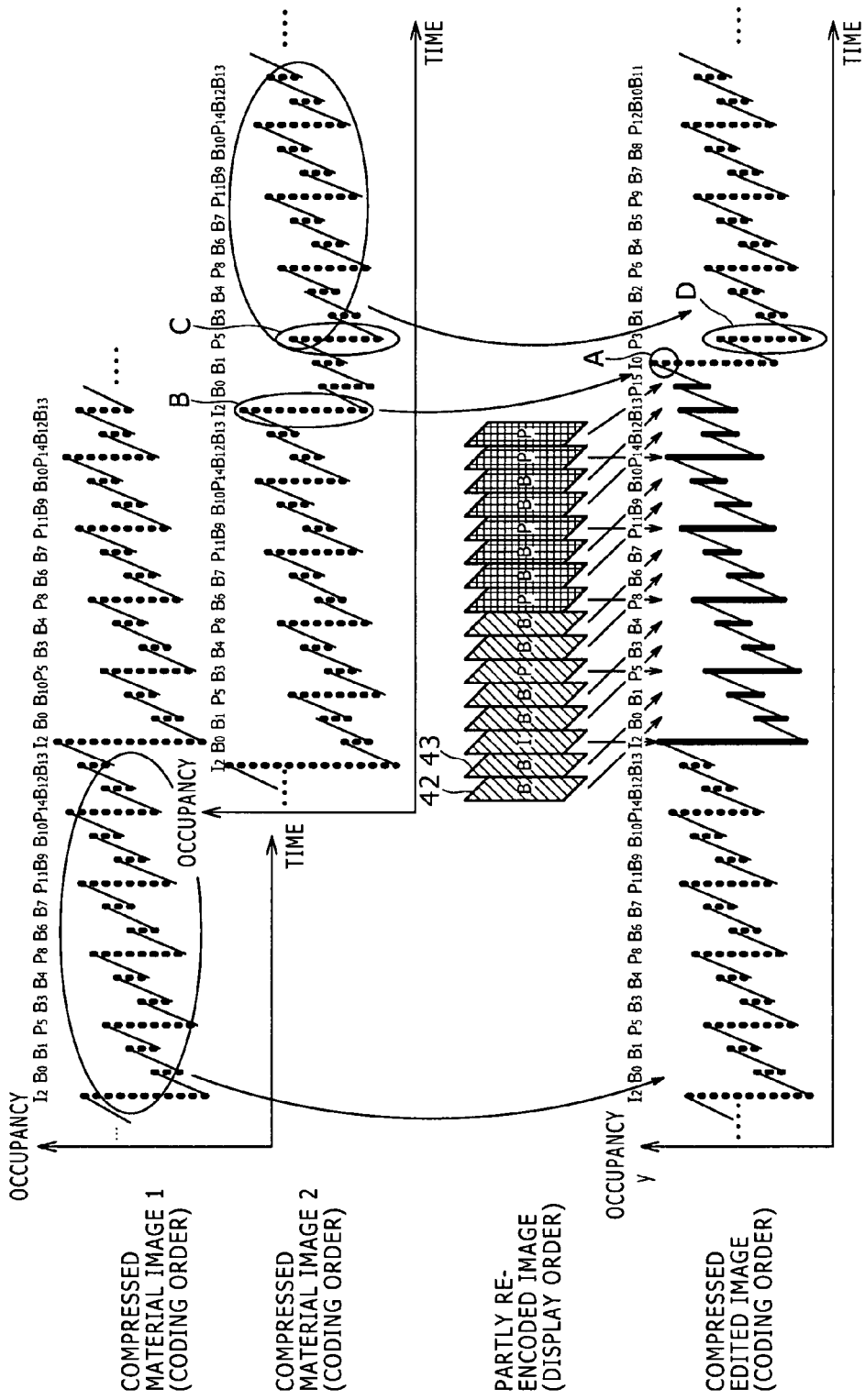
FIG. 7 is a view illustrating a VBV buffer where the partial re-encoding and editing processes of FIG. 5 are executed.

What is influenced by the state of a buffer for re-encoded compressed image data is compressed image data at a portion for which re-encoding is not performed and which is spliced with the next to the re-encoded compressed image signal. The sufficient condition that the compressed image data at the portion for which re-encoding is not performed do not cause an overflow or an underflow is that the occupancy at the spliced portion between the re-encoded compressed image data and the compressed image data at the portion for which re-encoding is not performed coincides between those before and after editing, or in other words, that the occupancy of the first I picture or P picture of the compressed edited image data at a portion for which re-encoding is not performed and which is spliced with the next to the re-encoded compressed image signal, that is, the occupancy of a P picture denoted by D in FIG. 7 succeeding an I picture denoted by A in FIG. 7, is equal to the occupancy of an I picture or a P picture next to an I picture indicated by B in FIG. 7 of the data of the compressed material image 2, that is, the occupancy of a P picture indicated by C in FIG. 7. Therefore, when re-encoding is preformed, the occupancy of the buffer at a point of time when the re-encoding comes to an end (portion indicated by A in FIG. 7) must be controlled so that a value which satisfies the condition described above may be obtained.

By the control just described, an otherwise possible breakdown of the VBV buffer can be prevented to the utmost.

However, depending upon the generation code amount of the I picture indicated by A and the next I or P picture, it is impossible to control the occupancy of the I picture denoted by A so that the occupancy of the P picture denoted by D may be equal to the occupancy of the P picture indicated by C in FIG. 7 of the data of the compressed material image 2 as described hereinabove, resulting in the possibility that the VBV buffer may break down.

A case wherein the VBV buffer breaks down is described with reference to FIG. 8.

Generally, the generation code amount of an I picture and the generation code amount of a P picture are greater than the generation code amount of a B picture. For example, a case is considered wherein the generation code amount B of the I2 picture which is an I picture at the top of data of the compressed material image 2 which is to be spliced with the next to compressed image data produced by re-encoding but is not re-encoded and the generation code amount C of the P5 picture which is a P picture succeeding the I2 picture are great.

Figure 8:
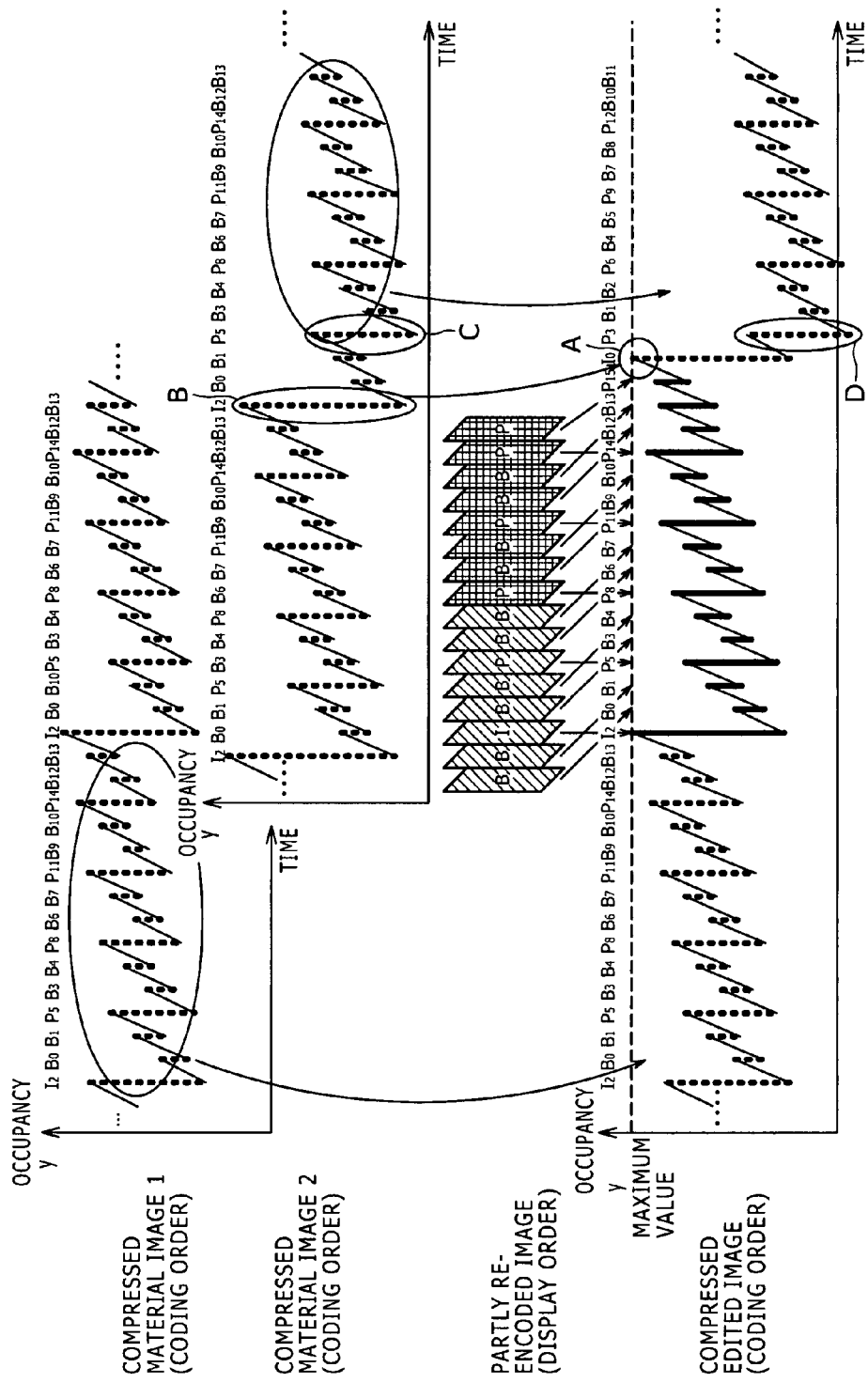
FIG. 8 is a view illustrating a breakdown of the VBV buffer where the partial re-encoding and editing processes of FIG. 5 are executed.

In this instance, even if it is tried to control the occupancy of the I picture denoted by A so that the occupancy of a portion denoted by D of a P picture succeeding an I picture at the top of a portion of a compressed edited image produced by editing which succeeds a partially encoded portion and is not partially encoded may become equal to the occupancy of a portion denoted by C of the data of the compressed material image 2 before the editing, since the code generation amounts of the successive P pictures are great, the buffer underflows as denoted by D in FIG. 8. In the example shown, since the occupancy of the I picture denoted by A of the I0 picture after the editing is a substantially maximum value of the buffer, in whatever manner the generation code amount is controlled at the re-encoded portion, the underflow of the buffer cannot be avoided at the portion denoted by D in FIG. 8. In other words, with the method described hereinabove with reference to FIGS. 5 and 6, the decoding process by a decoder cannot be guaranteed by 100%.

Therefore, the CPU 20 can control the processes to be executed by the decoder 22 and decoder 23, stream splicer 25, effect/switch 26 and encoder 27 so that re-encoding may be performed while a condition for preventing a breakdown of the VBV buffer is observed.

Now, a method of editing an image signal compressed in accordance with the Long Open GOP system while a condition for preventing a breakdown of the VBV buffer is observed is described.

Operation of the editing apparatus 1 according to the second embodiment is described.

The CPU 11 controls the south bridge 15 to read out the data of the compression coded compressed material image 1 and the data of the compression coded compressed material image 2 from the HDD 16 in response to an operation of a user supplied thereto from an operation inputting section not shown and supply the read out data to the memory 18 through the north bridge 12, PCI bus 14 and PCI bridge 17 so as to be stored into the memory 18. Further, the CPU 11 supplies information representing editing points and a command indicating starting of editing to the CPU 20 through the north bridge 12, PCI bus 14, PCI bridge 17 and control bus 19.

The CPU 20 determines, based on the information representative of the editing points supplied thereto from the CPU 11, those ranges of the compression coded data of the compressed material image 1 and the compression coded data of the compressed material image 2 within which re-encoding is to be performed.

More particularly, the CPU 20 determines the start point of the section of the compressed material image 1 for which re-encoding is to be performed so that the picture type of the last picture in the display order of the compressed image at the portion for which re-encoding is not to be performed and is to be spliced with the front of the partially re-encoded compressed image may be an I picture or a P picture.

Figure 9:
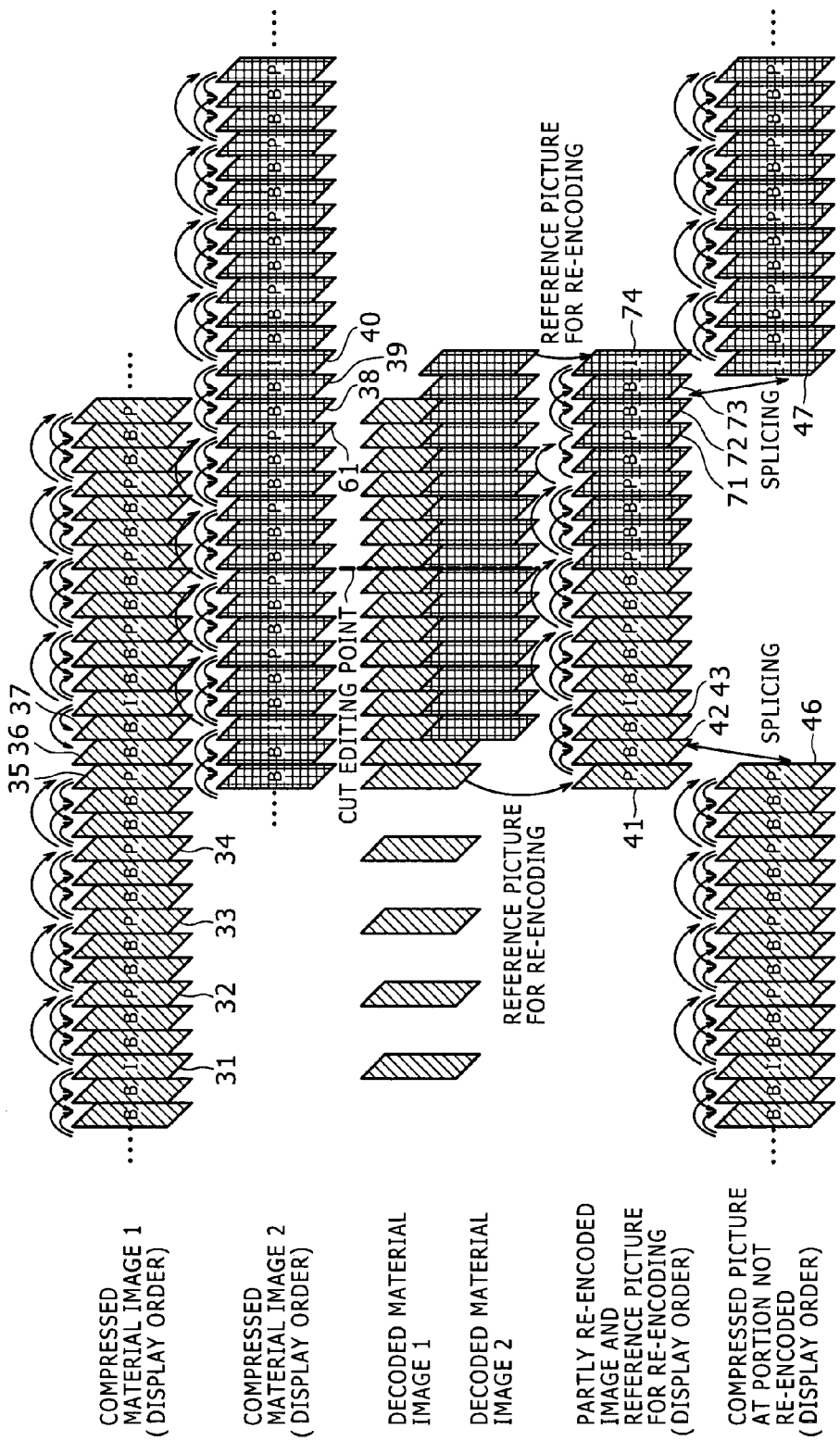
FIG. 9 is a view illustrating partial re-encoding and editing processes executed taking the VBV buffer into consideration.

In particular, the CPU 20 determines, for example, the B picture 36 next to the P picture 35 in the compressed material image 1 as the start point of the section for which re-encoding is to be performed so that the picture type of the last picture in the display order of the compressed material image 1 at the portion for which re-coding is not to be performed may be the P picture 46 as shown in FIG. 9. In other words, the CPU 20 can make it easy to perform an encoding process by controlling the portion for which re-encoding is not to be performed so that the compressed image at the portion may be the end position of a GOP.

The CPU 20 further determines the end point of the section of the compressed material image 2 for which re-encoding is to be performed so that the picture type of the first picture in the display order of the compressed image at the portion which is to be spliced with the next to the compressed image at the portion for which re-encoding is not to be performed may be an I picture.

In particular, the CPU 20 determines, for example, the B picture 39 preceding to the I picture 40 in the compressed material image 2 as the end point of the section for which re-encoding is to be performed so that the picture type of the first picture in the display order of the compressed material image 2 at the portion for which re-coding is not to be performed may be the I picture 47 as shown in FIG. 9.

Then, the CPU 20 controls the PCI bridge 17 to supply, from among the data of the compression coded compressed material image 1 stored in the memory 18, those pictures within the range within which re-encoding is to be performed and the data of the I picture 31, P picture 32, P picture 33, P picture 34 and P picture 35 which must be referred to in order to decode the B picture 36 and the B picture 37 to the decoder 22. The CPU 11 further controls the PCI bridge 17 to supply, from among the data of the compressed material image 2 stored in the memory 18, those pictures within the range within which re-encoding is to be performed and the data of the I picture 40 which must be referred to in order to decode the B picture 38 and the B picture 39 to the decoder 23.

Further, at this time, the CPU 20 controls the PCI bridge 17 to supply those pictures within the range within which re-encoding is not to be performed from among the data of the compression coded compressed material image 1 and compressed material image 2 stored in the memory 18 to the stream splicer 25.

The CPU 20 controls the decoder 22 and the decoder 23 to decode the compression coded data supplied to them.

The decoder 22 and the decoder 23 decode the data supplied thereto under the control of the CPU 20 and supply the signals of the compressed material image 1 and the compressed material image 2 obtained by the decoding to the effect/switch 26.

Further, the decoder 22 and the decoder 23 can extract information necessary for an encoding process by the encoder 27 at the succeeding stage and supply the information to the CPU 20 through the control bus 19. The CPU 20 supplies information supplied from the decoder 22 or the decoder 23 and necessary for the encoding process by the encoder 27 at the succeeding stage to the encoder 27 through the control bus 19.

The effect/switch 26 splices the non-compressed signals of the compressed material image 1 with the compressed material image 2 at a predetermined cut editing point (splice point) and applies an effect to the resulting signal as occasion demands to produce a non-compressed edited image signal for re-encoding under the control of the CPU 20. The produced non-compressed edited image signal for re-encoding is supplied to the encoder 27 together with re-encoding reference images necessary for re-encoding (in FIG. 9, image data corresponding to the P picture 41 necessary to encode the B picture 42 and the B picture 43 and the I picture 74 necessary to encode the B picture 72 and the B picture 73).

The CPU 20 acquires information of the number n of successive B pictures positioned at the last in the display order in the portion of the compressed material image 2 for which re-encoding is to be performed. Since it is determined that the picture type of the first picture in the display order of the compressed material image 2 at the portion for which re-encoding is not to be performed is an I picture as described above, the number n of B pictures is the number of whose B pictures which are included between the first I picture in the display order of the compressed material image 2 at the portion for which re-encoding is not to be performed and an I picture or a P picture which exists immediately preceding to the I picture after the editing. In the case illustrated in FIG. 9, the number of B pictures is two including the B picture 38 and the B picture 39.

Further, the CPU 20 acquires information of the picture type of an I picture or a P picture which exists immediately preceding to the first I picture in the display order of the compressed material image 2 at the portion for which re-encoding is not to be performed, or in other words, information of the picture type of an I picture or a P picture which exits at the last in the range for which re-encoding is to be performed. In the case illustrated in FIG. 9, the I picture or the P picture which exists immediately preceding to the first I picture in the display order of the compressed material image 2 in the portion for which re-encoding is not to be performed is the P picture 61.

Then, the CPU 20 controls the encoder 27 so that the number of B picture types in the proximity of the end point of re-encoding may become equal to that of the compressed material image 2 before the editing and the picture type of the picture immediately preceding to the B pictures may be an I picture or a P picture in a process executed by the encoder 27. Further, the CPU 20 preferably controls the encoder 27 so that also the picture type of the picture immediately preceding to the B pictures may be same as that of the compressed material image 2 before the editing.

In particular, in the case of FIG. 9, the CPU 20 controls the encoder 27 so that the picture type of the B picture 38 and the B picture 39 of the compressed material image 2 before the editing and the picture type of the B picture 72 and the B picture 73 in re-encoding coincide with each other and the P picture 71 is positioned immediately preceding to the B picture 72 and the B picture 73 in re-encoding.

The encoder 27 encodes the non-compressed edited image signal for re-encoding supplied thereto from the effect/switch 26 under the control of the CPU 20.

Then, the image data re-encoded by the encoder 27 are supplied to the stream splicer 25. The stream splicer 25 splices, from among the data of the compressed material image 1 and the compressed material image 2 supplied thereto from the PCI bridge 17, those data of the compressed material image 1 and the compressed material image 2 within the ranges for which re-encoding is not to be performed with the encoded image data supplied thereto from the encoder 27 each other to produce compressed edited image data under the control of the CPU 20.

In particular, the stream splicer 25 splices the streams together under the control of the CPU 20 so that the P picture 46 of the compressed material image 1 supplied from the PCI bridge 17 and the B picture 42 of the encoded image data supplied from the encoder 27 are spliced together in the display order and the B picture 73 of the encoded image data supplied from the encoder 27 and the I picture 47 of the compressed material image 2 supplied from the PCI bridge 17 are spliced together in the display order.

It is to be noted here that, although it is described that the compressed material image 1 and the compressed material image 2 within a re-encoding range are decoded, the decoding range may be determined separately from the re-encoding range based on the re-encoding range. In other words, the decoding range may be same as the re-encoding range or may be a greater range including the re-encoding range.

Actual encoding is performed in the cording order, and also compressed images encoded by the encoder 27 are outputted in the coding order. Arrays of pictures in compressed signals corresponding to those described hereinabove with reference to FIG. 9 are shown in the coding order in FIG. 10.

More particularly, the stream splicer 25 splices the streams together in the following manner under the control of the CPU 20. In particular, the B picture 81 succeeding the P picture 71 in the coding order in the encoded image data and the I picture 47 (I picture not re-encoded) of the compressed material image 2 are contiguous to each other at a splicing point between a portion which has been re-encoded and another portion which has not been re-encoded. Further, the I picture 47 of the compressed material image 2 and the B picture 72 of the encoded image data are contiguous to each other in the coding order. Furthermore, the B picture 73 succeeding the B picture 72 in the coding order in the encoded image data and the P picture 82 of the compressed material image 2 are contiguous to each other.

In other words, the stream splicer 25 splices the streams together so that an I picture which is not re-encoded may be placed to a position preceding to n re-encoded B pictures succeeding the last I picture or P picture in the re-encoded section in the coding order.

Then, the stream splicer 25 supplies the produced compressed edited image data to the PCI bridge 17 so that they are stored into the memory 18, and further supplies the produced compressed edited image data to the decoder 24 so as to be decoded thereby under the control of the CPU 20. The decoded compressed edited image data are outputted from the decoder 24 to a monitor for confirmation of a result of editing so as to be displayed. Further, a base band signal produced by the decoding is outputted to a different apparatus. Where the decoder 24 is formed as an independent apparatus, the apparatus corresponding to the decoder 24 can receive supply of the edited compressed image data produced by the process described above with reference to FIGS. 9 and 10, and in other words, including the I picture not re-encoded and placed preceding to the n re-encoded B pictures succeeding the last I picture or P picture in the re-encoded section and decode the received edited compressed image data, and then output a base band signal produced by the decoding.

Now, the VBV buffer used to perform an editing process utilizing re-encoding as described above with reference to FIGS. 9 and 10 is described with reference to FIG. 11.

Figure 10:
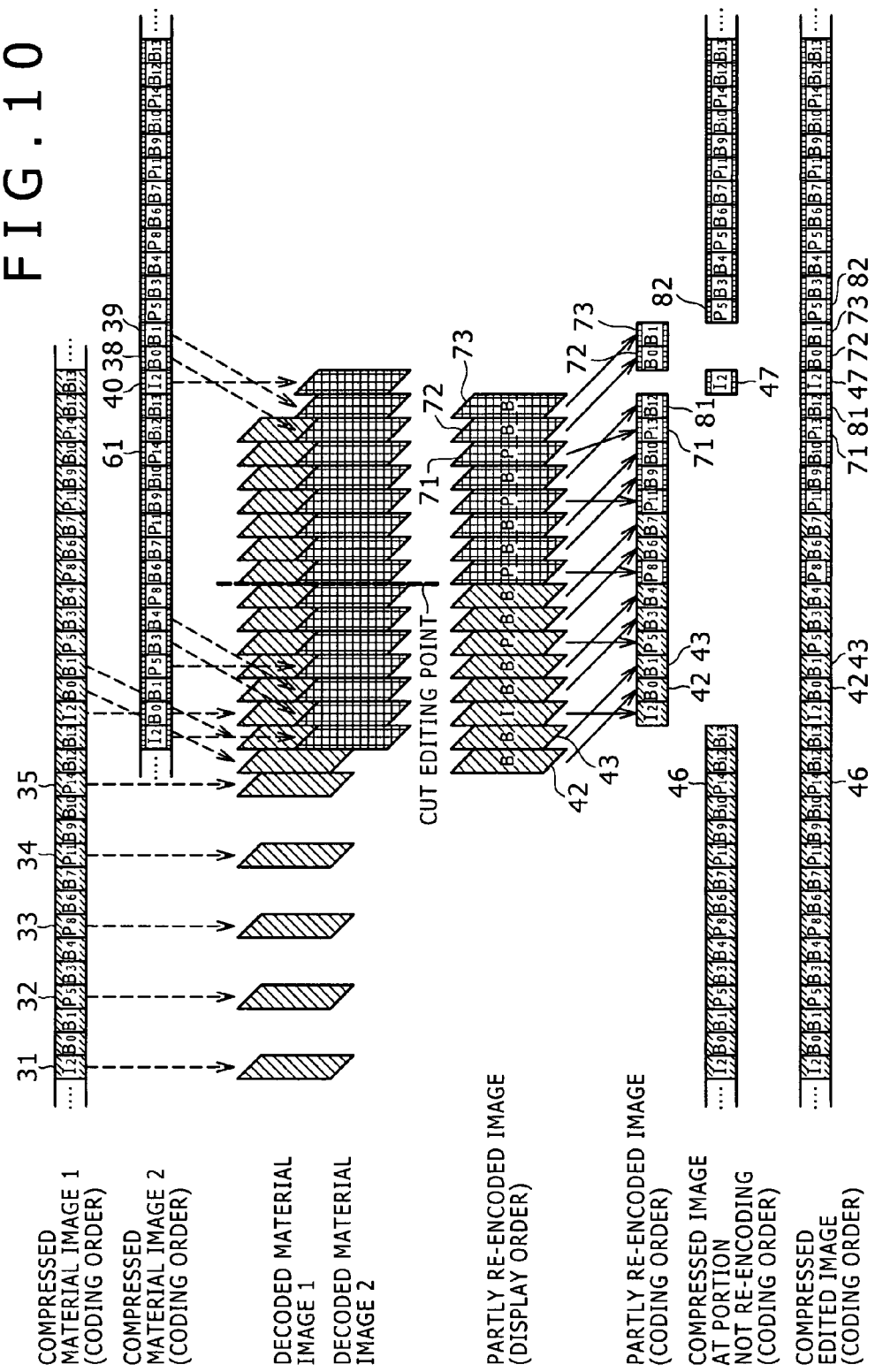
FIG. 10 is a view illustrating arrays of pictures in the display order in the partial re-encoding and editing processes of FIG. 9.

When the editing process described hereinabove with reference to FIGS. 9 and 10 in which re-encoding is utilized is performed, an I picture which is not re-encoded is inserted to a position preceding to the last n B pictures in re-encoding in the coding order. Accordingly, as seen in FIG. 11, information (in FIG. 11, a portion denoted by F) of the generation code amount of the I picture which is not re-encoded is determined from information (in FIG. 11, a portion denoted by B) of the generation code amount of the corresponding I picture of the compressed material image 2. Further, to a portion of the re-encoding range except the last n B pictures (portion denoted by E in FIG. 11), the generation code amount is allocated so that an overflow or an underflow may not occur with the VBV buffer at the first I picture which is not re-encoded, and re-encoding is performed for the portion and the occupancy of the VBV buffer is calculated.

Thereafter, in order to prevent an overflow or an underflow of the VBV buffer for the compressed image which is not re-encoded, encoding is performed with the generation code amount at the last n B pictures (in FIG. 11, a portion denoted by G) in the re-encoded portion so that the values of the occupancy of the I picture or P picture positioned next to the top I picture of the compressed image which is not re-encoded before and after the editing may coincide with each other. In particular, since the generation code amount denoted by C before the editing and the generation code amount denoted by H after the editing are equal to each other in FIG. 11, re-encoding of the n B pictures is performed so that the occupancy denoted by J after the editing may coincide with the occupancy denoted by I before the editing. As a result, no underflow of the buffer occurs at any of portions denoted by K and L in FIG. 11.

Figure 11:
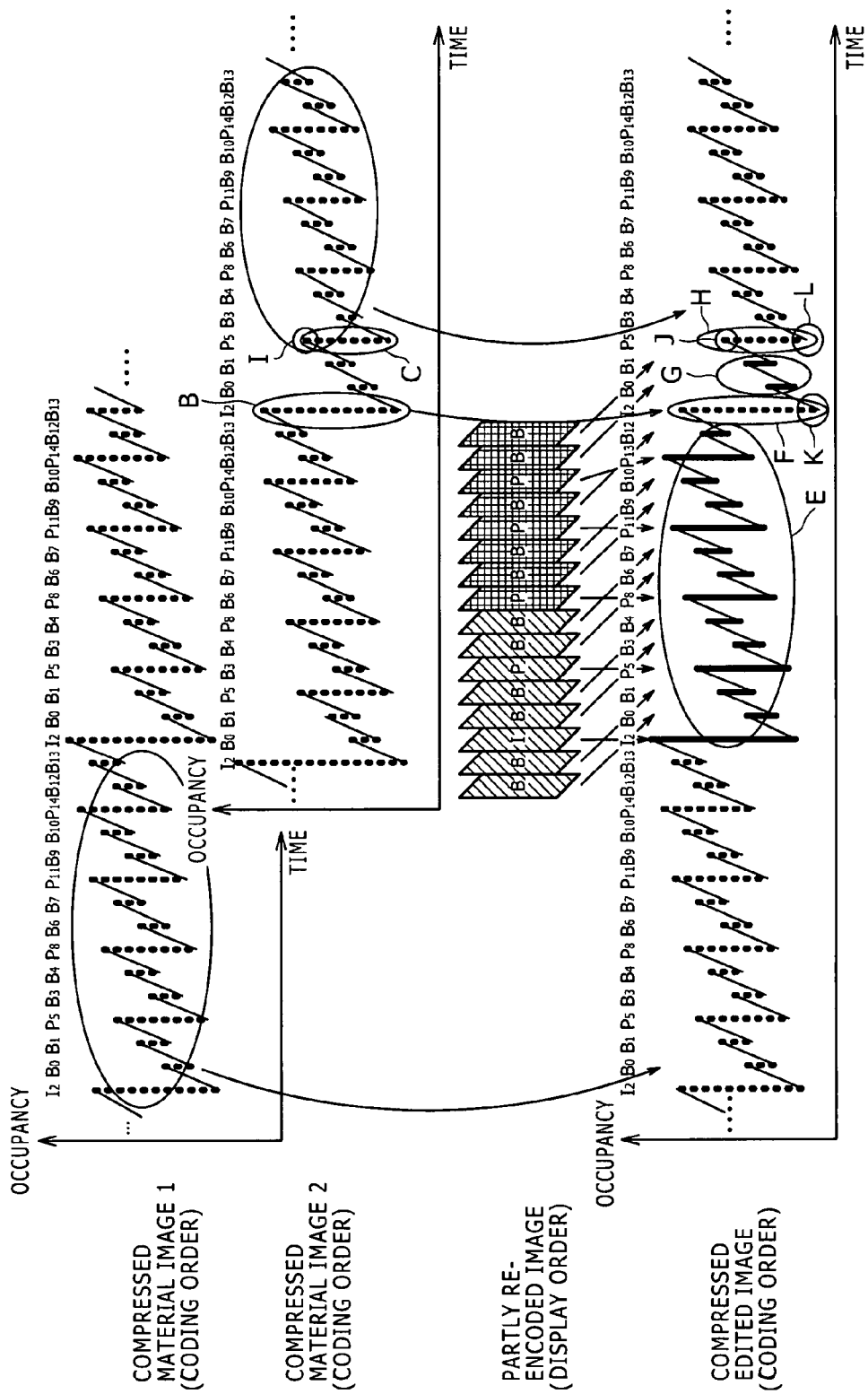
FIG. 11 is a view illustrating the VBV buffer where the partial re-encoding and editing processes of FIG. 9 are executed.

According to the method described, since the picture types at splicing portions of compressed images at a portion for which re-encoding is performed and another portion for which re-encoding is not performed are maintained before and after editing, even if the generation code amount F of the I picture at the top of the portion for which re-encoding is not performed and which is to be connected to the portion for which re-encoding is performed and the generation code amount H of the next I picture or P picture are great as seen in FIG. 11, if the restriction condition to the VBV buffer is satisfied with the data of the compressed material image 2 before the editing, then it is possible to perform encoding so that also the compressed images after editing may satisfy the restriction condition.

The first embodiment and the second embodiment of the process executed by the editing apparatus 1 which can edit image data compressed using bidirectional interframe prediction are described above with reference to FIGS. 4 to 11.

In an editing method wherein pictures in a predetermined range in the proximity of an editing point are decoded and spliced and then re-encoded in such a manner as described above, it is necessary to control the occupancy in the proximity of a splicing point between a portion for which re-encoding is performed and another portion for which re-encoding is not performed so that the occupancy of the VBV buffer may be continuous. Therefore, in the second embodiment, in order to prevent an underflow of the buffer where the VBV occupancy of an I picture at a start point of re-encoding and the VBV occupancy of an I picture preceding to a re-encoding end point, only a code amount smaller than the original code amount (determined by the picture number× bit_rate/frame_rate) supposed from the bit rate can be generated. In such an instance as just described, if re-encoding is performed at the same bit rate, then the picture quality deteriorates.

Here, the reason why the VBV occupancy values of an I picture at a re-encoding start point and an I picture preceding to a re-encoding end point are compared with each other to decide whether or not the supposed original code amount is generated is that it is intended to compare VBV occupancy values at the same position in the GOPs.

Further, as described hereinabove, an effect is applied in the proximity of an editing point as occasion demands. At this time, depending upon the type of the effect, the degree of difficulty in encoding of the portion to which the effect is applied increases, and if the portion is encoded with an ordinary code amount, then the picture quality after re-encoding deteriorates.

Where the encoder 27 performs encoding at a VBR (Variable Bit Rate) and the bit rate in the proximity of an editing point of compressed image data of an editing material is lower than a maximum bit rate and hence can be raised when re-encoding is performed, the picture quality can be maintained by raising the bit rate at a portion within a re-encoding range at which the degree of difficulty in encoding is high. However, where the encoder 27 is performing encoding at a CBR (Constant Bit Rate) or where the bit rate in the proximity of an editing point of compressed image data of an editing material is substantially equal to a maximum bit rate, the picture quality cannot be maintained because the bit rate cannot be raised at a portion within a re-encoding range at which the degree of difficulty in encoding is high to increase the amount of codes which can be used for encoding.

Where the degree of difficulty in encoding in the proximity of an editing point becomes high in a situation wherein the Bit Rate cannot be raised or where only a code amount smaller than the original code amount which is supposed from the bit rate can be used in order to keep the continuity of the VBV buffer, it is necessary to control the generation code amount so that a generation code amount which is as near to the original generation code amount as possible can be provided thereby to prevent deterioration of the picture quality. Therefore, in the editing apparatus 1, the occupancy of the VBV buffer is controlled so as to be continuous such that, when the supposed original code amount is not generated or the degree of difficulty in encoding at a portion in the proximity of an editing point rises as a result of an effect applied to the portion, control can be performed so that the re-encoding range in the second embodiment described hereinabove is extended and the generation code amount in the encoding process by the encoder 27 is increased in the proximity of the editing point thereby to prevent deterioration of the picture quality.

A third embodiment wherein control is performed so that a re-encoding range is extended and the generation code amount in the encoding process by the encoder 27 is increased in the proximity of an editing point is described below.

First, a minimum re-encoding interval including an editing point as in the case described hereinabove with reference to FIG. 11 is considered. An effect interval including an editing point is hereinafter referred to as editing duration.

In order to maintain the continuity of the VBV Occupancies at a start point and an end point of re-encoding, encoding by the encoder 27 is controlled by the CPU 20 so that the VBV Occupancies at the start point and the end point of the encoding may coincide with each other.

Since the generation code amount of an I picture is usually greater than that of a P picture or a B picture, the occupancy is low at the top of a GOP and increases in a rear half of the GOP. Where the code amount allocation is performed such that an equal code amount (picture number of 1 GOP× bit_rate/frame_rate) is allocated in a unit of a GOP, the Occupancies are equal to each other at top I pictures of GOPs. Accordingly, where an equal code amount is not allocated in a unit of a GOP, it can be decided by comparing the Occupancies at the top of a GOP for which re-encoding is performed and the top of a next GOP with each other whether the code amount which can be used in the GOP is greater or smaller than an average. In other words, by comparing the VBV Occupancies of an I picture at a start point of re-encoding and an I picture preceding to an end point of the re-encoding with each other, it can be decided whether or not the supposed original code amount is generated.

Further, since there is little variation in the encoding condition of a picture (B picture denoted by G in FIG. 11) between pictures at an end point of re-encoding and an I picture which immediately precedes to the re-encoding end point and is not re-encoded, where it can be assumed that the code amount upon re-encoding of this portion is same as that of the compressed image before editing, the VBV occupancy of the I picture which immediately precedes to the re-encoding end point of the compressed image before editing and is not re-encoded can be considered to be VBV occupancy at the end point of the interval to be re-encoded. Further, where a minimum GOP including an editing duration is referred to as editing GOP duration, the I picture at the top of the editing GOP duration and a next I picture in the editing GOP duration are equal to the I picture at a start point of re-encoding and an I picture preceding to an end point of the re-encoding.

Accordingly, by determining an occupancy difference value which is a value obtained by subtracting the VBV occupancy of the I picture which immediately precedes to the re-encoding end point of the compressed material image 2 before editing, in other words, the I picture next to the editing GOP duration, from the VBV occupancy of the picture corresponding to the start point of re-encoding of the compressed material image 1 before editing, in other words, the picture before editing which corresponds to the I picture at the top of the editing GOP duration, it can be decided before actual encoding is performed whether or not the amount of codes which can be used in the editing duration is smaller than an average value obtained from the bit rate.

$$\text{Occupancy difference value} = vbv\_edit\_gop\_start - vbv\_edit\_last\_i \quad (1)$$

Accordingly, where the amount of codes which can be used in the editing GOP duration is smaller than an average value, the CPU 20 controls the PCI bridge 17 to extend the re-encoding interval to the front and the rear of the editing GOP duration and controls the encoder 27 to increase the generation code amount to be allocated to the editing GOP duration.

Further, in the memory 21, either a table indicative of a relationship between types of the effect and rates of rise of the degree of difficulty in encoding is stored in advance, or coefficients corresponding to types of the effect and a calculation expression by which a value corresponding to a degree of difficulty in encoding can be calculated using the coefficients are stored in advance. The CPU 20 refers to the table stored in the memory 21 or uses the predetermined calculation expression to acquire a degree of difficulty in encoding corresponding to the type of the effect, and controls the PCI bridge 17 based on the degree of difficulty in encoding to extend the re-encoding interval to the front and the rear of the editing GOP duration and controls the encoder 27 to increase the generation code amount to be allocated to the editing GOP duration.

The CPU 20 may determine a generation code amount to be allocated to the editing GOP duration and an extension amount of a re-encoding interval in advance before re-encoding is performed by the encoder 27 or may successively calculate and update the generation code amount to be allocated to the editing GOP duration and an extension amount of the re-encoding interval in parallel to re-encoding performed by the encoder 27. At this time, it is necessary for the CPU 20 to acquire information regarding the degree of difficulty in encoding of a picture to be re-encoded in order to calculate the generation code amount to be allocated to the editing GOP duration and the extension amount of the re-encoding interval. Where the information of the corresponding degree of difficulty in encoding is prepared already together with a compressed image material recorded in the HDD 16, the CPU 11 may read out the information of the degree of difficulty in encoding from the HDD 16 through the south bridge 15 and the north bridge 12 and supply the information to the CPU 20 through the north bridge 12, PCI bus 14, PCI bridge and control bus 19. Further, the decoders 22 and 23 may acquire, upon decoding, the information of the degree of freedom in encoding and supply the information to the CPU 20 through the control bus 19 or the encoder 27 may supply information of the degree of difficulty in encoding acquired upon encoding to the CPU 20.

In this manner, since, in the editing apparatus 1, the occupancy of the VBV buffer is controlled so as to be continuous, where the supposed original code amount is not generated or an effect is applied in the proximity of an editing point and this raises the degree of difficulty in editing at the portion, by extending a minimum re-encoding range determined by a method described hereinabove and controlling the generation code amount in an encoding process by the encoder 27 so as to increase in the proximity of an editing point, deterioration of the picture quality can be prevented.

Figure 12:
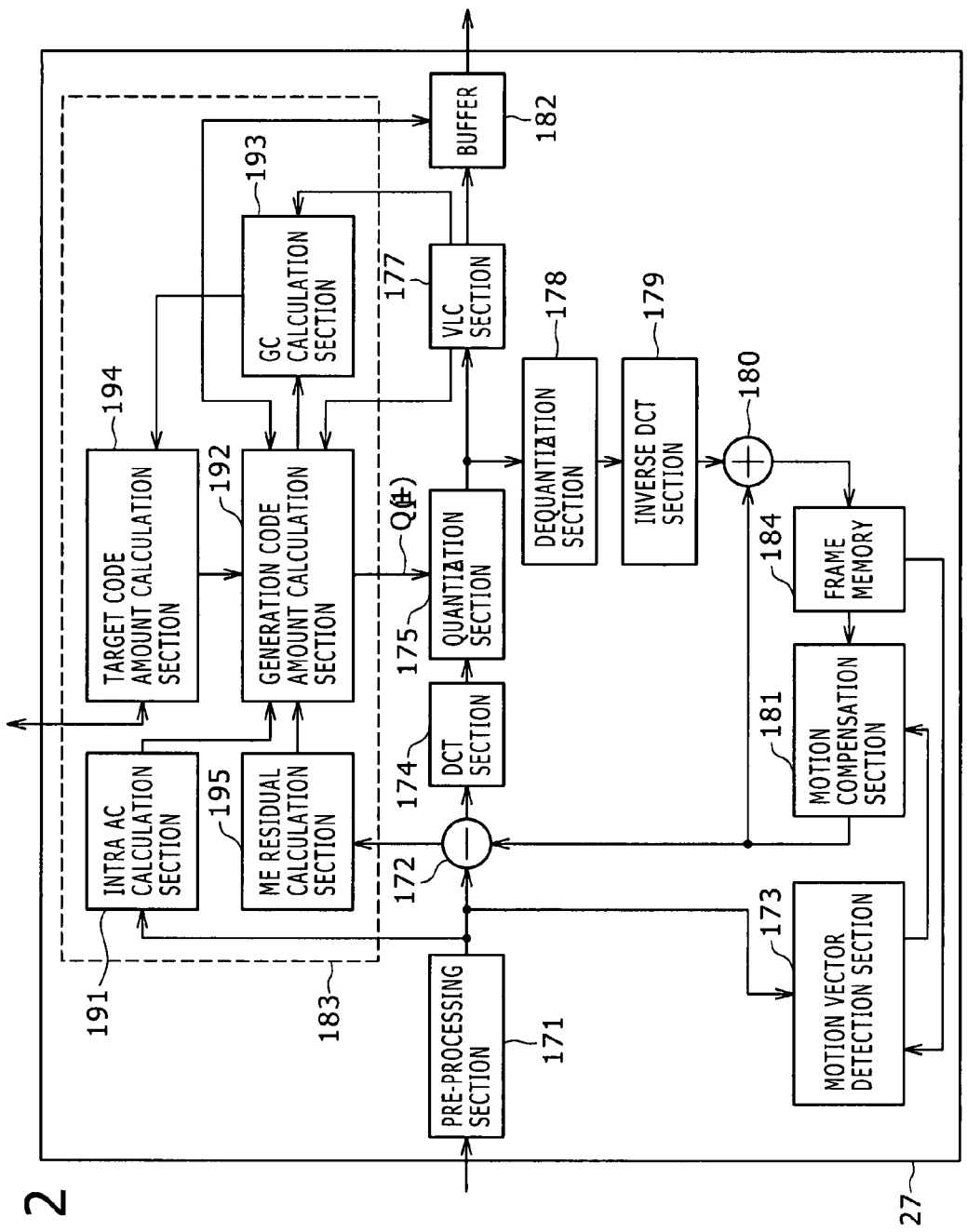
FIG. 12 is a block diagram showing a configuration of an encoder.

FIG. 12 is a block diagram showing a configuration of the encoder 27.

Image data supplied from the outside to the encoder 27 is inputted to a pre-processing section 171. The pre-processing section 171 divides each frame image of the image data successively inputted thereto into macro blocks each formed from luminance signals of 16 pixels×16 lines and color difference signals corresponding to the luminance signals. Then, as occasion demands, the pre-processing section 171 re-arranges the macro blocks or produces macro block data wherein each frame image of the image data is divided into macro blocks each formed from luminance signals of 16 pixels×16 lines and color difference signals corresponding to the luminance signals, and supplies the macro block data to an arithmetic operation section 172, a motion vector detection section 173 and an intra AC calculation section 191 of a quantization control section 183.

The motion vector detection section 173 receives an input of the macro block data, calculates a motion vector of each macro block based on the macro block data and reference image data stored in a frame memory 184 and signals the motion vectors as motion vector data to a motion compensation section 181.

The arithmetic operation section 172 performs motion compensation for the macro block data supplied thereto from the pre-processing section 171 based on the image type of each of the macro blocks. In particular, the arithmetic operation section 172 performs motion compensation for an I picture in an intra mode, performs motion compensation for a P picture in a forward prediction mode, and performs motion compensation for a B picture in a bidirectional prediction mode.

The intra mode is a method wherein a frame image of an object of encoding is used as it is as transmission data; the forward prediction mode is a method wherein prediction residuals between a frame image of an object of encoding and a past reference image are used as transmission data; and the bidirectional prediction mode is a method wherein prediction residuals between a frame image of an object of encoding and reference images in the past and the future are used as transmission data.

First, where the macro block data is an I picture, the macro block data is processed in the intra mode. In particular, the arithmetic operation section 172 signals macro blocks of the macro block data inputted thereto as it is as arithmetic operation data to a DCT (Discrete Cosine Transform) section 174. The DCT section 174 performs a DCT transform process for the arithmetic operation data inputted thereto to convert the arithmetic operation data into DCT coefficients and signals the DCT coefficients as DCT coefficient data to a quantization section 175.

The quantization section 175 performs a quantization process for the DCT coefficient data inputted thereto based on quantization index data Q(j+1) supplied thereto from a generation code amount control section 192 and signals resulting data as quantized DCT coefficient data to a VLC (Variable Length Code) section 177 and a dequantization section 178. The quantization section 175 is configured such that it can control the amount of codes to be generated by adjusting the quantization step size in the quantization process in response to the quantization index data Q(j+1) supplied thereto from the generation code amount control section 192.

The quantized DCT coefficient data signaled to the dequantization section 178 is subject to a dequantization process with a quantization step size equal to that of the quantization section 175 and signaled as DCT coefficient data to a inverse DCT section 179. The inverse DCT section 179 performs an inverse DCT process for the DCT coefficient data supplied thereto, and resulting arithmetic operation data is signaled to an arithmetic operation section 180 and stored as reference image data into the frame memory 184.

On the other hand, when the macro block data is a P picture, the arithmetic operation section 172 performs a motion compensation process according to the forward prediction mode for the macro block data. However, if the macro block data is a B picture, the arithmetic operation section 172 performs a motion compensation process according to the bidirectional prediction mode for the macro block data.

In the forward prediction mode, the motion compensation section 181 motion compensates for the reference image data stored in the frame memory 184 in accordance with the motion vector data to calculate forward prediction image data or bidirectional prediction image data. The arithmetic operation section 172 executes a subtraction process with regard to the macro block data using the forward prediction image data or the bidirectional prediction image data supplied thereto from the motion compensation section 181.

In particular, the motion compensation section 181 displaces, in the forward prediction mode, a read address of the frame memory 184 in response to the motion vector data to read out the reference image data and supplies the reference image data as forward prediction image data to the arithmetic operation section 172 and the arithmetic operation section 180. The arithmetic operation section 172 subtracts the forward prediction image data from the macro block data supplied thereto to obtain difference data as prediction residuals. Then, the arithmetic operation section 172 signals the difference data to the DCT section 174.

As forward prediction image data is supplied from the motion compensation section 181 to the arithmetic operation section 180, the arithmetic operation section 180 adds the forward prediction image data to arithmetic operation data supplied thereto from the inverse DCT section 179 to locally reproduce the reference image data and outputs the reference image data to the frame memory 184 so as to be stored into the frame memory 184.

On the other hand, in the bidirectional prediction mode, the motion compensation section 181 supplies bidirectional prediction image data to the arithmetic operation section 172 and the arithmetic operation section 180. The arithmetic operation section 172 subtracts the bidirectional prediction image data from the macro block data supplied thereto to obtain difference data as prediction residuals. Then, the arithmetic operation section 172 signals the difference data to the DCT section 174.

As bidirectional prediction image data is supplied from the motion compensation section 181 to the arithmetic operation section 180, the arithmetic operation section 180 adds the bidirectional prediction image data to the arithmetic operation data supplied from the inverse DCT section 179 to locally reproduce reference image data.

Thus, the image data inputted to the encoder 27 is subject to a motion compensation prediction process, a DCT process and a quantization process and is supplied as quantized DCT coefficient data to the VLC section 177. The VLC section 177 performs a variable length encoding process for the quantization DCT coefficient data based on a predetermined conversion table and signals variable length encoded data obtained as a result of the variable length encoding process to a buffer 182. Further, the VLC section 177 signals generation code amount data B(j) representative of encoded generated bit numbers of the individual macro blocks to the generation code amount control section 192 of the quantization control section 183 and a GC (Global Complexity) calculation section 193.

The GC calculation section 193 successively accumulates the generation code amount data B(j) for each macro block, and cumulatively adds, at a point of time at which all of the generation code amount data B(j) for one picture are accumulated, the generation code amount data B(j) for all macro blocks to calculate a generation code amount for one picture.

Then, the GC calculation section 193 calculates the product of the generation code amount for one picture and the average value of the quantization step size to determine GC data representative of the difficulty (hereinafter referred to as GC) of the image, and supplies the GC data to a target code amount calculation section 194. The GC data is one of barometers which represent the degree of difficulty in encoding.

The target code amount calculation section 194 performs calculation of a target generation code amount under the control of the CPU 20. In particular, the target code amount calculation section 194 calculates, under the control of the CPU 20, target generation code amount data of a next picture based on the GC data supplied thereto from the GC calculation section 193 so that the generation code amount of a picture in the proximity of an editing point increases and the generation code amount of a picture within an extended re-encoding range decreases as occasion demands. Then, the target code amount calculation section 194 signals the calculated target generation code amount data to the generation code amount control section 192.

An ME residual calculation section 195 calculates ME residual information based on the macro block data inputted thereto and outputs the ME residual information to the generation code amount control section 192. Here, the ME residual information is calculated for each unit of a picture and is a total value of difference values of the luminance between adjacent preceding and succeeding pictures. The ME residual information is one of the barometers which represent the degree of difficulty in encoding.

The intra AC calculation section 191 calculates an intra AC and signals the intra AC to the generation code amount control section 192.

The intra AC is a parameter defined as a sum total of image data and dispersion values of individual DCT blocks of a DCT processing unit according to the MPEG system and represents complexity of an image, and has a correlation with the difficulty in design pattern and the data amount after compression. In particular, the intra AC is a sum total within a screen of absolute value sums each obtained by subtracting an average value of pixel values of each block from pixel values of pixels in a unit of a DCT block.

The generation code amount control section 192 normally supervises the accumulation state of variable length encoded data stored in the buffer 182 and determines a quantization step size based on occupation amount information representative of the accumulation state.

Further, the generation code amount control section 192 calculates based on the ME residual supplied from the ME residual calculation section 195 and the intra AC supplied from the intra AC calculation section 191 whether or not the degree of difficulty in encoding is high. Then, for a picture having a high degree of difficulty in encoding, the generation code amount control section 192 decreases the quantization step size in order to increase the generation code amount. However, where the actually generated amount of the generation code amount data B(j) of the macro block is greater than that of a target generation code amount data Tpi, the generation code amount control section 192 increases the quantization step size in order to decrease the generation code amount, but where the actually generated amount of the generation code amount data B(j) is smaller than that of the target generation code amount data Tpi, the generation code amount control section 192 decreases the quantization step size in order to increase the generation code amount.

The quantization section 175 determines the quantization step size for a next macro block based on the quantization index data Q(j+1) and quantizes the DCT coefficient data with the quantization step size.

Consequently, the quantization section 175 can quantize the DCT coefficient data with a quantization step size optimum to the target generation code amount for the next picture calculated based on the actual generation code amount data B(j) of the immediately preceding picture.

Thus, the quantization section 175 can quantize the DCT coefficient data in response to the data occupation amount of the buffer 182 so that the buffer 182 may not overflow or underflow and can produce quantization DCT coefficient data quantized so that the VBV buffer on the decoder side may not overflow or underflow.

It is to be noted that the encoder 27 need not have the detection section of all degrees of difficulty in encoding described in FIG. 12 or the acquisition section of the degrees of difficulty in encoding if it has, from among the functions described hereinabove, at least one of the function of detecting the degrees of difficulty in encoding and the function which can acquire the degrees of difficulty in encoding and control the generation code amount.

The encoder 27 can control the generation code amount to encode data in this manner.

Now, operation of the editing apparatus 1 according to the third embodiment is described.

The CPU 11 controls the south bridge 15 to read out compression encoded data of the compressed material image 1 and compression encoded data of the compressed material image 2 from the HDD 16 based on an operation input of a user supplied thereto from the operation inputting section not shown and supply the read out data through the north bridge 12, PCI bus 14 ad PCI bridge 17 to the memory 18 so as to be stored. Further, the CPU 11 controls the south bridge 15 to supply information representative of an editing point and a command indicative of starting of editing to the CPU 20 through the north bridge 12, PCI bus 14, PCI bridge 17 and control bus 19.

The CPU 20 determines a range for which re-encoding is to be performed or determines a temporary range for which re-encoding is to be performed in advance from within the data of the compressed material image 1 and the data of the compressed material image 2 based on the information indicative of the editing point supplied thereto from the CPU 11.

In particular, the CPU 20 determines the start point of a minimum interval for which re-encoding is performed in the compressed material image 1 such that the picture type of the last picture in the display order of compressed images in a portion for which re-encoding is not performed and which is to be spliced to the front of a partly re-encoded compressed image may be an I picture or a P picture in a similar manner as in the second embodiment.

More particularly, the CPU 20 determines the start point of a minimum interval for which re-encoding is performed, for example, at a B picture 36 next to a P picture 35 in the compressed material image 1 so that the picture type of the last picture in the display order of the compressed material image 1 in a portion for which re-encoding is not preformed in the minimum re-encoding interval may be a P picture 46 as described hereinabove with reference to FIG. 9. In other words, the CPU 20 can make it possible to facilitate an encoding process by setting a compressed image in a portion in which re-encoding is not performed may be an end position of a GOP.

Further, the CPU 20 determines the end point of the minimum interval for which re-encoding is performed such that the picture type of the first picture in the display order of the compressed images in the portion for which re-encoding is not performed and which is spliced next to the partly re-encoded compressed image may be an I picture.

In other words, the CPU 20 determines the end point of the minimum interval for which re-encoding is performed, for example, at a B picture 39 preceding to an I picture 40 such that the picture type of the first picture in the display order of the compressed material image 2 in a minimum portion for which re-encoding is not performed may be an I picture 47 as described hereinabove with reference to FIG. 9.

Then, where the generation code amount to be allocated to the editing GOP duration and the extension amount of the re-encoding interval are determined in advance before re-encoding is performed by the encoder 27, the CPU 20 determines the occupancy difference value described hereinabove with reference to the equation (1) which is a value obtained by subtracting the VBV occupancy of an I picture next to the editing GOP duration from the VBV occupancy of a picture at the start point of the editing GOP duration which is a minimum GOP including the editing duration. Then, when the occupancy difference value is in the negative, since the code amount which can be used in the editing interval is smaller than the average value obtained from the bit rate, the CPU 20 increases the re-encoding interval in response to the average value of the occupancy difference value.

The increasing amount of the re-encoding interval can be calculated based on the occupancy difference value. The increasing amount of the re-encoding interval can be calculated using, for example, the next expression (2).

$$k\_1 \times |vbv\_edit\_gop\_start vbv\_edit\_last\_i|/bit\_rate \qquad (2)$$

Here, $k\_1$ is a coefficient determined empirically or experimentally in order to determine the gradient of increase of the re-encoding interval. Further, the unit of the increase of the re-encoding interval may be increased, for example, in a unit of a GOP. Further, the CPU 20 does not increase the re-encoding interval when the occupancy different value is not in the negative.

Further, the CPU 20 detects, based on an instruction relating to editing supplied thereto from the CPU 11 whether or not it is instructed to apply an effect to a portion in the proximity of the editing point and, where an effect is to be applied, which one of effects is to be used. Then, the CPU 20 refers to a table stored in the memory 21 or uses a predetermined calculation expression to acquire a degree of difficulty in encoding corresponding to the type of the effect and extend the re-encoding interval to the front and the rear of the editing GOP duration based on the acquired degree of difficulty in encoding.

At this time, the CPU 20 determines the code amount to be allocated to the editing duration from the re-encoding interval outside the editing duration based on the rate of rise of the degree of difficulty in encoding. At this time, since the code amount to be allocated to the editing duration has an upper limit, for example, the following expression (3) is used to determine the code amount bit_supplement to be allocated to the editing duration so that the code amount may be equal to or lower than the upper limit.

$$bit\_supplement = min(k\_2 \times difficulty\_variation \times \\ editing\_length, bit\_supplement\_start\_max + bit\_ \\ supplement\_end\_max) \qquad (3)$$

Here, $k\_2$ is a coefficient which defines a code distribution amount ratio to the rate of rise of the degree of difficulty in encoding and is decided experimentally or empirically. difficulty_variation is a coefficient corresponding to the degree of difficulty in encoding, and editing_length is a value corresponding to the length of the editing duration. Further, bit_supplement_start_max is a maximum value of the code amount to be allocated to a portion of the editing duration from a picture included in the re-encoding interval temporally extended to the front with respect to the editing duration, and bit_supplement_end_max is a maximum value of the code amount to be allocated to a portion of the editing duration from a picture included in the re-encoding interval temporally extended to the rear with respect to the editing duration.

Where the code amount to be allocated to the portion of the editing duration from the picture included in the re-encoding interval temporally extended to the front with respect to the editing duration is represented by bit_supplement_start; the code amount to be allocated to the portion of the editing duration from the picture included in the re-encoding interval temporally extended to the rear with respect to the diting duration is represented by bit_supplement_end; and the rate of the code amount to be decreased from the re-encoding interval outside the editing duration in order to allocate a code amount to the editing duration from the extended re-encoding interval other than the editing duration is represented by substract_ratio, the length of the re-encoding interval outside the Editing duration, that is, the smallest picture number P1 necessary for the re-encoding interval preceding to the editing duration and the smallest picture number P2 necessary for the re-encoding interval succeeding the editing duration are determined from the code amount to be allocated to the editing duration in accordance with the following expressions (4) and (5).

$$P1 = picture\_rate \times bit\_supplement\_start / (bit\_rate \times substract\_ratio) \quad (4)$$

$$P2 = picture\_rate \times bit\_supplement\_end / (bit\_rate \times substract\_ratio) \quad (5)$$

Here, since both of P1 and P2 must be integers, where results of the arithmetic operation are not integers, P1 and P2 are given as values obtained by rounding up the decimal fractions. Further, where re-encoding is performed in a unit of a GOP, a value which is higher than the picture numbers calculated in accordance with the expressions (4) and (5) and with which the re-encoding interval is given in a unit of a GOP is determined as a picture number in the re-encoding interval preceding to the editing duration.

Further, where the CPU 20 determines the generation code amount to be allocated to the Editing GOP duration and the extension amount of the re-encoding interval in parallel to re-encoding performed by the encoder 27, the CPU 20 temporarily calculates only the length of the extension of the re-encoding interval to be extended to the front with respect to the editing duration the code amount to be allocated to the editing duration from the re-encoding interval extended to the front or sets a predetermined fixed value as the code amount, and then determines, by later processing, the length of the extension of the re-encoding interval to be extended to the rear with respect to the editing duration and determines the code amount to be allocated to the editing duration from the re-encoding interval extended to the rear in parallel to re-encoding performed by the encoder 27.

In this manner, the CPU 20 determines or temporarily determines an extension of the re-encoding interval prior to execution of the encoding process.

Figure 13:
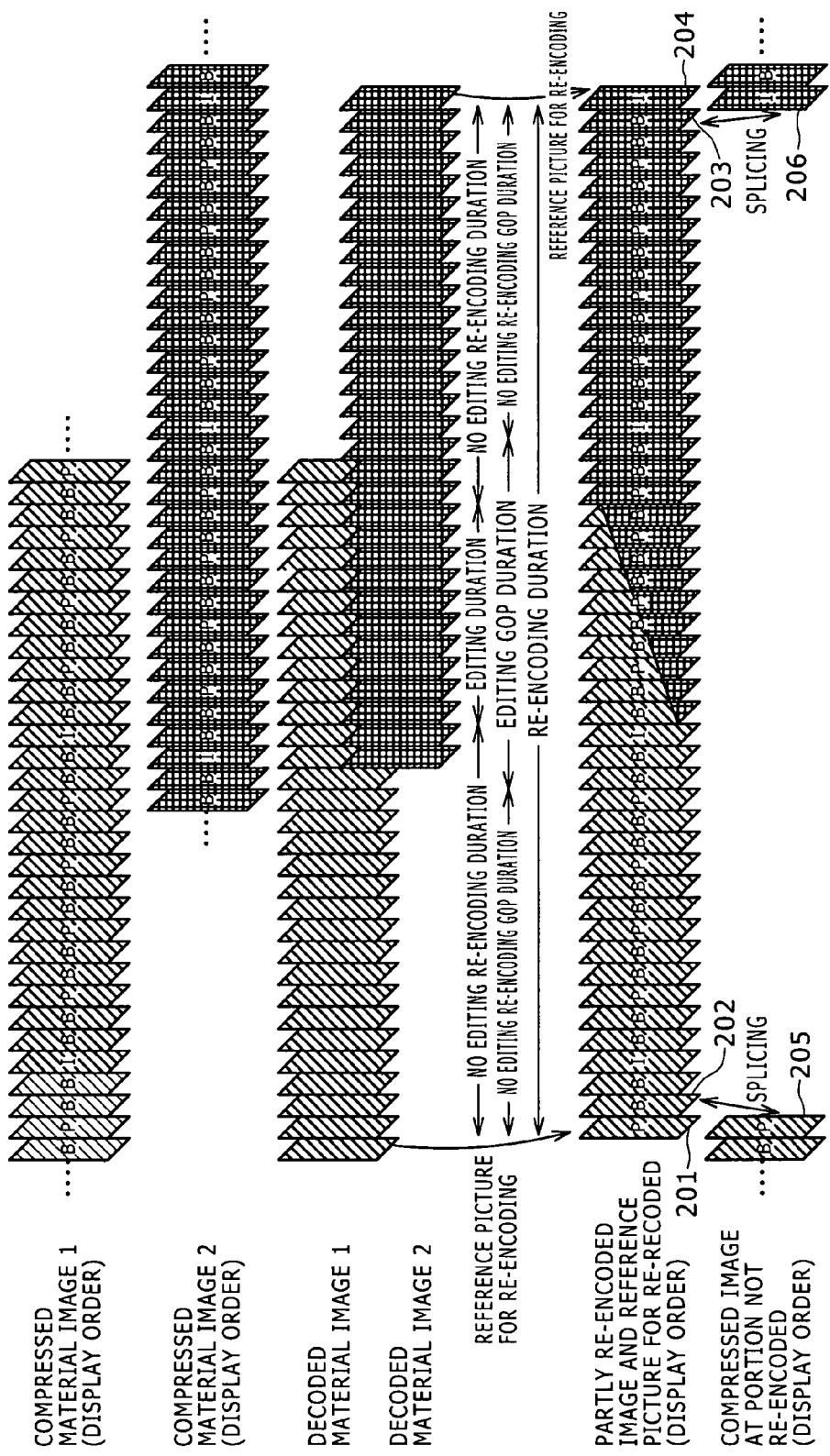
FIG. 13 is a view illustrating extension of a re-encoding range.

As shown in FIG. 13, the entire extended re-encoding interval determined by the CPU 20 is hereinafter referred to as re-encoding duration, and a portion of the re-encoding duration other than the editing duration is hereinafter referred to as no editing re-encoding duration. Further, a portion of the re-encoding duration other than the editing GOP duration is hereinafter referred to as no editing re-encoding GOP duration.

Although there is the possibility that the picture quality may be deteriorated with pictures within a range of the no editing re-encoding duration in which the generation code amount is reduced, if the decreasing amount of the generation code amount is small, then the deterioration of the picture quality can be suppressed to such a degree that it can be ignored visually. Therefore, the range of the no editing re-encoding duration is preferably set to such a wide range that deterioration of the picture quality of pictures within the range of the no editing re-encoding duration can be ignored visually. In particular, k_1 in the expression (2) above is preferably determined empirically or experimentally as a value with which the no editing re-encoding duration can be set to such a wide range that degradation of the picture quality of pictures within the no editing re-encoding duration can be ignored visually.

Then, the CPU 20 controls the PCI bridge 17 to supply, from among data of the compression encoded compressed material image 1 stored in the memory 18, data of those pictures included in the re-encoding duration which is a range within which re-encoding is to be performed and data of those pictures which need be referred to in order to decode the pictures included in the re-encoding duration to the decoder 22 and supply, from among data of the compressed material image 2, data of those pictures included in the re-encoding duration and those pictures which need be referred to in order to decode the pictures included in the re-encoding duration to the decoder 23.

Further, at this time, the CPU 20 controls the PCI bridge 17 to supply those pictures within the region which re-encoding is not performed from among the compression encoded data of the compressed material image 1 and the compressed material image 2 stored in the memory 18 to the stream splicer 25.

The CPU 20 controls the decoder 22 and the decoder 23 to decode the compression encoded data supplied thereto.

The decoder 22 and the decoder 23 decode the data supplied thereto and supply signals of the material image 1 and the material image 2 obtained by the decoding to the effect/switch 26 under the control of the CPU 20.

Further, the decoder 22 and the decoder 23 can extract information necessary for control of the encoding process by the encoder 27 such as, for example, the degree of difficulty in encoding acquired upon decoding and supply the information to the CPU 20 through the control bus 19 as occasion demands.

The effect/switch 26 splices non-compressed signals of the decoded material image 1 and the decoded material image 2 at a predetermined cut (Cut) editing point (splice point) under the control of the CPU 20 and applies an effect to pictures within the range of the editing duration as occasion demands to produce a non-compressed editing image signal for re-encoding. Then, the effect/switch 26 supplies the non-compressed image signal to the encoder 27 together with a re-encoding reference image necessary for re-encoding.

The CPU 20 acquires information of the number n of successive B pictures positioned last in the display order in the re-encoding duration, which is a range for which re-encoding is performed, in the compressed material image 2 in a similar manner as in the case of the second embodiment described hereinabove. Since the picture type of the first picture in the display order of the compressed material image 2 in the portion for which re-encoding is not performed is determined so as to be an I picture as described hereinabove, the number n of B pictures is the number of those B pictures which exist between the first I picture in the display order of the compressed material image 2 in the portion for which re-encoding is not performed and an I picture or a P picture which exists immediately preceding to the I picture after editing.

Further, the CPU 20 acquires information of the picture type of the I picture or P picture which exists immediately preceding to the first I picture in the display order of the compressed material image 2 in the portion for which re-encoding is not performed, or in other words, the picture type of an I picture or a P picture which exists last within the range for which re-encoding is performed.

Then, the CPU 20 controls the encoder 27 so that, in the process executed by the encoder 27, the number of B pictures in the proximity of the re-encoding end point becomes equal to that of the compressed material image 2 before editing and the picture type of a picture immediately preceding to the B pictures may be an I picture or a P picture. Further, the CPU 20 preferably controls the encoder 27 so that also the picture type of the picture immediate preceding to the B pictures is same as that of the compressed material image 2 before editing.

In other words, the CPU 20 determines the picture types before and after editing in the proximity of the splicing point between the range for which re-encoding is performed and the range for which re-encoding is not performed in a similar manner as in the case described hereinabove with reference to FIG. 9.

Then, the encoder 27 encodes the non-compressed editing image signal for re-encoding supplied thereto from the effect/switch 26 under the control of the CPU 20.

Where the re-encoding interval is extended based on the fact that the occupancy difference value is in the negative or based on the type of an effect to be applied to the editing duration, the code amount allocation of pictures may be performed such that, for example, where a TM5 is used to control the generation code amount, a value calculated in accordance with an expression (6) is added to a code amount R to be allocated to pictures which are not yet encoded within the GOP when the code amount R is updated at the top picture in the GOP.

$$(vbv\_re\_enc\_start - vbv\_re\_enc\_last\_i) \times N\_gop/N\_total\_gop \quad (6)$$

Here, vbv_re_enc_start is the VBV buffer occupancy at the start point of the re-encoding duration, and vbv_re_enc_last_i is the VBV buffer occupancy of an I picture for which re-encoding is not performed immediately preceding to the end point of the re-encoding duration. Further, N_gop is the picture number in the GOP, and N_total_gop is the number of pictures to be re-encoded obtained by subtracting the number N of B pictures within the range to the I picture for which re-encoding is not performed immediately preceding to the end point of the re-encoding duration from the number of pictures of the re-encoding duration.

Encoding in a case wherein a re-encoding interval is extended and another case wherein a re-encoding interval is not extended is described with reference to FIG. 14.

In FIG. 14A, pictures 21 to 214 are I pictures and have a great amount of code generation. As shown in FIG. 14A, when a re-encoding interval is not extended, that is, when a re-encoding duration is determined with respect to an editing GOP duration in a similar manner as in the case of the second embodiment described hereinabove, the occupancy 216 of the picture 212 is controlled so as to be same as that before editing, and the occupancy 217 of the picture 213 which is an I picture which is not re-encoded is controlled so as to be same as that before editing while pictures 219 and 220 to be re-encoded are encoded as B pictures and the occupancy 218 of a picture 221 which is a P picture which is not re-encoded is controlled so as to be same as that before editing.

Here, where the occupancy difference value is calculated using the expression (1) given hereinabove based on the occupancy 216 of the picture 212 and the occupancy 217 of the picture 213 and it is decided that the occupancy difference value is in the negative and therefore the re-encoding interval is extended or an effect is applied to an interval 215 and the degree of difficulty in encoding is raised and therefore the re-encoding interval is extended, the re-encoding duration is extended to the front and the rear thereof as shown in FIG. 14B with respect to the editing GOP duration.

At this time, the occupancy 225 of the picture 211 is controlled so as to be same as that before editing, and the occupancy 234 of the picture 214 which is an I picture which is not re-encoded is controlled so as to be same as that before editing while pictures 235 and 236 which are to be re-encoded are encoded as B pictures and the occupancy 238 of a picture 237 which is a P picture which is not re-encoded is controlled so as to be same as that before editing.

Then, the occupancy 226 of the picture 212 of the editing GOP duration increases from that in the case of FIG. 14A because of re-allocation of the generation code amount. Further, a picture 223 which is an I picture next to the picture 212 is re-encoded, and the occupancy 228 thereof is calculated in accordance with an ordinary algorithm.

Further, in order to satisfy a restriction to the VBV, a maximum value of the code amount which can be allocated from the no editing re-encoding duration to the editing duration is limited. An allocatable code amount is described with reference to FIGS. 15A to 15B.

In FIG. 15A, pictures 251 to 254 are I pictures and have a great amount of code generation. As shown in FIG. 15A, when a re-encoding interval is not extended, that is, when a re-encoding duration is determined with respect to an editing GOP duration in a similar manner as in the second embodiment described hereinabove, the occupancy 255 of the picture 252 is controlled so as to be same as that before editing, and the occupancy 258 of the picture 253 which is an I picture which is not re-encoded is controlled so as to be same as that before editing while pictures 261 and 262 which are to be re-encoded are encoded as B pictures and the occupancy 259 of a picture 263 which is a P picture which is not re-encoded is controlled so as to be same as that before editing.

At this time, the generation code amount which is allocated from the no editing re-encoding duration preceding to the editing duration to the editing GOP duration exhibits a maximum value when the VBV occupancy 255 of the picture 252 which is the first picture of the editing GOP duration is equal to a maximum value of the VBV buffer. Therefore, the maximum value of the generation code amount which can be allocated from the re-encoding interval preceding to the editing duration is the difference between the maximum value of the VBV buffer and the VBV occupancy 255 of the first picture of the editing GOP duration of the compressed material image 1. However, it is necessary to provide the maximum value with a margin so that an overflow may not occur with any pictures preceding to the editing GOP duration. Therefore, the maximum allocation value may be determined as a value obtained by subtracting the VBV occupancy 255 of the first picture of the editing GOP duration of the compressed material image 1 from the maximum value of the VBV buffer and further subtracting a predetermined margin from the difference value.

Similarly, the generation code amount which is allocated from the re-encoding duration succeeding the editing duration to the editing GOP duration exhibits a maximum value when the VBV occupancy 257 after decoding of the last picture of the editing GOP duration, that is, a picture 256 immediately preceding to the picture 253 which is an I picture which is not re-encoded and which immediately precedes to the end point of the re-encoding duration, is zero. Therefore, the maximum value of the generation code amount which can be allocated from the no editing re-encoding duration succeeding the editing duration is a value obtained by subtracting the generation code amount of the last picture of the editing duration of the compressed material image 2 from the VBV occupancy of the picture, that is, a value indicated by the occupancy 257 in the figure. However, it is necessary to provide the maximum value with a margin so that an underflow may not occur with any pictures succeeding the editing duration. Therefore, the maximum allocation value is determined as a value obtained by subtracting a predetermined margin from a value which is obtained by subtracting, from the VBV occupancy after decoding of the picture 256 which is the last picture of the editing duration of the compressed material image 2, the generation code amount of the picture, that is, the VBV occupancy 257 of the picture after decoding.

Then, as shown in FIG. 15B, where the re-encoding interval is extended, the occupancy 251 of a picture 271 is controlled so as to be same as that before the editing and the occupancy 278 of the picture 254 which is an I picture which is not re-encoded is controlled so as to be same as that before editing while pictures 281 and 282 which are to be re-encoded are encoded as B pictures and the occupancy 286 of a picture 283 which is a P picture which is not re-encoded is controlled so as to be same as that before editing.

Then, the occupancy 272 of the picture 252 of the editing GOP duration does not overflow even if the generation code amount is increased from that in the case of FIG. 15A corresponding to the maximum allocation amount shown in FIG. 15A as a result of re-allocation of the generation code amount. Further, the occupancy 273 of the picture 256 immediately preceding to the picture 253 which is an I picture next to the picture 252 increases from that in the case of FIG. 15A corresponding to the maximum allocation amount shown in FIG. 15A. Then, the picture 253 which is an I picture next to the picture 252 is re-encoded, and even if the occupancy 275 is calculated in accordance with an ordinary algorithm, the occupancy 276 after re-decoding does not underflow.

Further, where the CPU 20 determines a generation code amount to be allocated to the editing GOP duration and an extension amount of the re-encoding interval in parallel to re-encoding performed by the encoder 27, the CPU 20 acquires the degree of difficulty in encoding of the no editing re-encoding GOP duration preceding to the editing GOP duration from the CPU 11, decoder 22 or encoder 27 and further acquires information of the degree of difficulty in encoding of the editing GOP duration from the encoder 27. Then, the CPU 20 decides whether or not the degree of difficulty in encoding exhibits an increase, and calculates, based on a result of the decision, the code amount to be allocated to the editing GOP duration from the length of the no editing re-encoding GOP duration succeeding the editing GOP duration and the no editing re-encoding GOP duration succeeding the editing GOP duration.

Here, as the barometer of the degree of difficulty in encoding supplied from the encoder 27 to the CPU 20, a Global Complexity Measure calculated by the GC calculation section 193 described hereinabove with reference to FIG. 12, an intra AC (sometimes called Intra MAD, which is a synonym) calculated by the intra AC calculation section 191, an ME residual calculated by the ME residual calculation section 195 or the like is used.

Then, image data re-encoded by the encoder 27 is supplied to the stream splicer 25. The stream splicer 25 splices the compressed material image 1 and the compressed material image 2 within the range for which re-encoding is not performed from among the data of the compressed material image 1 and the compressed material image 2 supplied from the PCI bridge 17 with the encoded image data supplied from the encoder 27 under the control of the CPU 20 to produce compressed editing image data.

More particularly, the stream splicer 25 splices the streams with each other under the control of the CPU 20 such that a P picture 205 of the compressed material image 1 in the portion shown in FIG. 13 for which re-encoding is not performed and supplied from the PCI bridge 17 and a B picture 202 of the encoded image data supplied from the encoder 27 are continuous to each other in the display order and such that a B picture 203 of the encoded video data supplied from the encoder 27 and an I picture 206 of the compressed material image 2 supplied from the PCI bridge 17 are continuous to each other in the display order. Then, the stream splicer 25 splices the streams with each other such that a P picture 201 and an I picture 204 which are reference images for re-encoding are abandoned, that is, the stream splicer 25 splices the streams such that an I picture which is not re-encoded may be positioned preceding to n re-encoded B pictures succeeding the last I picture or P picture within the re-encoded interval in the coding order.

Then, the stream splicer 25 supplies the produced compressed editing image data to the PCI bridge 17 under the control of the CPU 20 so as to be stored into the memory 18 and supplies the produced compressed editing image data to the decoder 24 so that the compressed editing image data is decoded by the decoder 24 and outputted to and displayed on a monitor for confirmation of a result of editing.

Through such a process as described above, according to the third embodiment, when the picture type upon editing is controlled by a process similar to that in the case of the second embodiment described hereinabove, as occasion demands, a re-encoding interval is extended to change the code allocation. Consequently, deterioration of the picture quality in the proximity of an editing point can be prevented.

Also here, the decoding range may be determined separately from the re-encoding range based on the re-encoding range. In other words, the decoding range may be a range same as the re-encoding range or may be a range greater than and including the re-encoding range.

Further, also when the picture type upon editing is controlled through a process similar to that in the case of the first embodiment described hereinabove with reference to FIGS. 5 to 8, the control of the code generation amount according to the third embodiment can be applied in a similar manner as in the case described hereinabove. In the following, description is given principally of those of a process, in which a process of the third embodiment is applied to the case of the first embodiment, which are different from those of the process described hereinabove, and description of those portions of the process in which basically similar processing is executed is omitted suitably.

Also when the picture type upon editing is controlled by a process similar to that in the case of the first embodiment, it is necessary to control the occupancy in the proximity of a splicing point between a portion for which re-encoding is performed and another portion for which re-encoding is not performed so that the occupancy of the VBV buffer may be continuous. Usually, since the generation code amount of an I picture is great, the occupancy has a low value at the top of a GOP and becomes high in the rear half of the GOP. Where an equal code amount (picture number of 1 GOP×bit_rate/frame_rate) is allocated in a unit of a GOP, the Occupancies of top I pictures of GOPs are equal to each other. Accordingly, where an equal code amount cannot be allocated in a unit of a GOP, it can be decided by comparing the Occupancies at the top of a GOP for which re-encoding is performed and the top of a next GOP with each other whether the code amount which can be used in the GOP is greater or smaller than an average. In other words, by comparing the VBV Occupancies of an I picture at a start point of re-encoding and an I picture succeeding an end point of the re-encoding with each other in a similar manner to that described hereinabove, it can be decided whether or not the supposed original code amount is generated.

Accordingly, by determining an occupancy difference value which is a value obtained by subtracting the VBV occupancy of an I picture which is not re-encoded immediately next to an end portion of re-encoding of the compressed material image 2 before editing, or in other words, a picture before editing corresponding to an I picture next to the editing GOP duration from the VBV occupancy of a picture corresponding to a start point of re-encoding of the compressed material image 1 before editing, or in other words, a picture before editing corresponding to an I picture at the top of the editing GOP duration, it can be decided before actual encoding is performed whether or not the code amount which can be used in the editing duration is smaller than an average value obtained from the bit rate.

Accordingly, where the code amount which can be used in the editing GOP duration is smaller than an average value, the CPU 20 extends the re-encoding interval to the front and the rear of the editing GOP duration similarly and controls the encoder 27 to increase the generation code amount to be allocated to the editing GOP duration.

Further, where, also in the memory 21, either a table indicative of a relationship between types of the effect and rates of rise of the degree of difficulty in encoding is stored in advance, or coefficients corresponding to types of the effect and a calculation expression by which a value corresponding to a degree of difficulty in encoding can be calculated using the coefficients are stored in advance similarly, the CPU 20 refers to the table stored in the memory 21 or uses the predetermined calculation expression to acquire a degree of difficulty in encoding corresponding to the type of the effect. Then, the CPU 20 causes, based on the degree of difficulty in encoding, the re-encoding interval to be extended to the front and the rear of the editing GOP duration and causes data within a decoding range determined from the extended and set range of the re-encoding duration to be decoded and spliced and then supplied to the encoder 27. Then, the CPU 20 can control the encoder 27 to decrease the generation code amount to be allocated to the no editing re-encoding duration and increase the generation code amount to be applied to the editing GOP duration.

Encoding in a case wherein a re-encoding interval is not extended and another case wherein a re-encoding interval is extended is described with reference to FIGS. 16A and 16B.

In FIG. 16A, pictures 301 to 304 are I pictures and have a great amount of code generation. As shown in FIG. 16A, when a re-encoding interval is not extended, that is, when a re-encoding duration is determined with respect to an editing GOP duration in a similar manner as in the case of the first embodiment described hereinabove, the occupancy 305 of the picture 302 is controlled so as to be same as that before editing, and a picture 308 which is a P picture is controlled so as to be disposed immediately succeeding the picture 303 which is an I picture which is not re-encoded while the occupancy 309 of the picture 308 is controlled so as to be same as that before editing.

Here, where the occupancy difference value is calculated using the expression (1) given hereinabove based on the occupancy 305 of the picture 302 and the occupancy 306 of the picture 303 and it is decided that the occupancy difference value is in the negative and therefore the re-encoding interval is extended or an effect is applied to an interval 310 and the degree of difficulty in encoding is raised and therefore the re-encoding interval is extended, the re-encoding duration is extended to the front and the rear thereof as shown in FIG. 16B with respect to the editing GOP duration.

At this time, the occupancy 321 of the picture 301 is controlled so as to be same as that before editing, and a picture 327 which is a P picture is controlled so as to be positioned immediately succeeding the picture 304 which is an I picture which is not re-encoded while the occupancy 328 of a picture 327 is controlled so as to be same as the occupancy 312 (FIG. 16A) of the corresponding picture 311 before editing.

Then, the occupancy 322 of the picture 302 of the editing GOP duration increases from that in the case of FIG. 16A because of re-allocation of the generation code amount. Further, the picture 303 which is an I picture next to the picture 302 is re-encoded, and the occupancy 323 thereof and the picture type of a picture succeeding the picture 303 are determined in accordance with an ordinary algorithm.

Further, in order to satisfy a restriction to the VBV, a maximum value to the code amount which can be allocated from the no editing re-encoding duration to the editing duration is limited. An allocatable code amount is described with reference to FIGS. 17A and 17B.

In FIG. 17A, pictures 341 to 344 are I pictures and have a great amount of code generation. As shown in FIG. 17A, when a re-encoding interval is not extended, that is, when a re-encoding duration is determined with respect to an editing GOP duration in a similar manner as in the first embodiment described hereinabove, the occupancy 345 of the picture 342 is controlled so as to be same as that before editing, and a P picture 347 is controlled so as to be disposed immediately succeeding the picture 343 which is an I picture which is not re-encoded while the occupancy 348 of the P picture 347 is controlled so as to be same as that before editing.

At this time, the generation code amount which is allocated from the no editing re-encoding duration preceding to the editing duration to the editing GOP duration exhibits a maximum value when the VBV occupancy 345 of the picture 342 which is the first picture of the editing GOP duration is equal to a maximum value of the VBV buffer. Therefore, the maximum value of the generation code amount which can be allocated from the re-encoding interval preceding to the editing duration is the difference between the maximum value of the VBV buffer and the VBV occupancy 345 of the first picture of the editing GOP duration of the compressed material image 1. However, it is necessary to provide the maximum value with a margin so that an overflow may not occur with any pictures preceding to the editing GOP duration. Therefore, the maximum allocation value may be determined as a value obtained by subtracting the VBV occupancy 345 of the first picture of the editing GOP duration of the compressed material image 1 from the maximum value of the VBV buffer and further subtracting a predetermined margin from the difference value.

Similarly, the generation code amount which is allocated from the re-encoding duration succeeding the editing duration to the editing GOP duration exhibits a maximum value when the VBV occupancy 362 after decoding of a picture 361 (shown in a circle in the figure) immediately preceding to a picture 343 which is derived from the last picture of the editing GOP duration, that is, an I picture which immediately precedes to the end point of the re-encoding duration and is not re-encoded, but is encoded as a result of extension of the re-encoding range, is zero. Therefore, the maximum value of the generation code amount which can be allocated from the no editing re-encoding duration succeeding the editing duration is a value obtained by subtracting the generation code amount of the last picture of the editing duration of the compressed material image 2 from the VBV occupancy of the picture. However, it is necessary to provide the maximum value with a margin so that an underflow may not occur with an I picture succeeding the editing duration. Therefore, the maximum allocation value is determined as a value obtained by subtracting a predetermined margin from a value which is obtained by subtracting, from the VBV occupancy 362 after decoding of the picture 361 which is the last picture of the editing duration of the compressed material image 2, the generation code amount of the picture, that is, the VBV occupancy 362 of the picture after decoding.

Then, as shown in FIG. 17B, where the re-encoding interval is extended, the occupancy 371 of the picture 341 is controlled so as to be same as that before the editing and a P picture 380 is controlled so as to be disposed immediately succeeding the picture 344 which is an I picture which is not re-encoded while the occupancy 381 of the P picture 380 is controlled so as to be same as the occupancy 350 (FIG. 7A) of a P picture 349 which is a corresponding picture before editing.

Then, the occupancy 372 of the picture 342 of the editing GOP duration does not overflow even if the generation code amount is increased from that in the case of FIG. 17A corresponding to the maximum allocation amount shown in FIG. 17A as a result of re-allocation of the generation code amount. Further, the picture 343 which is an I picture next to the picture 342 is re-encoded, and even if the occupancy 363 of the picture 343 and the picture type of a succeeding picture are set in accordance with an ordinary algorithm, the occupancy 364 of the picture 343 after decoding does not underflow.

In particular, in the case of FIG. 17B wherein the re-encoding interval is extended, the picture type in the last portion of the editing GOP duration is changed when compared with that in the case of FIG. 17A. In particular, as a result of extension of the re-encoding interval, a last portion of the editing GOP duration is re-encoded (changes to a portion different from the last portion of the re-encoding interval), and therefore, the picture type at the portion is determined in accordance with an ordinary algorithm. Consequently, the picture type at the portion becomes same as that of the compressed material before editing. Therefore, where a maximum value of the allocation amount of codes to be provided to the last portion of the editing GOP duration is considered, a process similar to that in the case of the application to the second embodiment described hereinabove with reference to FIGS. 15A and 15B are executed.

Figure 18:
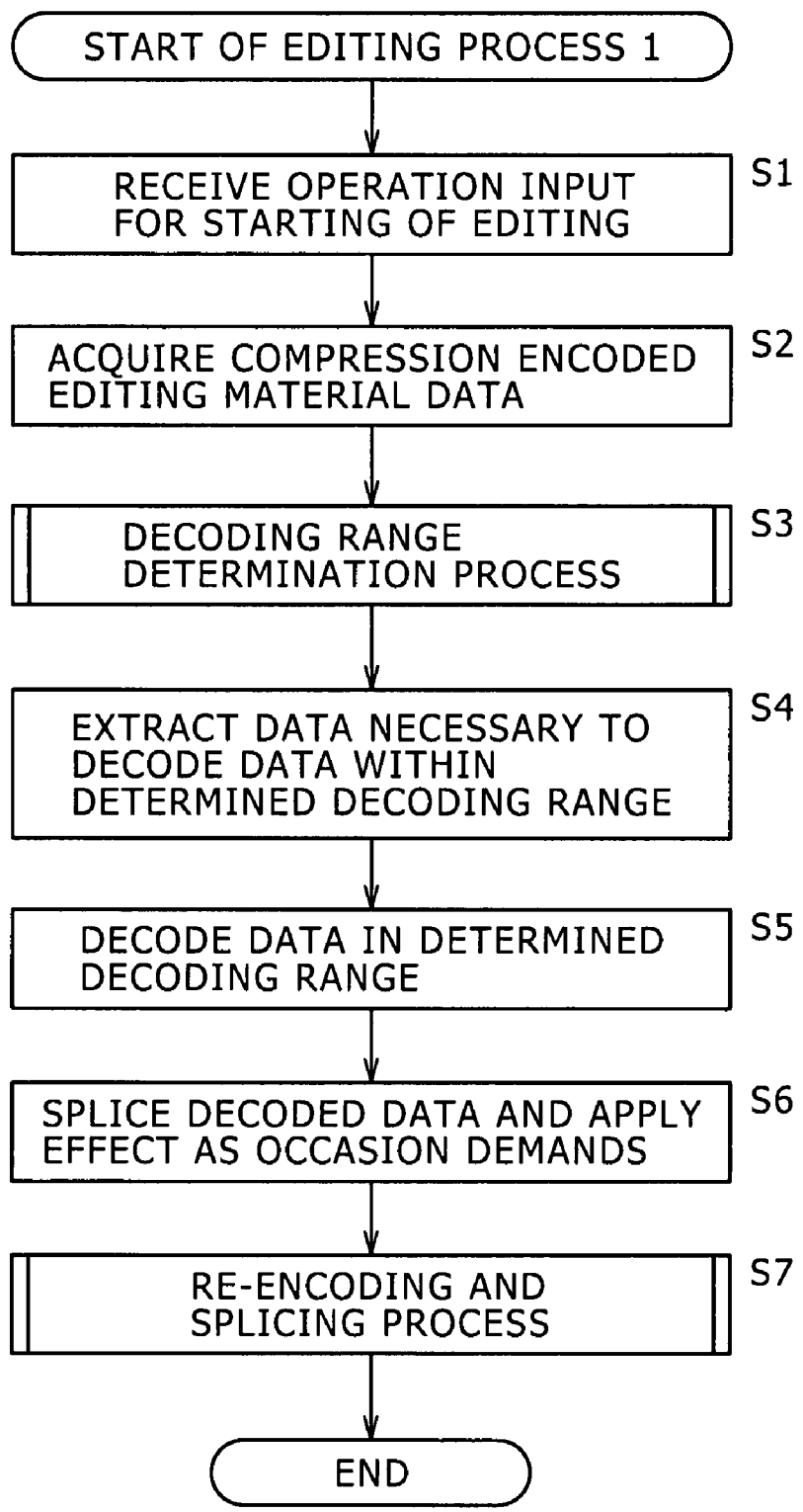
FIG. 18 is a flow chart illustrating an editing process 1.

Now, an editing process 1 executed by the editing apparatus 1 to which the present invention is applied is described with reference to a flow chart of FIG. 18.

At step S1, the CPU 11 receives an operation input of a user for instruction to start editing from the operation inputting section not shown and controls the south bridge 15 to read out the compression coded data of the compressed material image 1 and the compression coded data of the compressed material image 2 from the HDD 16 in accordance with the operation input of the user supplied thereto from the operation inputting section not shown and supply and store the read out data to and into the memory 18 through the north bridge 12, PCI bus 14 and PCI bridge 17. Further, the CPU 11 controls the south bridge 15 to supply information representative of an editing point and a command for instruction to start editing to the CPU 20 through the north bridge 12, PCI bus 14, PCI bridge 17 and control bus 19.

At step S2, the memory 18 acquires the compression coded data of the two editing materials.

Figure 19:
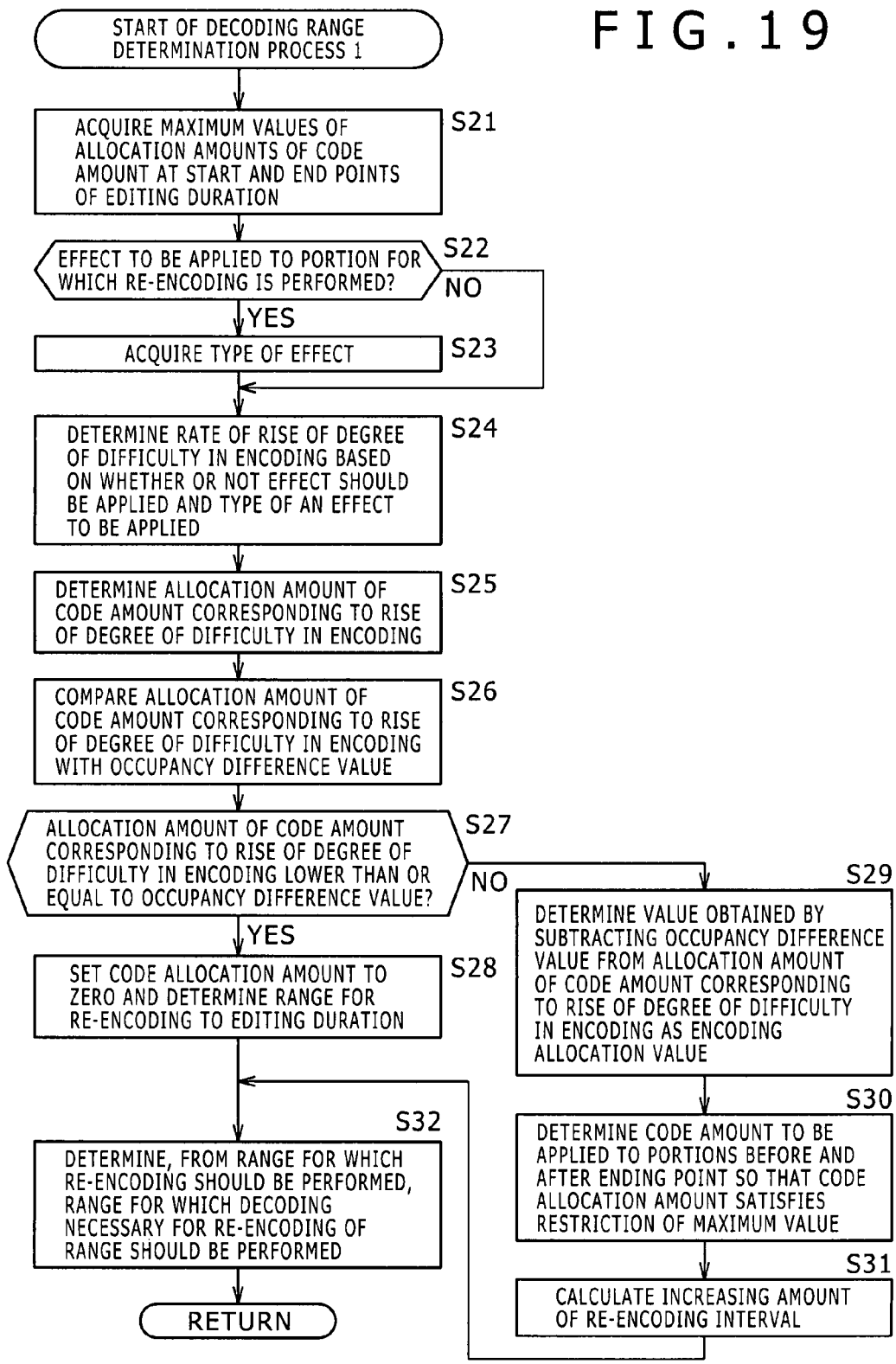
FIG. 19 is a flow chart illustrating a decoding range determination process 1.
Figure 21:
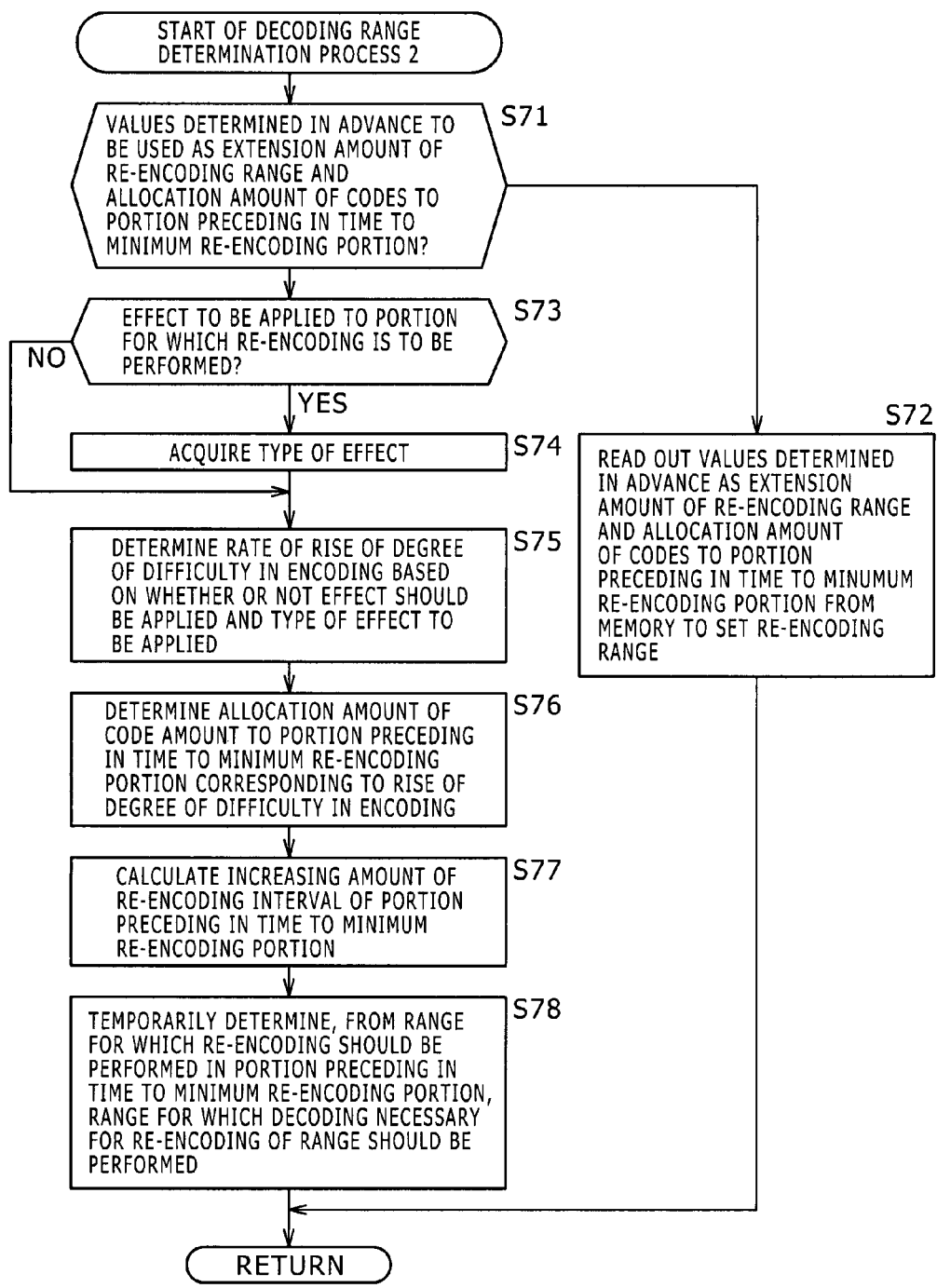
FIG. 21 is a flow chart illustrating a decoding range determination process 2.

At step S3, a decoding range determination process which is hereinafter described with reference to FIG. 19 or 21 is executed.

At step S4, the CPU 20 controls the PCI bridge 17 to extract data necessary for decoding and re-encoding data in the determined decoding ranges from within the compression coded data of the two editing materials stored in the memory 18 and supply the extracted data to the decoder 22 and the decoder 23. Further, at this time, the CPU 20 controls the PCI bridge 17 to supply the compression coded editing material data at portions which are not to be re-encoded to the stream splicer 25. The PCI bridge 17 extracts the data necessary to decode and re-encode the data in the determined decoding ranges from within the compression coded data of the two editing materials stored in the memory 18 and supply the compression coded editing material data in the portions which are not to be re-encoded to the decoder 22 and the decoder 23 under the control of the CPU 20. Further, the compression coded editing material data at the portions for which re-encoding is not performed is supplied to the stream splicer 25.

Further, at this time, as occasion demands, the CPU 20 can acquire information regarding the degree of difficulty in encoding of pictures included in the re-encoding duration such as, for example, a type of an effect to be applied.

At step S5, the CPU 20 controls the decoder 22 and the decoder 23 to decode the data in the determined decoding ranges. The decoder 22 and the decoder 23 decode the compression coded editing material data supplied thereto and supply resulting data to the effect/switch 26 under the control of the CPU 20.

At step S6, the CPU 20 controls the effect/switch 26 to splice the decoded data each other at the editing points and apply an effect to the resulting data as occasion demands. The effect/switch 26 splices the non-compressed decoded image materials supplied thereto at the editing points and apply an effect to the resulting data as occasion demands under the control of the CPU 20. Then, the resulting data are supplied to the encoder 27.

Figure 20:
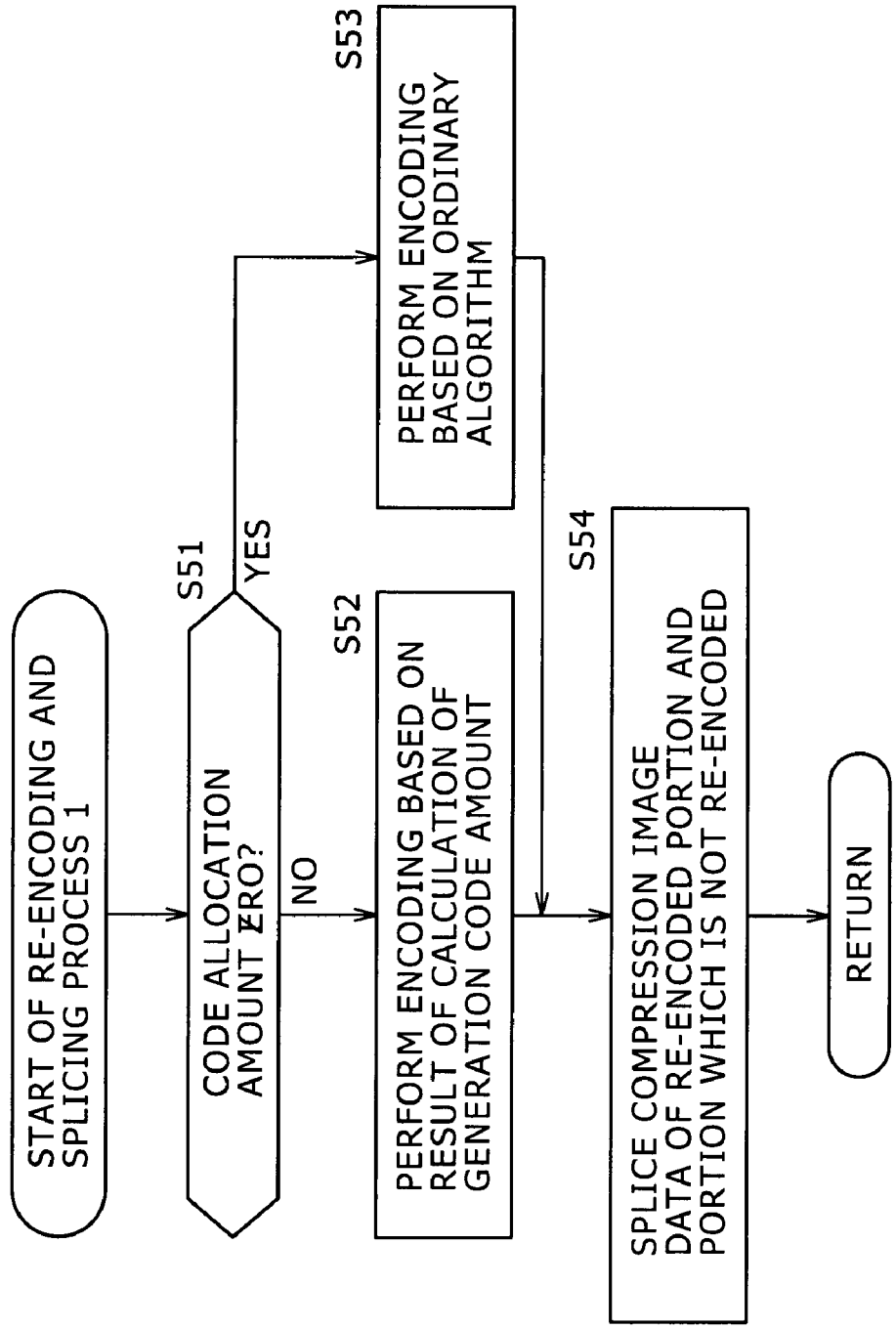
FIG. 20 is a flow chart illustrating a re-encoding and splicing process 1.
Figure 22:
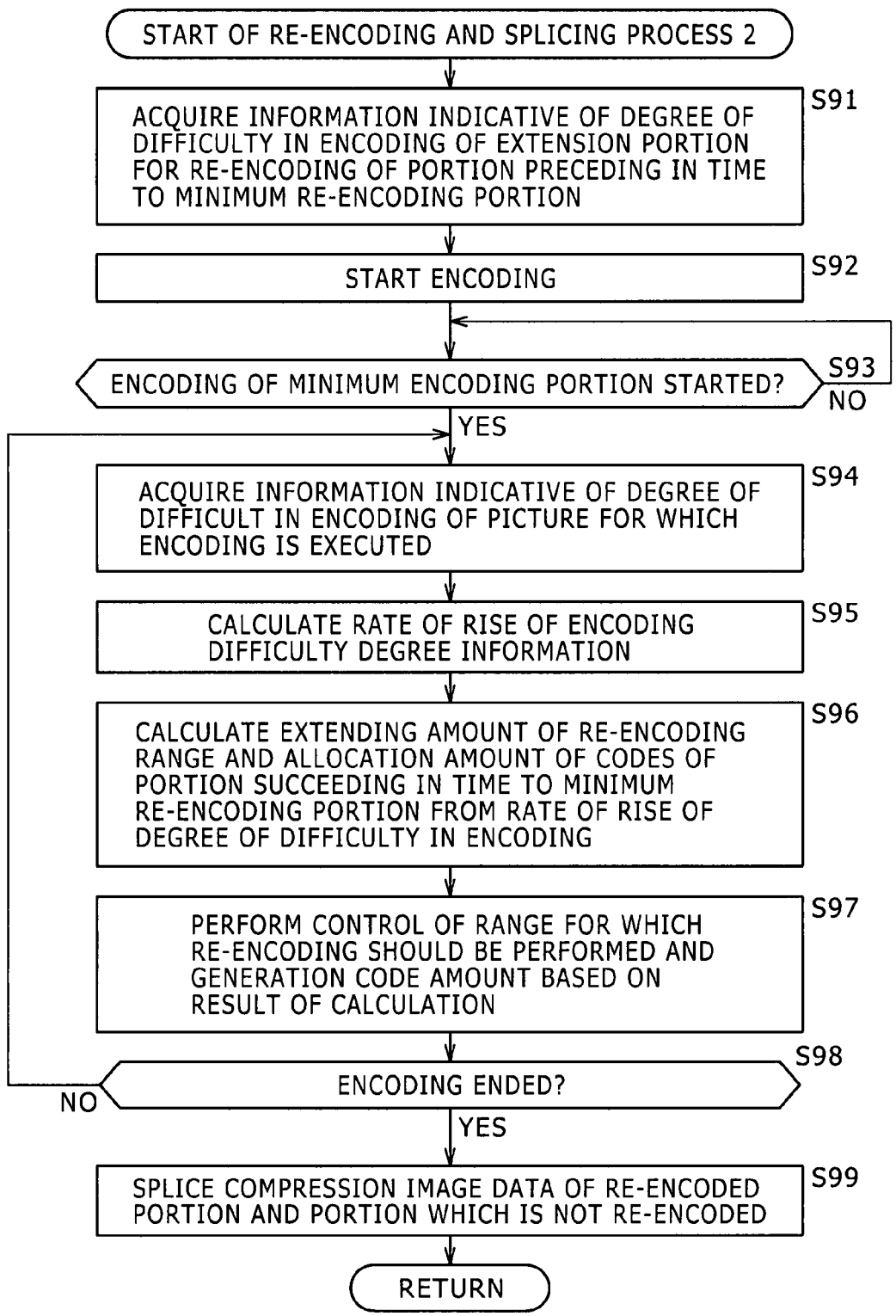
FIG. 22 is a flow chart illustrating a re-encoding and splicing process 2.

At step S7, a re-encoding and splicing process which is hereinafter described with reference to FIG. 20 or 22 is executed. After the processing at step S7 comes to an end, the processing is ended.

According to the process described above, editing of compressed image data of the Long Open GOP structure can be implemented by partly decoding portions of the compressed image data of the Long Open GOP structure in the proximity of editing points, splicing the decoded non-compressed image signals at a predetermined editing point, performing re-encoding of the image signal produced by the splicing and splicing the re-encoded image signal with the compressed image data at a portion for which such decoding and re-encoding are not performed.

Now, a decoding range determination process 1 executed at step S3 of FIG. 18 when an extension amount of a re-encoding range and an allocation amount of codes are determined in advance prior to an encoding process is described with reference to a flow chart of FIG. 19.

At step S21, the CPU 20 acquires maximum values of the allocation amount of codes at a start point and an end point of the editing duration calculated in accordance with the method described hereinabove with reference to FIG. 15 or 17.

At step S22, the CPU 20 decides based on the information supplied from the CPU 11 whether or not an effect is to be applied to a portion for which re-encoding is to be performed.

If it is decided at step S22 that an effect is to be applied to a portion for which re-encoding is to be performed, then the CPU 20 acquires a type of the effect to be applied at step S23.

If it is decided at step S22 that an effect is not to be applied to a portion for which re-encoding is to be performed, or after the process at step S23 comes to an end, the CPU 20 refers to the table information stored in the memory 21 to determine whether or not an effect is to be applied and a rate of rise of the degree of difficulty in encoding based on the type of the effect to be applied at step S24.

At step S25, the CPU 20 uses a predetermined calculation expression or the like to determine an allocation amount of codes corresponding to the rate of rise of the degree of difficulty in encoding. Here, the CPU 20 determines the allocation amount of codes so that the allocation amount increases as the rise of the degree of difficulty in encoding increases.

At step S26, the CPU 20 compares the allocation amount of codes corresponding to the rate of rise of the degree of difficulty in encoding and the occupancy difference value with each other.

At step S27, the CPU 20 decides whether or not the allocation amount of codes corresponding to the rise of the degree of difficulty in encoding corresponds to a value smaller than or equal to the Occupation difference value.

If it is decided at step S27 that the allocation amount of codes corresponding to the rise of the degree of difficulty in encoding corresponds to a value lower than or equal to the Occupation difference value, then the CPU 20 sets the code allocation amount to zero and sets the range for which re-encoding is to be performed to a minimum re-encoding range substantially equal to the editing duration at step S28.

If it is decided at step S27 that the allocation amount of codes corresponding to the rise of the degree of difficulty in encoding corresponds to a value higher than the Occupation difference value, then the CPU 20 sets the code allocation amount to a value obtained by subtracting the occupancy difference value from the allocation amount of codes corresponding to the rise of the degree of difficulty in encoding at step S29.

At step S30, the CPU 20 determines the code amounts to be allocated to the front and the rear of the editing point so that the code allocation amount may satisfy a restriction to the maximum value. Here, the code amounts to be allocated to the front and the rear of the editing point are preferably allocated as uniformly as possible while the restriction to the maximum value to the code allocation amount is satisfied.

At step S31, the CPU 20 calculates the increasing amount of the re-encoding interval based on the code allocation amount calculated at step S27, for example, using the expression (4) or the expression (5) given hereinabove or using the expression (2) given hereinabove where an effect is not applied. In other words, at step S31, the re-encoding duration is determined based on the calculated code allocation amount.

After the process at step S28 or step S31 comes to an end, the CPU 20 determines a range for which, from the range for which re-encoding is to be performed, decoding necessary for the re-encoding is to be performed at step S32. Thereafter, the processing returns to step S3 of FIG. 18 and then advances to step S4.

Through such a process as described above, an extension amount of a re-encoding range and an allocation amount of codes are determined in advance prior to an encoding process, and a decoding range is determined based on the determined extension amount of the re-encoding range, or in other words, based on the determined re-encoding duration.

Now, a re-encoding and splicing process 1 executed at step S7 of FIG. 18 where the decoding range determination process 1 described above with reference to FIG. 19 is executed is described with reference to a flow chart of FIG. 20.

At step S51, the target code amount calculation section 194 of the encoder 27 decides based on a control signal supplied thereto from the CPU 20 whether or not the code allocation amount which is allocated in accordance with the necessity in response to a change of the re-encoding range is zero.

If it is decided at step S51 that the code allocation amount is not zero, then the target code amount calculation section 194 calculates a target value for the generation code amount based on the information of the code allocation amount supplied thereto and supplies the target value to the generation code amount calculation section 192 at step S52. The generation code amount calculation section 192 controls the generation code amount of the quantization section 175 based on the target generation code amount supplied thereto, and the components of the encoder 27 perform encoding of the non-compressed image data supplied thereto as described hereinabove with reference to FIG. 12 and supply the encoded image data to the stream splicer 25.

If it is decided at step S51 that the code allocation amount is zero, then the target code amount calculation section 194 calculates a target generation code amount based on an ordinary algorithm at step 53, and the components of the encoder 27 perform encoding of the non-compressed image data supplied thereto as described hereinabove with reference to FIG. 12 and supply the encoded image data to the stream splicer 25.

After the process at step S52 or step S53 comes to an end, the stream splicer 25 splices compressed image data at a portion for which re-encoding is performed and another portion for which re-encoding is not performed at step S54. Thereafter, the processing returns to step S7 of FIG. 18 and then is ended.

Through such a process as described above, the generation code amount in the determined re-encoding duration is controlled based on the determined code allocation amount, and encoding is executed. Then, the compressed image data of the portion which is re-encoded and the portion which is not re-encoded are spliced with each other.

Now, a decoding range determination process 2 which is executed at step S3 of FIG. 18 where an extension amount of a re-encoding range and an allocation amount of codes are calculated and corrected while an encoding process is executed is described with reference to a flow chart of FIG. 21.

At step S71, the CPU 20 decides whether or not it is prescribed, for example, by setting performed by a user that values determined in advance are used for the extension amount of a re-encoding range and the allocation amount of codes to a portion which precedes in time to a minimum re-encoding portion, that is, a portion which precedes in time to the editing GOP duration.

If it is decided at step S71 that it is prescribed that values determined in advance are used, then the CPU 20 reads out values determined in advance as an extension amount of a re-encoding range and an allocation amount of codes to a portion which precedes in time to a minimum re-encoding portion from the memory 21 and sets a re-encoding range. Then, the processing returns to step S3 of FIG. 18 and then advances to step S4.

If it is decided at step S71 that it is not prescribed that values determined in advance are to be used, then processes similar to those at steps S22 to S24 of FIG. 19 are executed at steps S73 to S75.

In particular, it is decided based on the information supplied from the CPU 11 whether or not an effect is to be applied to a portion for which re-encoding is to be performed. Then, if it is decided that an effect is to be applied to a portion for which re-encoding is to be performed, then the type of the effect to be applied is acquired, and the table information stored in the memory 21 is referred to based on whether or not an effect is to be applied and the type of the effect to be applied to determine a rate of rise of the degree of difficulty in encoding.

At step S76, the CPU 20 determines an allocation amount of codes to a portion preceding in time to a minimum re-encoding portion corresponding to the rate of rise of the degree of difficulty in encoding.

At step S77, the CPU 20 calculates an increasing amount of the re-encoding interval in a portion preceding in time to the minimum re-encoding portion based on the allocation amount of codes calculated at step S75 using, for example, the expression (5) given hereinabove. In particular, at step S76, a re-encoding duration is determined provisionally based on the calculated code allocation amount.

At step S78, the CPU 20 temporarily determines, from a range, for which re-encoding is to be performed, of a portion preceding in time to the minimum re-encoding portion, a range for which decoding necessary for such re-encoding is to be performed. Then, the processing returns to step S3 of FIG. 18 and then advances to step S4.

Through such a process as described above, an extension amount of a re-encoding range and an allocation amount of codes to a portion preceding in time to a minimum re-encoding portion, that is, a portion preceding in time to the editing GOP duration are determined provisionally before an encoding process, and a provisional decoding range is determined based on the determined extension amount in the forward direction of the re-encoding range, in other words, based on the determined re-encoding duration in the forward direction.

Now, a re-encoding and splicing process 2 executed at step S7 of FIG. 18 when the decoding range determination process 2 described hereinabove with reference to FIG. 21 is described with reference to a flow chart of FIG. 22.

At step S91, the CPU 20 acquires information indicative of the degree of difficulty in encoding of an extension for re-encoding of a portion preceding in time to a minimum re-encoding portion from the CPU 11 or the decoder 22 through the control bus 19.

At step S92, the CPU 20 controls the encoder 27 to start encoding from a picture at the top of a portion preceding in time to the editing GOP duration from among pictures of the re-encoding duration decoded in the provisionally determined decoding range. The encoder 27 starts encoding of the non-compressed image data supplied thereto from the effect/switch 26 under the control of the CPU 20.

At step S93, the CPU 20 decides whether or not encoding of the minimum re-encoding portion is started by the encoder 27, that is, whether or not encoding of the editing GOP duration is started. If it is decided at step S93 that encoding of the minimum re-encoding portion is not started, then the process at step S93 is repeated until after it is decided that encoding of the minimum re-encoding portion is started.

If it is decided at step S93 that encoding of the minimum re-encoding portion is started, then the CPU 20 acquires information supplied from the encoder 27 and indicative of a degree of difficulty in encoding of the picture for which encoding is executed at step S94.

At step S95, the CPU 20 calculates a rate of rise of the encoding difficulty degree information based on the information supplied from the encoder 27 and indicative of the degree of difficulty in encoding of the picture for which encoding is executed.

At step S96, the CPU 20 calculates an extension amount of the re-encoding range and an allocation amount of codes of a portion succeeding the minimum re-encoding portion in time based on a result of the calculation of the rate of rise of the encoding difficulty degree information at step S95.

At step S97, the CPU 20 controls the PCI bridge 17 based on a result of the calculation at step S96 to determine data to be supplied to the decoder 23 and data to be supplied to the stream splicer 25 based on the range for which re-encoding is to be performed. Further, the CPU 20 controls the encoder 27 to control the generation code amount in an encoding process. The encoder 27 controls the generation code amount in the encoding process of the non-compressed image data to be supplied under the control of the CPU 20.

At step S98, the CPU 20 decides whether or not the encoding process by the encoder 27 comes to an end. If it is decided at step S98 that the encoding process does not come to an end, then the processing returns to step S94, and consequently, the processes at the steps beginning with step S94 are repeated. In particular, the calculation process of an extension amount of the re-encoding range and an allocation amount of codes is repeated to update the extension amount of the re-encoding range and the allocation amount of codes until the encoding process of the re-encoding duration by the encoder 27 comes to an end.

If it is decided at step S98 that the encoding process comes to an end, then the compression encoded data produced by encoding is supplied to the stream splicer 25. Consequently, at step S99, the stream splicer 25 splices the compressed image data of a portion for which re-encoding is performed and another portion for which re-encoding is not performed with each other. Thereafter, the processing returns to step S7 of FIG. 18 and is then ended.

Through such a process as described above, during execution of an encoding process, the generation code amount is controlled based on the updated code allocation amount in the updated re-encoding duration and encoding is executed. Then, the compressed image data of the portion for which re-encoding is performed and the portion for which re-encoding is not performed are spliced with each other.

It is to be noted that, also in the processes described above with reference to the series of flow charts mentioned hereinabove, the compressed material image 1 and the compressed material image 2 within a re-encoding range are decoded. However, the decoding range may be determined separately from the re-encoding range based on the re-encoding range. In other words, the decoding range may be a range same as the re-encoding range or may be a range greater than and including the re-encoding range.

Further, although there is the possibility that the picture quality of pictures within the range of the no editing re-encoding duration whose generation code amount is decreased may deteriorate, if the decreasing amount of the generation code amount is small, then the deterioration of the picture quality can be suppressed to such a degree that it can be ignored visually. Therefore, in the present invention, the range of the no editing re-encoding duration is set to such a degree of a wide range that the picture quality deterioration of pictures within the range of the no editing re-encoding duration can be ignored visually so that the code generation amount to be allocated to the range is used to maintain the picture quality of pictures within the editing duration whose degree of difficulty in encoding is raised. Consequently, deterioration of the picture quality of an image after editing is suppressed generally.

As described above, where the present invention is applied to control the generation code amount, even in a situation wherein the bit rate cannot be raised in compressed image data editing of the Long GOP system which requires re-encoding, the picture quality in the proximity of an editing point whose degree of difficulty in encoding rises, for example, as a result of application of an effect can be maintained.

Incidentally, where editing is performed, after a portion in the proximity of an editing point is decoded partially, by splicing non-compressed images and re-encoding the non-compressed images formed by the splicing and then coupling the re-encoded images to compressed image data at a portion for which decoding and re-encoding are not performed, it is necessary to maintain the continuity between the VBV buffer Occupancies at the re-encoding portion and the portion for which re-encoding is not performed.

Figure 23:
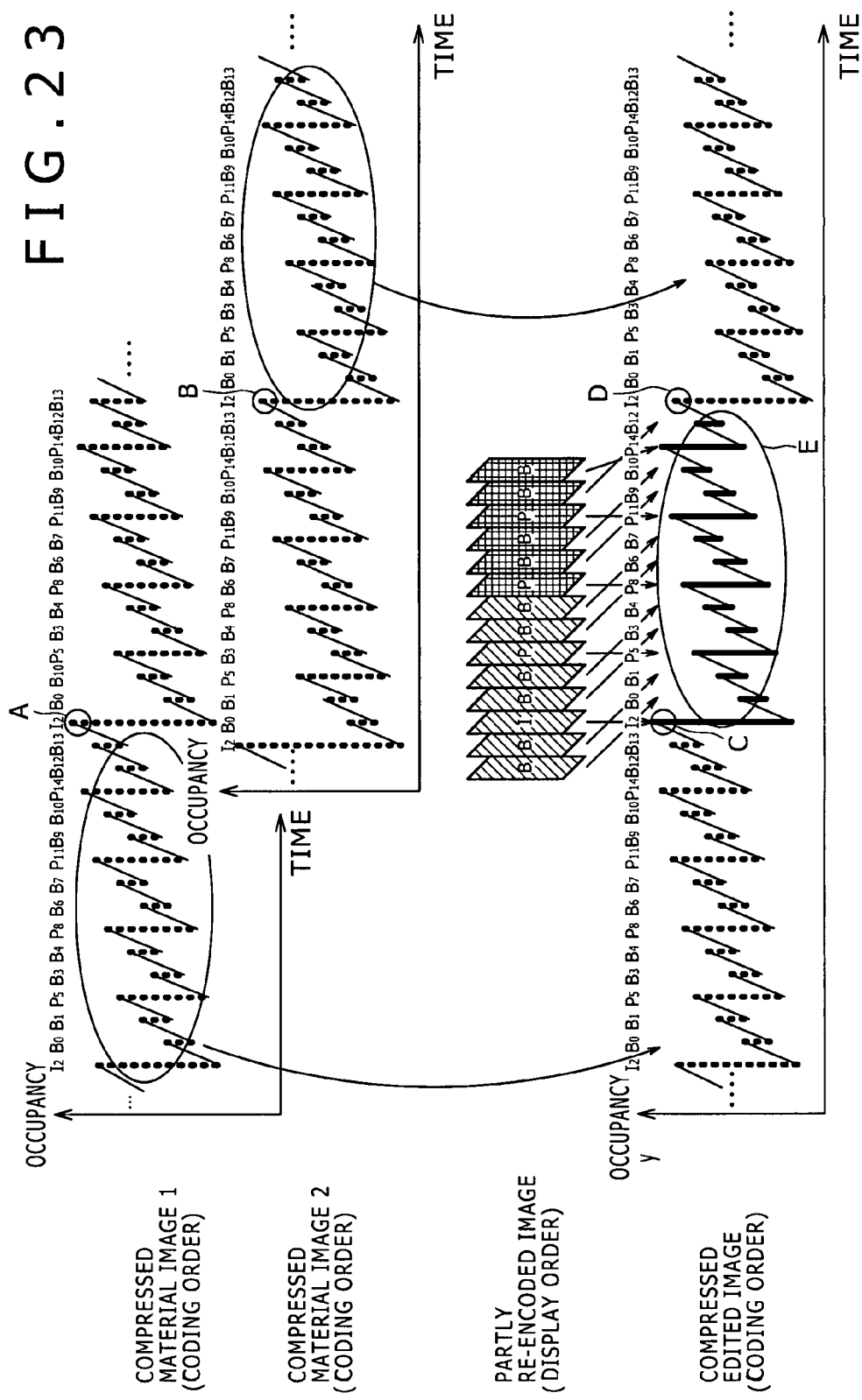
FIG. 23 is a view illustrating a VBV buffer where the partial re-encoding and editing process is executed.

The continuity between the VBV buffer Occupancies is described with reference to FIG. 23.

In order to prevent such a situation that the VBV buffer fails with compressed image data after editing, it is necessary to make the Occupancies of a start portion and an end portion of re-encoding coincide with the Occupancies of coupling portions of compressed image data for which re-encoding is not performed and which are coupled to the front and the rear of the re-encoding portion. In particular, the occupancy denoted by C in the figure of the first I picture in a re-encoding portion denoted by E in the figure of a compressed image after editing is performed must be controlled so as to coincide with the occupancy denoted by A in the figure of the compressed material image 1 before editing, and the occupancy denoted by D in the figure of a next I picture following after the re-encoding portion denoted by E in the figure of the compressed image after editing is performed must be controlled so as to coincide with the occupancy denoted by B in the figure of the compressed material image 2 before editing.

The Occupancies before and after editing must be made coincide with each other similarly even where the GOP is a Closed GOP or an Open GOP which is not a Closed GOP. Where the continuity of the VBV buffer occupancy is not maintained, the buffer of a decoder fails upon decoding and this may possibly make a cause of appearance of such a phenomenon as, for example, a picture skip or freeze.

In a PS (Program Stream) or a TS (Transport Stream), the occupancy of the VBV buffer of each picture can be determined from an SCR (System Clock Reference) or a PCR (Program Clock Reference) and a PTS (Presentation Time Stamp) or a DTS (Decoding Time Stamp). However, in an ES (Elementary Stream), the occupancy of the VBV buffer cannot be determined readily.

In an ES, the occupancy of the VBV buffer of each picture can be determined from the value of a VBV Delay of a Picture Header. However, since an accurate value is not necessarily placed in a parameter of the VBV Delay of the Picture Header, it cannot be asserted that the value of the occupancy calculated from a parameter of the VBV Delay is credible (accurate). Further, in an ES encoded with a VBR (Variable Bit Rate), the value of the VBV delay is a fixed value, and therefore, it cannot be utilized in order to determine the occupancy of the VBV buffer.

In this manner, since, in an ES, the occupancy of the VBV buffer cannot be determined readily, when an ES is edited, if re-encoding cannot be performed correctly so as to maintain the continuity of the VBV buffer, there is the possibility that the buffer may overflow or underflow and such a phenomenon as, for example, a picture skip or freeze may occur with decoded images. When an ES in which a time stamp is not inserted is edited, it is difficult to maintain the continuity of the VBV buffer occupancy.

Therefore, when an ES is edited, it is necessary to make it possible to maintain the continuity of the VBV buffer occupancy.

Figure 24:
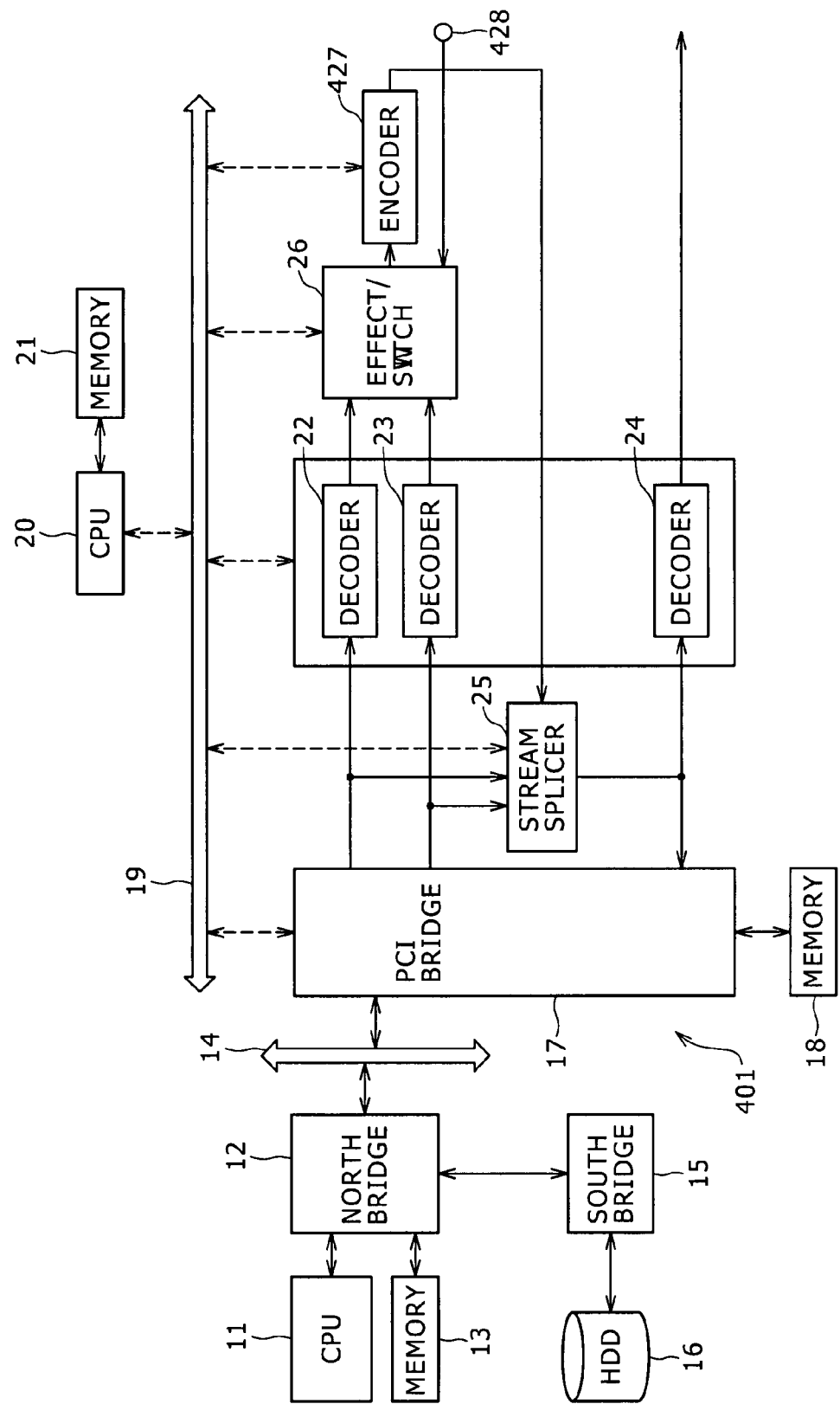
FIG. 24 is a block diagram showing a second configuration of an editing apparatus to which the present invention is applied.

FIG. 24 is a block diagram showing a hardware configuration of an editing apparatus 401 to which the present invention is applied.

In particular, the editing apparatus 401 of FIG. 24 has a configuration basically similar to that of the editing apparatus 1 described hereinabove with reference to FIG. 4 except that it includes an encoder 427 in place of the encoder 27 and additionally includes an input terminal 428 for supplying a non-compressed image signal to the effect/switch 26 from the outside.

In particular, the effect/switch 26 changes over a non-compressed image signal output supplied from the decoder 22 or decoder 23 or the input terminal 28, that is, couples the non-compressed image signal supplied thereto, at a predetermined frame, and applies, as occasion demands, an effect to a predetermined range and supplies a resulting image signal to the encoder 427, or supplies a non-compressed image signal supplied thereto from the input terminal 28 to the encoder 427 under the control of the CPU 20.

Further, the encoder 427 encodes the non-compressed image signal supplied thereto and, as occasion demands, can acquire, upon encoding, predetermined information such as, for example, information of the occupancy of each picture and output compression encoded compressed image data and the information acquired as occasion demands to the stream splicer 25.

For example, if non-compressed image data is inputted from the input terminal 28, then the inputted non-compressed image data is supplied to the effect/switch 26 and supplied to the encoder 427. The encoder 427 encodes the non-compressed image data supplied thereto and then acquires information of the VBV buffer occupancy and supplies the acquired information to the stream splicer 25 together with the encoded compressed image data. The stream splicer 25 supplies the information of the VBV buffer occupancy and the encoded compressed image data through the PCI bridge 17 to the memory 18 so as to be stored into the memory 18.

Figure 25:
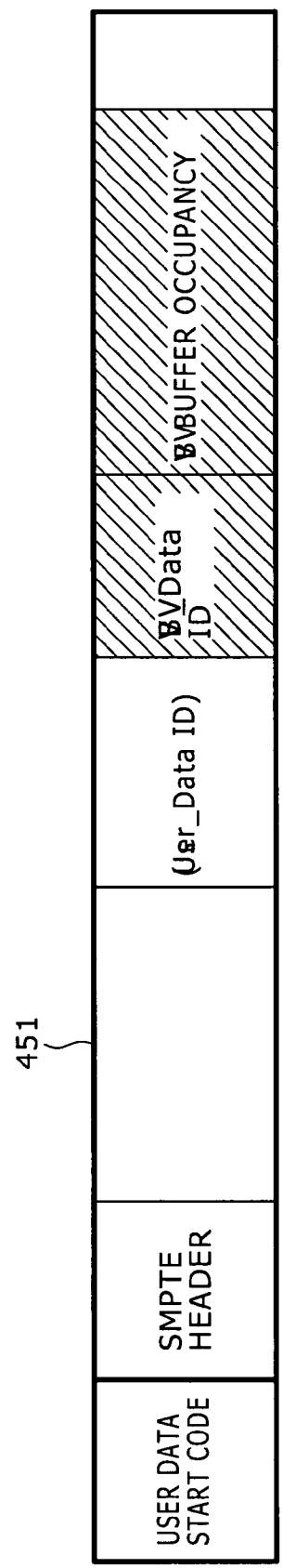
FIG. 25 is a view illustrating MPEG_ES_editing_information.

The CPU 11 reads out the compressed image data encoded by the encoder 427 and the acquired VBV buffer occupancy from the memory 18 and supplies the compressed image data and the VBV buffer occupancy to the HDD 16 through the south bridge 15 so as to be stored on a hard disk. At this time, the information of the VBV buffer occupancy may be stored in a form multiplexed with corresponding compressed image data or may be stored as file data different from the compressed image data.

Where the information of the VBV buffer occupancy is embedded into an ES (Elementary Stream), the information can be embedded into (described in) a user data area of MPEG_ES_editing_information 451 prescribed by the SMPTE328 as illustrated, for example, in FIG. 25.

The syntax where information of the VBV buffer occupancy is embedded into the MPEG_ES_editing_information 451 is described with reference to FIGS. 26 and 27.

As shown in FIG. 26, User_ID of 8 bits is described in the user data, and VBV_data is described next. As shown in FIG. 27, in the VBV_data, Data_ID of 8 bits and VBV buffer occupancy of 8 bits are described. The information of the VBV buffer occupancy acquired by the encoder 427 can be described in the VBV buffer occupancy of the VBV_data.

Meanwhile, as a format for file exchange, for example, the MXF (Material exchange Format) has been proposed and is being standardized at present. The MXF is a format which takes streaming into consideration in addition to file exchange, and standardization of the MXF is proceeding as a material exchange file format which contains all formats such as, for example, the HD, MPEG and DV formats.

A data structure where an ES is wrapped in the MXF is described with reference to FIG. 28.

Figure 28:
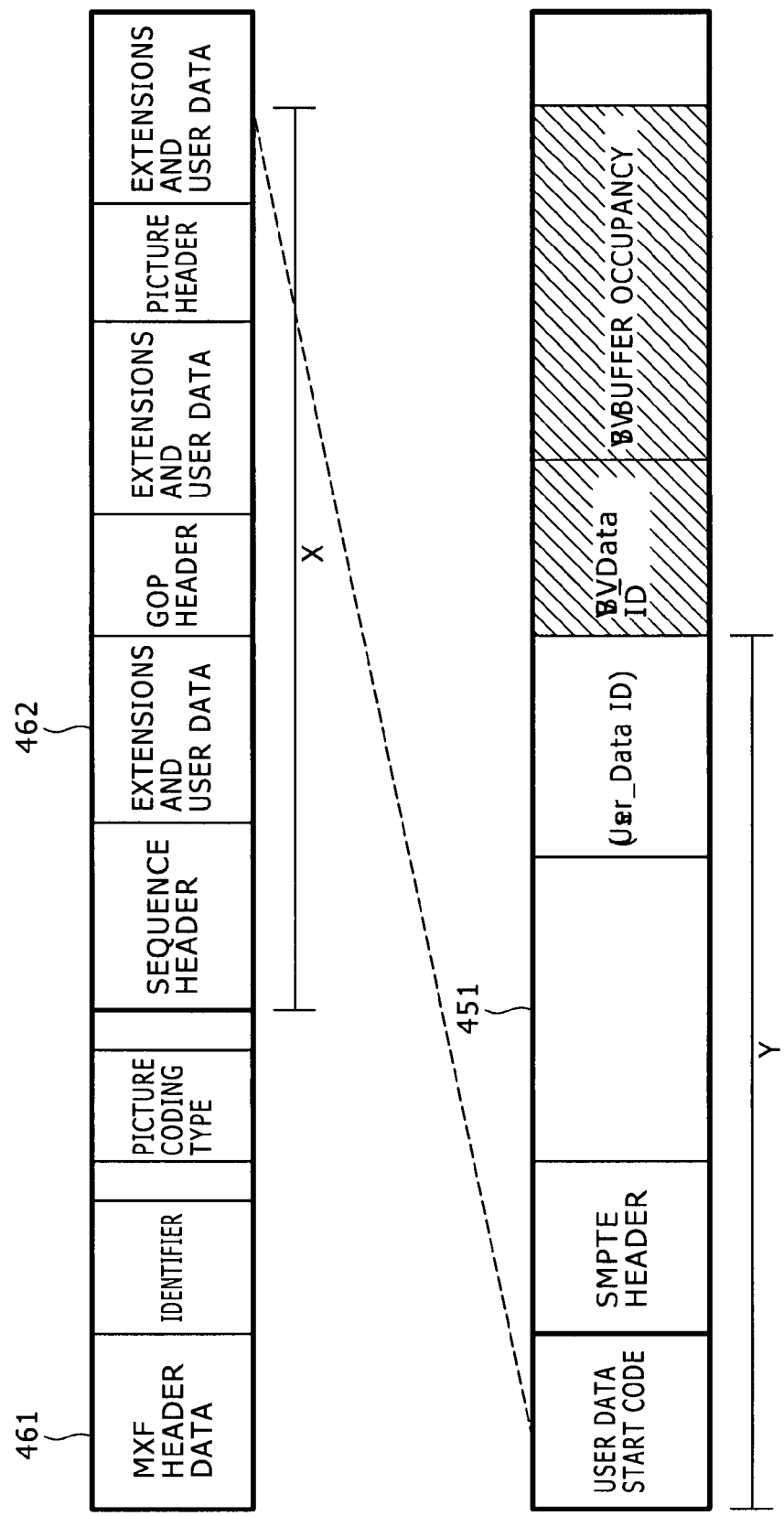
FIG. 28 is a view illustrating the MPEG_ES_editing_information where the ES is wrapped by an MXF.

As shown in FIG. 28, MPEG_ES_editing_information 451 similar to that described hereinabove with reference to FIGS. 25 to 27 is included in Extensions and User Data in Elementary Stream Header 462 which includes Sequence Header, Extensions and User Data, and Picture Header and succeeds MXF Header 461 in which information of MXF Header Data, Identifier, and Picture Coding Type is included. In the Identifier included in the MXF Header 461, information with which a model of an encoder used to encode the image signal, the name of a company of a manufacturer of the encoder or the like can be specified may be recorded.

If information with which a model of an encoder, the name of a company of a manufacturer of the encoder or the like can be specified at a particular position of MXF data in which compressed image data in which a VBV buffer occupancy is embedded is wrapped, then various apparatus (such various apparatus naturally include the editing apparatus 1 to which the present invention is applied) which acquire the MXF can decide readily whether or not information of a VBV buffer occupancy is embedded in the compressed image data wrapped in the MXF.

Further, any of such various apparatus (such various apparatus naturally include the editing apparatus 1 to which the present invention is applied) which acquire the MXF can readily detect the position at which the VBV buffer occupancy is described by specifying the top position of a frame for which the VBV buffer occupancy is required and then specifying, based on the top position, the position in which the VBV buffer occupancy is embedded. Therefore, any of the various apparatus can readily extract the VBV buffer occupancy from the MXF.

The top position of a frame can be determined simply because it corresponds to the MXF header. Then, the place in which the VBV buffer occupancy is embedded can be detected from the top position by calculating X+Y using the bit sizes of X and Y shown in FIG. 28. Referring to FIG. 28, the size denoted by X in the figure is equal to the size from the MXF Header 461 to the user data in the picture layer in the Elementary Stream Header 462, and the size denoted by Y in FIG. 28 is equal to the size from the top of the User Data to the Data_type in which the VBV buffer occupancy of the MPEG_ES_editing_information 451 is described.

The header size of the Sequence layer and the Picture layer depends upon the picture type upon encoding and are not changed basically. For example, table data in which header sizes corresponding to the identifier and the picture coding type are described is stored in advance in the memory 21. Since the identifier and the picture coding type are embedded in the MXF Header 461 as shown in FIG. 28, in an editing apparatus 2 hereinafter described, the CPU 20 can readily detect the header sizes of the Sequence layer and the Picture layer corresponding to the picture coding type by specifying an encoder used to encode the MXF data based on the information described in the identifier and then referring to the table data.

Further, also the position in the user data at which the VBV buffer Occupation is embedded is determined upon encoding, and also this position is not changed basically. For example, table data in which a recording position of the VBV buffer occupancy in the user data corresponding to the identifier is stored in advance in the memory 21. In the editing apparatus 2 hereinafter described, the CPU 20 can readily detect the position in the user data at which the VBV buffer occupancy is embedded by specifying an encoder used to encode the MXF data based on the information described in the identifier and referring to the table data.

In this manner, by wrapping an ES in such an MXF data format as illustrated in FIG. 28, the editing apparatus 1 or a like apparatus which acquires the MXF data can readily detect, based on information with which a model of an encoder used to encode an image signal described in the identifier in the MXF data, the name of a company of a manufacturer of the encoder or the like can be specified, the position at which the VBV buffer occupancy information is described, and can extract the information. Therefore, the information of the VBV buffer occupancy can be extracted readily without analyzing compressed data, and the editing process 2 can be performed readily and rapidly.

It is to be noted that, where an ES is not wrapped in the XMF, in order to acquire multiplexed VBV buffer occupancy information, the ES must be analyzed. However, since the MPEG_ES_editing_information 451 exists for each frame and has the VBV buffer occupancy described hereinabove, it is not necessary to execute the analysis from the top of the ES and search the VBV buffer occupancy, but only a frame from which it is necessary to determine information of the VBV buffer occupancy may be searched. Therefore, the analysis process for data for determining the VBV buffer occupancy is not complicated and is a process which can be executed sufficiently even if much time is not spent.

In particular, data of the compressed material image 1 and the compressed material image 2 compressed in accordance with the Open GOP system of the Long GOP are stored in a coordinated relationship with the information of the VBV buffer occupancy or in a multiplexed relationship with the information of the VBV buffer occupancy in the HDD 16. The data of the compressed material image 1 and the compressed material image 2 may be wrapped in the MXF.

The CPU 11 controls the south bridge 15 to read out the compression encoded data of the compressed material image 1 and the compression encoded data of the compressed material image 2 and the information of the VBV buffer occupancy corresponding to the data, or the data of the compressed material image 1 and the data of the compressed material image 2 in which the information of the VBV buffer Occupancies is multiplexed from the HDD 16 based on an operation input of a user supplied from the operation inputting section not shown. Then, the CPU 11 supplies the read out data to the memory 18 through the north bridge 12, PCI bus 14, and PCI bridge 17 so as to be stored into the memory 18. Further, the CPU 11 supplies information representative of an editing point and a command for instruction to start editing to the CPU 20 through the north bridge 12, PCI bus 14, PCI bridge 17 and control bus 19.

The CPU 20 determines a range for which re-encoding is performed from among the compression encoded data of the compressed material image 1 and the compression encoded data of the compressed material image 2 based on the information supplied from the CPU 11 and indicative of an editing point. At this time, the CPU 20 acquires information of the VBV buffer Occupancies which are multiplexed in the compression encoded data of the compressed material image 1 and the compression encoded data of the compressed material image 2 or which exist as a different file, and detects the VBV buffer Occupancies of an I picture at the top of the range for which re-encoding is performed and an I picture at the top connected to the range for which re-encoding is performed. Then, the CPU 20 supplies the acquired information and the detected VBV buffer Occupancies to the encoder 427 and controls an encoding process so that the VBV buffer Occupancies of the I picture at the top of the range for which re-encoding is performed and the I picture at the top connected to the range for which re-encoding is performed coincide with each other before and after editing.

Then, the CPU 20 controls the PCI bridge 17 to supply, from among the compression encoded data of the compressed material image 1 stored in the memory 18, those of the compressed material image 1 corresponding to pictures in the range for which re-encoding is performed and any picture which need be referred to to the decoder 22 and supply, from among the data of the compressed material image 2, those of the compressed material image 2 corresponding to pictures in the range for which re-encoding is performed and any picture which need be referred to to the decoder 23.

Further, at this time, the CPU 20 controls the PCI bridge 17 to supply pictures in each range for which re-encoding is not performed from among the compression encoded data of the compressed material image 1 and the compressed material image 2 stored in the memory 18 to the stream splicer 25.

The CPU 20 controls the decoder 22 and the decoder 23 to decode the compression encoded data supplied thereto.

The decoder 22 and the decoder 23 decode the data supplied thereto under the control of the CPU 20 and supply signals of the material image 1 and the material image 2 obtained by decoding to the effect/switch 26. The effect/switch 26 splices the signals of the non-compressed decoded material image 1 and the non-compressed decoded material image 2 at a predetermined cut (Cut) editing point (splice point) under the control of the CPU 20 and applies an effect to the spliced signal as occasion demands to produce a non-compressed editing image signal for re-encoding. Then, the effect/switch 26 supplies the produced signal to the encoder 427 together with a re-encoding reference image necessary for re-encoding.

The encoder 427 encodes the non-compressed editing image signal for re-encoding supplied from the effect/switch 26 under the control of the CPU 20.

At this time, the encoder 427 executes an encoding process based on the VBV buffer Occupancies of the I picture at the top of the range for which re-encoding is performed and the I picture at the top spliced to the range for which re-encoding is performed, supplied from the CPU 20 so that the VBV buffer Occupancies of the I picture at the top of the range for which re-encoding is performed and the I picture at the top spliced to the range for which re-encoding is performed coincide with each other before and after editing. Then, the encoder 427 acquires information of the VBV buffer occupancy obtained upon re-encoding.

Then, the image data re-encoded by the encoder 427 and the information of the VBV buffer occupancy upon re-encoding are supplied to the stream splicer 25. The stream splicer 25 splices the compressed material image 1 and the compressed material image 2 within the ranges for which re-encoding is not performed from among the data of the compressed material image 1 and the compressed material image 2 supplied from the PCI bridge 17 and the encoded image data supplied from the encoder 427 under the control of the CPU 20 to produce compressed editing image data.

Then, the stream splicer 25 supplies the produced compressed editing image data and the information of the VBV buffer occupancy upon re-encoding to the PCI bridge 17 under the control of the CPU 20 so as to be stored into the memory 18. Further, the stream splicer 25 supplies the produced compressed editing image data to the decoder 24 so as to be decoded and outputted to a monitor for confirmation of an editing result or the like so as to be displayed, and output a base band signal produced by the decoding to a different apparatus. Where the decoder 24 is provided as an independent apparatus, the apparatus corresponding to the decoder 24 is configured such that it can receive and decode re-encoded compressed image data after editing and output the base band signal produced by the decoding.

Where an instruction to store the compressed editing image data produced by editing is issued from the operation inputting section not shown, the CPU 11 controls the PCI bridge 17 to read out the compressed editing image data and the information of the VBV buffer occupancy upon re-encoding stored in the memory 18 and supply the read out data and information to the south bridge 15 through the PCI bus 14 and the north bridge 12. Further, the CPU 11 controls the south bridge 15 to supply and store the compressed editing image data and information of the VBV buffer occupancy upon re-encoding supplied thereto to and into the HDD 16. Also at this time, the information of the VBV buffer occupancy may be multiplexed with the corresponding compressed editing image data or may be stored in a coordinated relationship as data of a different file.

By the configuration described, since the information of the VBV buffer occupancy is stored in a coordinated relationship with the compression encoded data for each picture and the VBV buffer occupancy is utilized in a next encoding process, continuity of the VBV buffer occupancy can be maintained.

Further, it is described above that the information of the VBV buffer occupancy may be multiplexed in the corresponding compressed editing image data or may be stored in a coordinated relationship as data of a different file. Indeed, in order to maintain the continuity of the VBV buffer occupancy by storing the information of the VBV buffer occupancy in a coordinated relationship with the compression encoded data for each picture and utilizing the VBV buffer occupancy in a next encoding process, the information of the VBV buffer occupancy may be multiplexed in the corresponding compressed editing image data or may be stored in a coordinated relationship as data of a different file.

However, where the information of the VBV buffer occupancy is stored in a coordinated relationship as data of a different file, there is the possibility that the information of the VBV buffer occupancy to be annexed as data of a different file may be lost, for example, where a recording format is changed or a data transmission format is changed.

Normally, an encoder for executing a process for compression encoding non-compressed data adjusts the generation code amount for each picture to perform encoding using a buffer model called virtual buffer verifier so that failure of a standard buffer of a decoder may be prevented. In particular, the barometer which indicates transition of vbv_buffer is vbv buffer occupancy, and the encoder executes rate control while the occupancy is calculated.

As described hereinabove, conventionally, editing of a data stream for which buffer management is necessary is executed for a stream, for example, to which a time stamp such as TS, PS or the like is annexed. However, for an ES to which time information such as a time stamp is annexed, a buffer management method similar to that for a stream to which a time stamp such as TS, PS or the like is annexed cannot be used.

Generally, when a process for compression encoding non-compressed data is executed, an encoder calculates vbv_delay from vbv_occupancy and describes the calculated vbv_delay as information regarding the vbv buffer occupancy in the syntax of the ES. However, as described above, in the case of a VBR, the value of the vbv_delay is not sometimes credible (the value of the vbv_delay is not accurate) in that the VBR is applied such that it is described as vbv_delay=0xffff.

Originally, information regarding a stream is preferably configured such that the information is multiplexed in a stream so that it can be surely regenerated by an apparatus which receives the stream. In particular, if the information of the VBV buffer occupancy which is information regarding a stream is correctly multiplexed in a stream of an ES, then even if a recording format is changed or a data transmission format is changed, the information of the VBV buffer occupancy can be regenerated by an apparatus which receives the stream of the ES irrespective of the recording format or the transmission format. Therefore, it is suitable for the information of the VBV buffer occupancy to be multiplexed in a stream of an ES.

Figure 29:
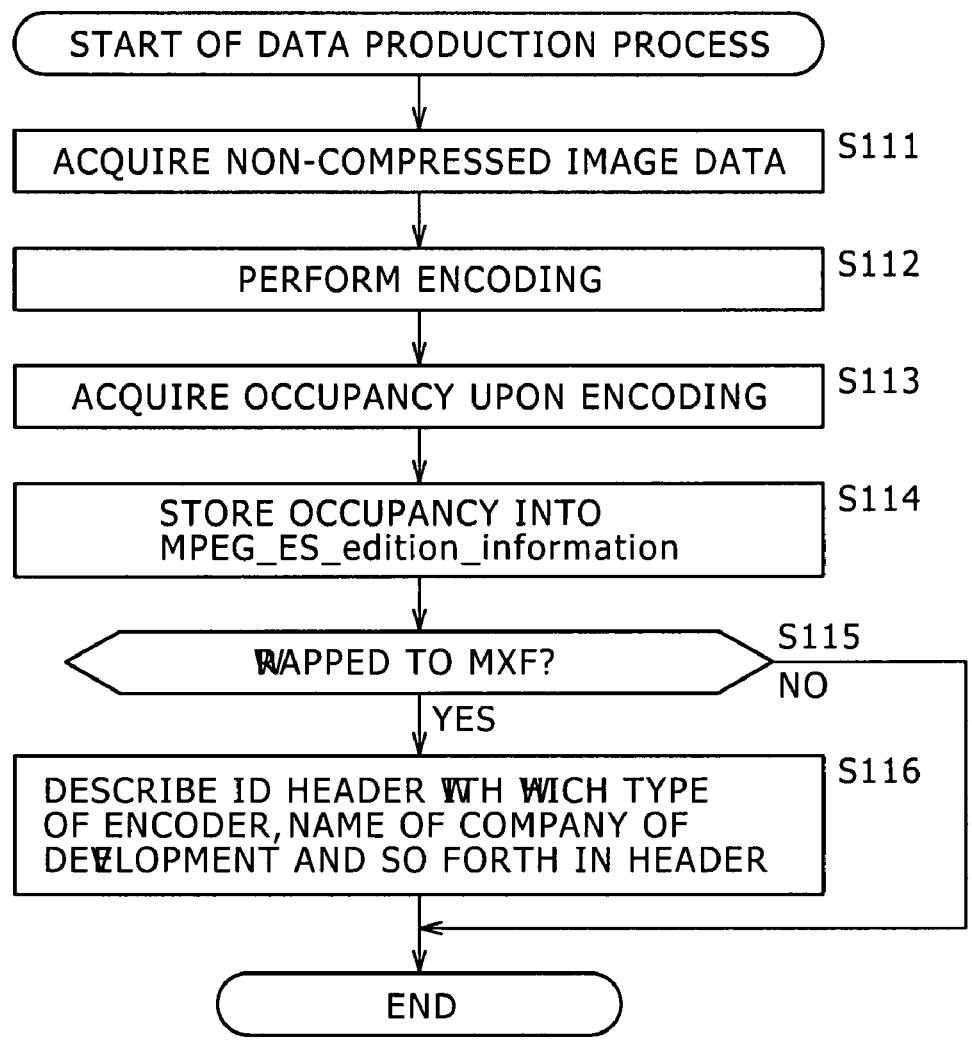
FIG. 29 is a flow chart illustrating a data production process.

Now, the data production process is described with reference to a flow chart of FIG. 29.

At step S111, the encoder 427 acquires non-compressed image data inputted from the input terminal 28 through the effect/switch 26.

At step S112, the encoder 427 encodes the non-compressed image data and acquires information of the VBV buffer occupancy and then supplies the information to the stream splicer 25 together with the encoded compressed image data. The stream splicer 25 supplies the information of the VBV buffer occupancy and the encoded compressed image data to the memory 18 through the PCI bridge 17 so as to be stored into the memory 18.

At step S113, the CPU 11 reads out and acquires the compressed image data encoded by the encoder 427 and the acquired information of the VBV buffer occupancy from the memory 18 through the north bridge 12, PCI bus 14 and PCI bridge 17.

At step S114, the CPU 11 places the read out VBV buffer occupancy information into the MPEG_ES_editing_information 451 of the ES of the compressed image data as described with reference to FIGS. 25 to 28.

At step S115, the CPU 11 decides, based on an operation input by the user supplied thereto from the operation inputting section not shown, whether or not the ES having the MPEG_ES_editing_information 451 in which the VBV buffer occupancy is placed is to be wrapped into the MXF.

If it is decided at step S115 that the ES is to be wrapped into the MXF, then the CPU 11 describes, at step S116, an ID with which a model of the encoder 427, the name of a development company of the editing apparatus 1 or the like can be specified in the Identifier of the header (MXF Header 461) as shown of FIG. 28.

If it is decided at step S115 that the ES is not to be wrapped into the MXF, or after the processing at step S6 comes to an end, the data production process is ended.

The data wherein the information of the VBV buffer occupancy produced by the data production process is multiplexed in the stream of the ES is recorded or outputted as material data for editing on a hard disk of the HDD 16 or to the outside.

Since the information of the VBV buffer occupancy is multiplexed in the stream of the ES through such a process as described above, even if the recording format is changed or the data transmission format is changed, the information of the VBV buffer occupancy can be regenerated by an apparatus which receives the stream of the ES irrespective of the recording format or the transmission format.

Now, an editing process 2 is described with reference to a flow chart of FIG. 30.

At step S121, the CPU 11 receives an operation input of the user for instruction to start editing from the operation inputting section not shown and controls the south bridge 15 to read out the compression encoded data of the compressed material image 1 and the compression encoded data of the compressed material image 2 from the HDD 16 in accordance with the operation input of the user supplied thereto from the operation inputting section not shown. Further, the CPU 11 supplies the read out data to the memory 18 through the north bridge 12, PCI bus 14 and PCI bridge 17 so as to be stored into the memory 18, and supplies information which indicates an editing point and a command which indicates starting of editing to the CPU 20 through the north bridge 12, PCI bus 14, PCI bridge 17 and control bus 19.

At step S122, the memory 18 acquires two compression encoded editing material data.

At step S123, the CPU 20 determines decoding ranges of the compression encoded editing material data based on the information which indicates an editing point and the command which indicates starting of editing, supplied thereto from the CPU 11. The process for determining the decoding range may be performed, for example, the decoding range determination process 1 described hereinabove with reference to FIG. 19 or the decoding range determination process 21 described hereinabove with reference to FIG. 21 executed at step S3 of FIG. 18. The PCI bridge 27 extracts data necessary to decode and re-encode the data within the determined decoding ranges from the two compression encoded editing material data stored in the memory 18 under the control of the CPU 20 and supplies the extracted data to the decoder 22 and the decoder 23. Further, the PCI bridge 17 supplies the compression encoded editing material data in portions for which re-encoding is not performed to the stream splicer 25.

Figure 31:
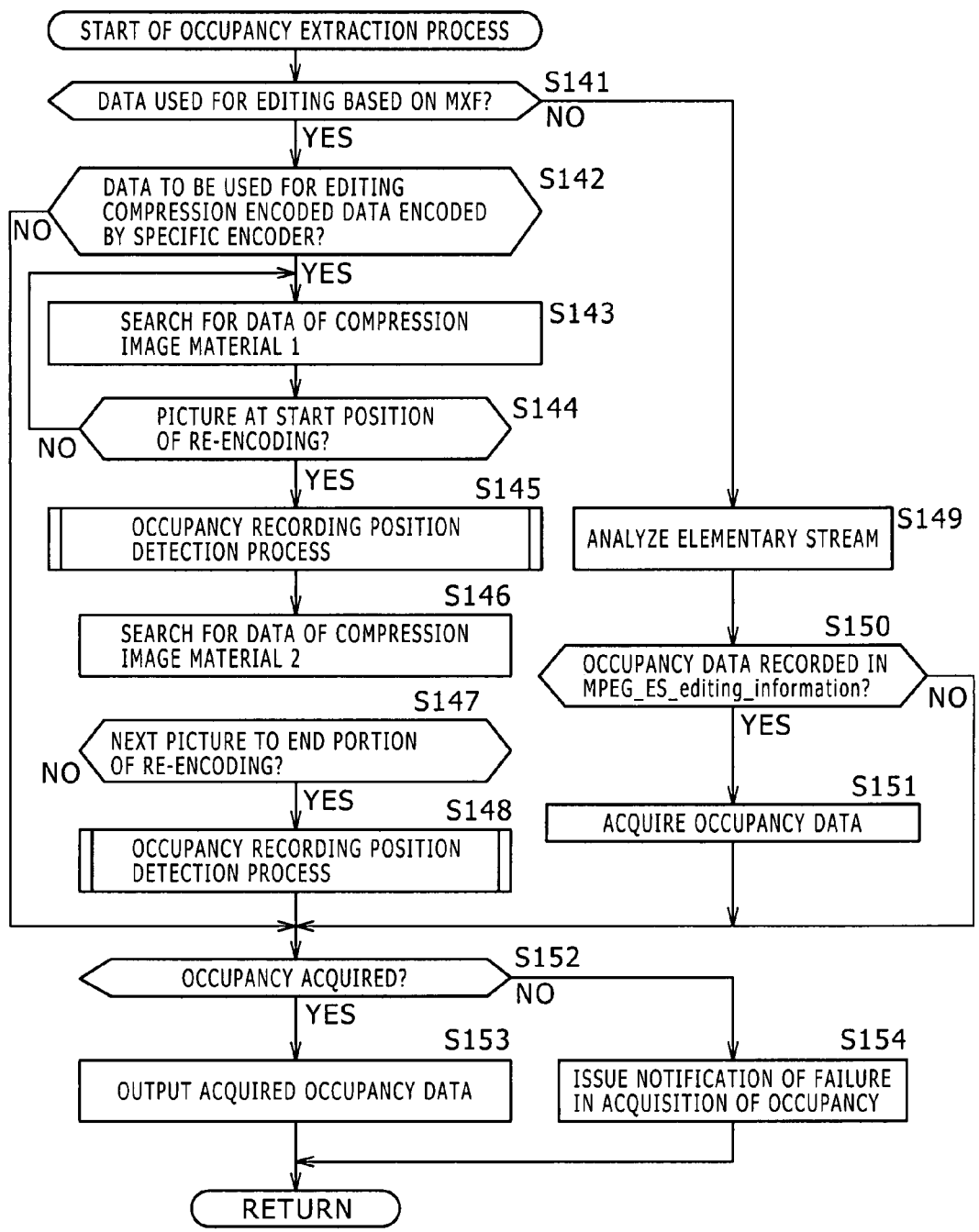
FIG. 31 is a flow chart illustrating an occupancy extraction process.

At step S124, an occupancy extraction process hereinafter described with reference to FIG. 31 is executed.

At step S125, the CPU 20 controls the decoder 22 and the decoder 23 to decode the data within the determined decoding ranges. The decoder 22 and the decoder 23 decode the compression encoded editing material data supplied thereto and supply the decoded data to the effect/switch 26 under the control of the CPU 20.

At step S126, the CPU 20 controls the effect/switch 26 to splice the decoded data with each other at the editing point and apply an effect to the spliced data as occasion demands. The effect/switch 26 splices the non-compressed decoded image materials supplied thereto at the editing point and applies an effect to the resulting image material as occasion demands, and then supplies the resulting image material to the encoder 427.

At step S127, the CPU 20 controls the encoder 427 to re-encode the non-compressed decoded image material produced by splicing at the editing point using the extracted information of the VBV buffer occupancy. The encoder 427 utilizes the information of the VBV buffer occupancy supplied thereto from the CPU 20 to perform re-encoding of the non-compressed decoded image material produced by splicing at the editing point so that the VBV buffer Occupancies of the I picture at the top of the re-encoding interval and the next I picture in the re-encoding interval coincide with each other before and after editing in order to make the VBV buffer Occupancies on the front and the rear of the re-encoding interval be continuous to each other as described hereinabove with reference to FIG. 23. Further, the encoder 427 acquires the information of the VBV buffer occupancy obtained upon re-encoding and supplies the re-encoded compression encoded image data and the information of the VBV buffer occupancy to the stream splicer 25.

At step S128, the stream splicer 25 splices the re-encoded compression encoded image data and the compression encoded editing material data in a portion, for which re-encoding is performed, supplied thereto to produce edited compression encoded data and supplies the produced data to the memory 18 through the PCI bridge 17 together with the information of the VBV buffer occupancy so as to be stored into the memory 18. Thereafter, the processing is ended.

It is to be noted that, where the decoding range determination process 1 described hereinabove with reference to FIG. 19 is executed as a process for determining a decoding range at step S123, a process basically similar to the re-encoding and connection process 1 described hereinabove with reference to FIG. 20 is executed at steps S127 and S128. Further, where the decoding range determination process 2 described hereinabove with reference to FIG. 21 is executed as a process for determining a decoding range at step S123, a process basically similar to the re-encoding and connection process 2 described with reference to FIG. 22 is executed at steps S127 and S128.

Since, through such a process as described above, compressed image data of the Open GOP structure of a Long GOP in the proximity of the editing point is partly decoded and the decoded non-compressed image signals are spliced with each other at a predetermined editing point and the re-encoding is performed utilizing the information of the VBV buffer occupancy such that the VBV buffer Occupancies of the I picture at the top in a range for which re-encoding is performed and the I picture at the top spliced to a range for which re-encoding is performed coincide with each other before and after editing and then the re-encoded compressed image data is spliced with the compressed image data ay a portion for which decoding or re-encoding is not performed, failure of the VBV buffer can be prevented and editing of compressed image data having the Open GOP structure of a Long GOP can be implemented.

Figure 30:
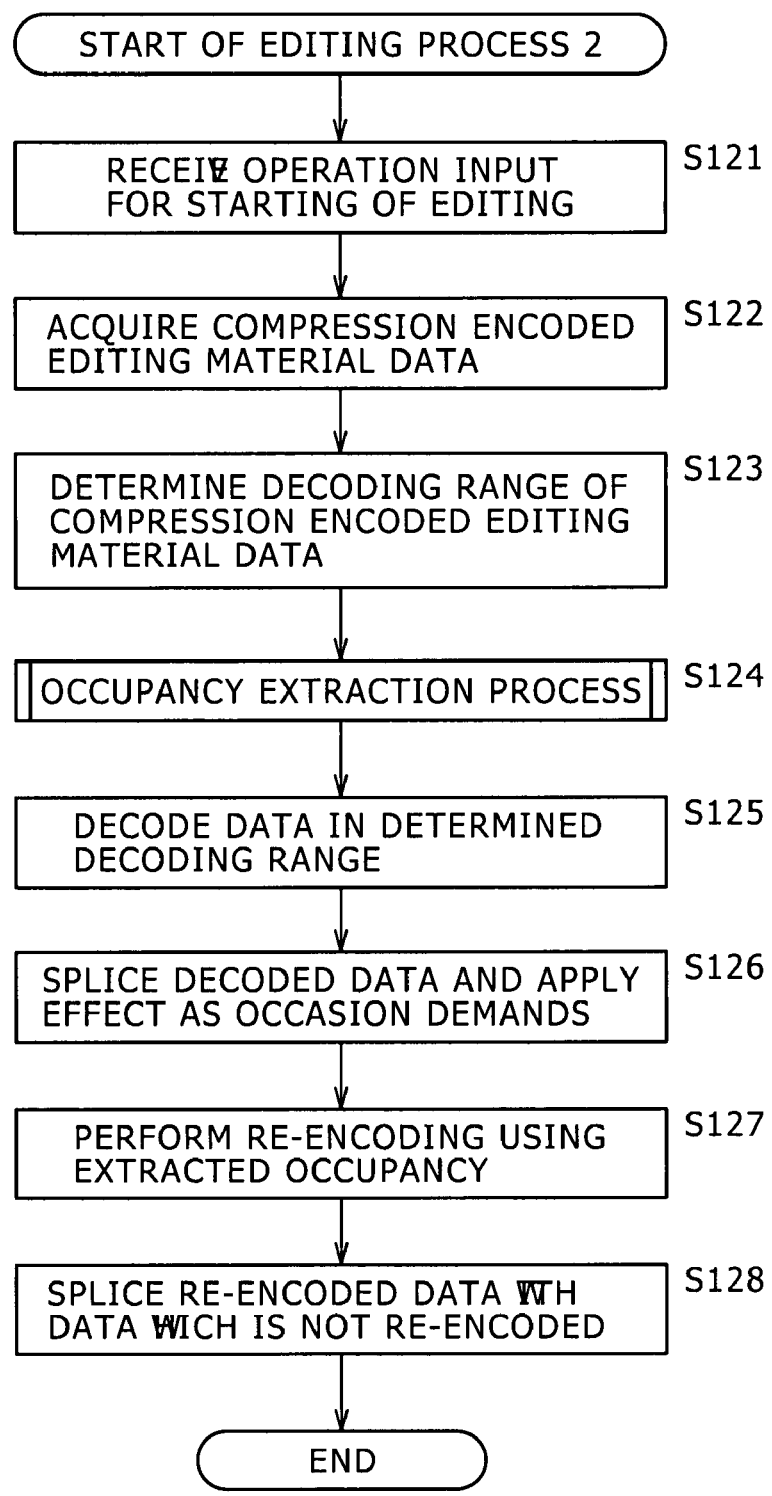
FIG. 30 is a flow chart illustrating an editing process 2.

Now, the occupancy extraction process executed at step S124 of FIG. 30 is described with reference to a flow chart of FIG. 31.

At step S141, the CPU 20 decides whether or not data which is stored in the memory 18 and is to be used for editing is data which conforms to the MXF. If it is decided at step S141 that the data to be used for editing is not data which conforms to the MXF, then the processing advances to step S149 hereinafter described.

If it is decided at step S141 that the data to be used for editing is data which conforms to the MXF, the CPU 20 decides at step S142 based on information described in the Identifier of the MXF Header 461 described hereinabove with reference to FIG. 28 whether or not the data to be used for editing is compression encoded data encoded by a specific encoder which can produce data through the data production process described hereinabove with reference to FIG. 29.

If it is decided at step S142 that the data to be used for editing is compression encoded data encoded by the specific encoder, then the CPU 20 searches the data of the compression image material 1 at step S143 and decides whether or not the data is a picture at the start position of re-encoding at step S144. If it is not decided at step S144 that the data is a picture at the start position of re-encoding, then the processing returns to step S143 so that the process is repetitively executed until a picture at the start position of re-encoding is searched out.

Figure 32:
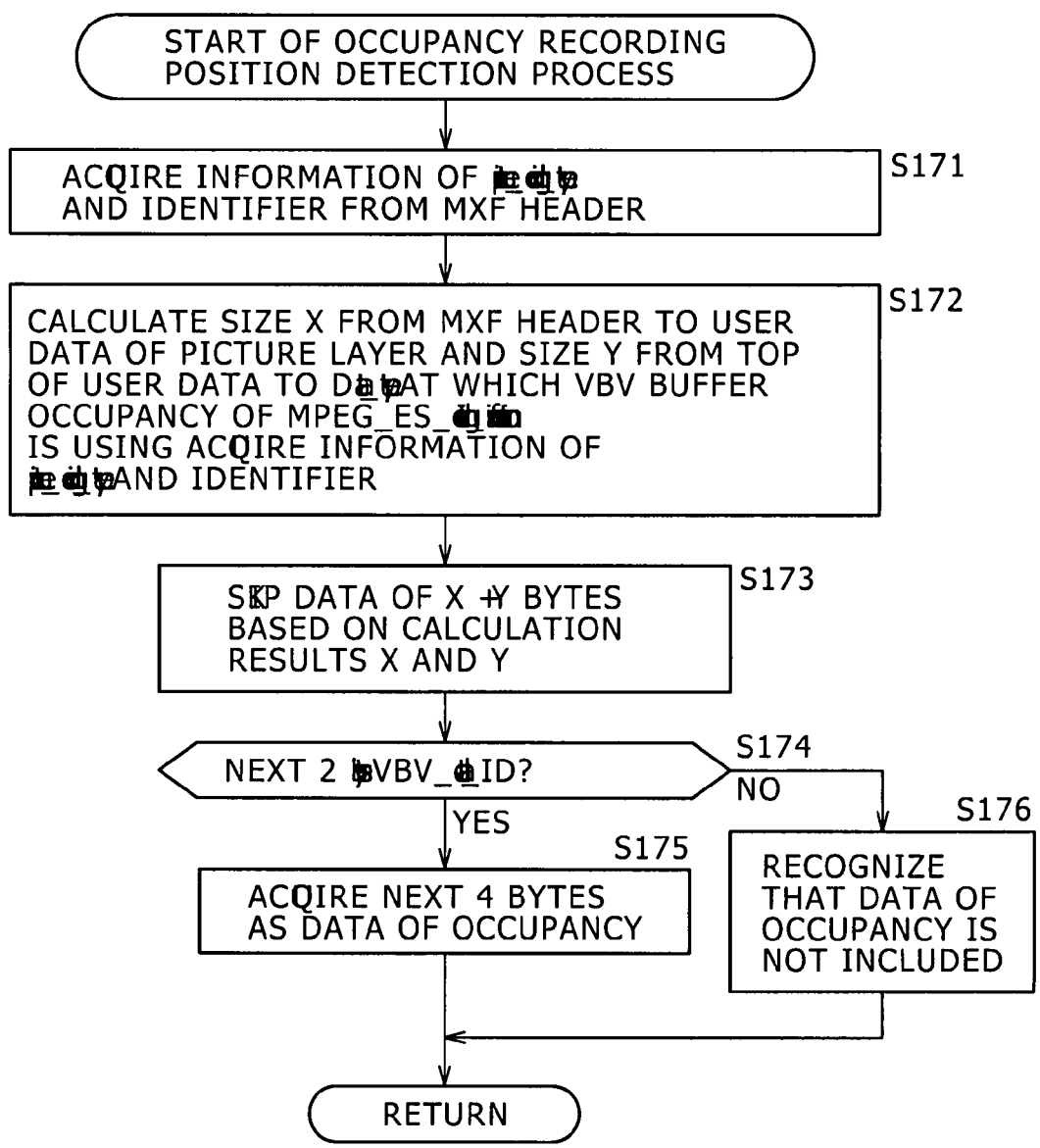
FIG. 32 is a flow chart illustrating an occupancy recording position detection process.

If it is decided at step S144 that the data is a picture at the start position of re-encoding, then an occupancy recording position detection process hereinafter described with reference to FIG. 32 is executed at step S145.

The CPU 20 searches the data of the compression image material 2 at step S146 and decides whether or not the data is a picture at the end position of re-encoding at step S147. If it is decided at step S147 that the data is not a picture at the end position of re-encoding, then the processing returns to step S146 so that the process is repetitively executed until the data is a picture at an ending position of re-encoding.

If it is decided at step S147 that the data is a picture at the end position of re-encoding, then the occupancy recording position detection process hereinafter described with reference to FIG. 32 is executed at step S148.

If it is decided at step S141 that the data to be used for editing is not data which conforms to the MXF, then the CPU 20 analyzes the elementary stream at step S149.

At step S150, the CPU 20 extracts pictures corresponding to the start position and the end position of re-encoding, and searches a predetermined position of the MPEG_ES_editing_information 451 described hereinabove with reference to FIG. 25 to decide whether or not occupancy data is described.

If it is decided at step S150 that occupancy data is described, then the CPU 20 acquires the occupancy data at step S151.

In a case wherein it is decided at step S142 that the data to be used for editing is not compression encoded data encoded by the specific encoder, in another case wherein it is decided at step S150 that the occupancy data is not described after the process at step S148 comes to end, or after the process at step S151 comes to an end, the CPU 20 decides whether or not an occupancy is acquired successfully at step S152.

If it is decided at step S152 that an occupancy is acquired successfully, then the CPU 20 outputs, at step S153, the acquired data of the occupancy to the encoder 427 through the control bus 19, and the processing returns to step S124 of FIG. 30 and then advances to step S125.

If it is decided at step S152 that an occupancy is not acquired successfully, the CPU 20 notifies, at step S154, the user that an occupancy cannot be acquired successfully as occasion demands, and the processing returns to step S124 of FIG. 30 and then advances to step S125.

Through such a process as described above, since an occupancy is extracted from the stream and supplied to the encoder 427, the encoder 427 can perform encoding based on the correct information of the occupancy before editing so that failure of the VBV buffer is prevented.

Now, the occupancy recording position detection process to be executed at steps S145 and S148 of FIG. 31 is described with reference to a flow chart of FIG. 32.

At step S171, the CPU 20 acquires information of picture_coding_type and Identifier from the MXF Header 461.

At step S172, the CPU 20 refers to the table data stored in the memory 21 using the acquired information of the picture_coding_type and Identifier to calculate the size X from the MXF Header 461 to the user data in the picture layer and the size Y from the top of the User Data to the Data_type in which the VBV buffer occupancy of the MPEG_ES_editing_information is placed as described hereinabove with reference to FIG. 28.

At step S173, the CPU 20 skips data of X+Y bytes based on the calculation results X and Y at step S172.

At step S174, the CPU 20 decides whether or not 2 bytes next to the skipped data of X+Y bytes are VBV_data_ID.

If it is decided at step S174 that next 2 bytes are the VBV_data_ID, then the CPU 20 acquires, at step S175, next 4 bytes as data of the occupancy, and the processing returns to step S145 or step S148 and then advances to step S146 or step S149.

If it is decided at step S174 that next 2 bytes are not then VBV_data_ID, then the CPU 20 recognizes at step S176 that the data of the occupancy is not included in the MXF data, and the processing returns to step S145 or step S148 of FIG. 31 and then advances to step S146 or step S149.

Through such a process as described above, the information of the picture_coding_type and the Identifier can be acquired from the MXF Header 461 of the MXF data described hereinabove with reference to FIG. 28 and the information of the occupancy can be acquired based on the acquired information without analyzing the entire data. Accordingly, the processing speed increases when the information of the occupancy is used upon re-encoding process.

By applying the present invention in such a manner as described above, it is possible to perform re-encoding and splice compressed image data in a portion for which decoding or re-encoding such that the VBV buffer Occupancies of the I picture at the top of range for which re-encoding is performed and the I picture at the top connected to the range for which re-encoding is performed coincide with each other before and after editing utilizing the information of the VBV buffer occupancy.

Accordingly, in the editing apparatus 1 to which the present invention is applied, material images each stored as an ES in which a time stamp is not used can be edited while satisfying a restriction to the VBV buffer. Consequently, failure of the VBV buffer can be prevented and editing of compressed image data having the Open GOP structure of a Long GOP can be implemented. Therefore, a compressed editing image with which skip or freeze of a picture does not occur can be produced and editing of a compression image of the LONG GOP in a high degree of compression efficiency can be utilized in a system for production of broadcasting programs or the like.

It is to be noted that, while it is described that the compressed material image 1 and the compressed material image 2 within a re-encoding range are decoded also in the processes described with reference to the flow charts of FIGS. 29 to 32, the decoding range may be determined separately from the re-encoding range based on the re-encoding range. In particular, the decoding range may be a same range as the re-encoding range or a greater range including the re-encoding range.

Incidentally, in a multiplexed stream defined by the MPEG 2 system, a PES (Packetized Elementary Stream) is placed as an immediately lower Layer not only of a transport stream (Transport Stream) but also of a program stream (Program Stream). A PES packet header includes information of a PTS (presentation time stamp) for providing presentation time of audio or video, a DTS (decoding time stamp) for providing decoding starting time, a controlling signal for performing scrambling in a unit of a packet, a CRC for error detection and so forth.

The encoder can control the buffer occupation amount irrespective of whether or not there is vbv_delay information in a stream based on the DTS, the PTS and a buffer remaining amount at present. However, where an ES (Elementary Stream) compressed in a VBR (Variable Bit Rate) method which does not have time information is handled, since the value of the vbv_delay is fixed to a maximum value, no measure is available to detect the occupation amount of a buffer. Therefore, the encoder cannot decide the buffer occupation amount only from information of a frame to be encoded.

When such a stream in which time designation is not included as just described is to be encoded, since the buffer occupation amount at a VBR does not exceed an upper limit thereto (the buffer occupation amount clings to the predetermined time VBV_MAX), the buffer does not fail. However, if an underflow occurs, then the buffer fails, which has an influence on an image to be outputted.

When such a stream in which time designation is not included as described above is to be encoded, generally the generation code amount within a re-encoding interval is limited by starting reproduction from an upper limit to the buffer at a start point of a sequence or by like means to prevent the buffer underflow.

However, if the generation code amount is limited in the proximity of an editing point, then the picture quality is sometimes deteriorated remarkably under certain circumstances because the generation code amount cannot be allocated sufficiently in the proximity of the last picture of the stream generated by re-encoding.

Now, a method by the CPU 11 of FIG. 4 or FIG. 24 of determining the buffer occupation amount at a splicing point between a re-encoding interval and an interval for which re-encoding is not performed is described as an example of a process for maintaining, when an ES of a VBR having no time information is edited, the continuity of the VBV buffer occupancy between the re-encoding portion and the portion for which re-encoding is not performed.

In particular, where the CPU 11 reads out editing object compressed image data 1 (hereinafter referred to also as material 1) and editing object compressed image data 2 (hereinafter referred to also as material 2) which are two image materials from among data recorded in the HDD 16 and partly decodes the data only in the proximity of an editing point and splices the read out data and then re-encodes the spliced data to edit the data, the CPU 11 can determine a lower limit value to the first buffer occupation amount and an upper limit value to the last buffer occupation amount in each re-encoding range with which the limitation to the buffer occupation amounts before and after a splicing point can be minimized thereby to sufficiently allocate the generation code amount while the specification for the virtual buffer occupation amount upon re-encoding is satisfied to maintain the continuity between the buffer occupation amounts of the re-encoding portion and the portion for which re-encoding is not performed, and output the lower limit value and the upper limit value together with a command for controlling an editing process to be executed by the CPU 20. While details of determination of the set value for the buffer occupation amount at the first and the last of the re-encoding rage are hereinafter described, where the countermeasure described is taken, a greater generation code amount can be provided to the re-encoding range, and therefore, deterioration of the picture quality in the proximity of the editing point can be prevented as far as possible.

Data of the material 1 and the material 2 compressed at a VBR (variable bit rate) are stored in the HDD 16.

The CPU 11 acquires information regarding the generation code amounts of data of the material 1 and data of the material 2 both in a compression encoded form selected as materials to be used for editing from among compression encoded image materials retained in the HDD 16 based on an operation input of a user supplied from the operation inputting section not shown, and determines the buffer occupation amounts at the top and the end of the re-encoding range based on the acquired information.

Figure 33:
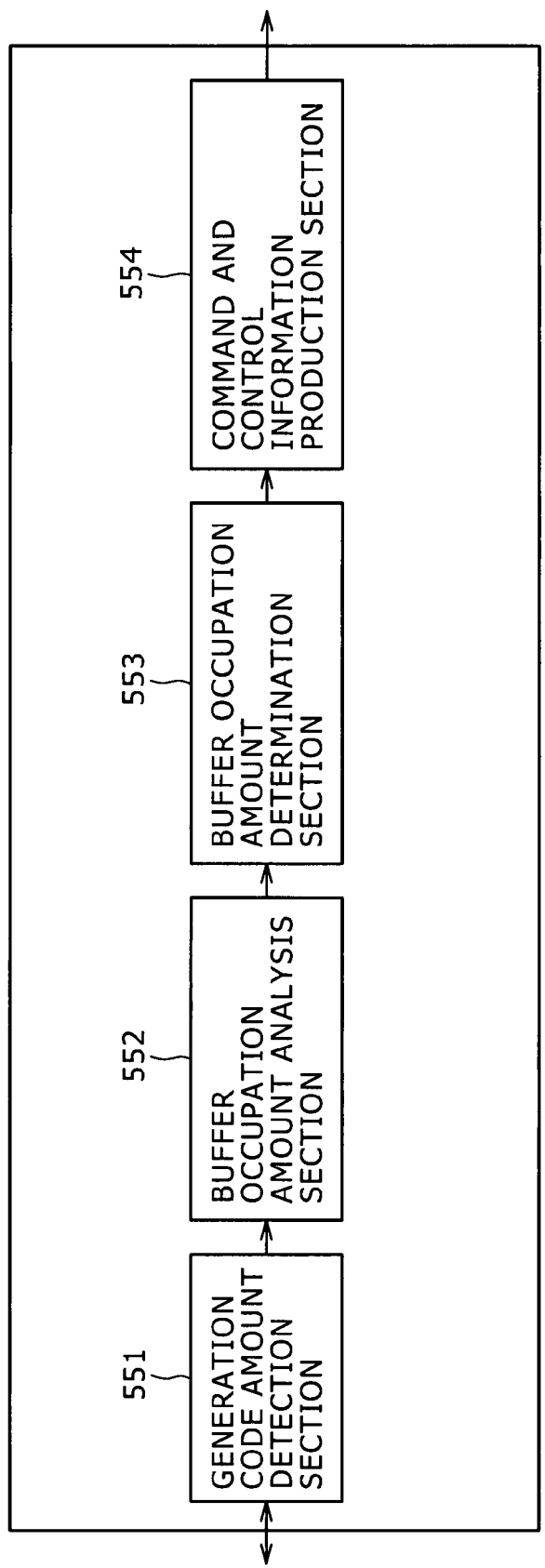
FIG. 33 is a functional block diagram illustrating a function which can be executed by a CPU 11 of FIG. 2.

FIG. 33 is a functional block diagram illustrating functions which the CPU 11 has in order to determine the generation code amount in the proximity of an editing point and determine a re-encoding interval.

A generation code amount detection section 551 detects the generation code amount of a material 1 and a material 2 stored in the HDD 16 for being edited and supplies the detected generation code amounts to a buffer occupation amount analysis section 552. The detection method of the code generation amount may be such that, for example, data of the material 1 and the material 2 stored in the HDD 16 are analyzed to detect the code amounts (that is, code amounts between picture headers) or the data of the material 1 and the material 2 to be edited are decoded once by the decoders 22 to 24 to detect the accumulation amounts of the buffers.

The buffer occupation amount analysis section 552 analyzes, based on the information of the code generation amounts of the material 1 and the material 2 supplied thereto from the generation code amount detection section 551, a model state of the buffer occupation amounts in the proximity of a splicing point between a range for which re-encoding is not performed and a re-encoding interval.

Figure 34:
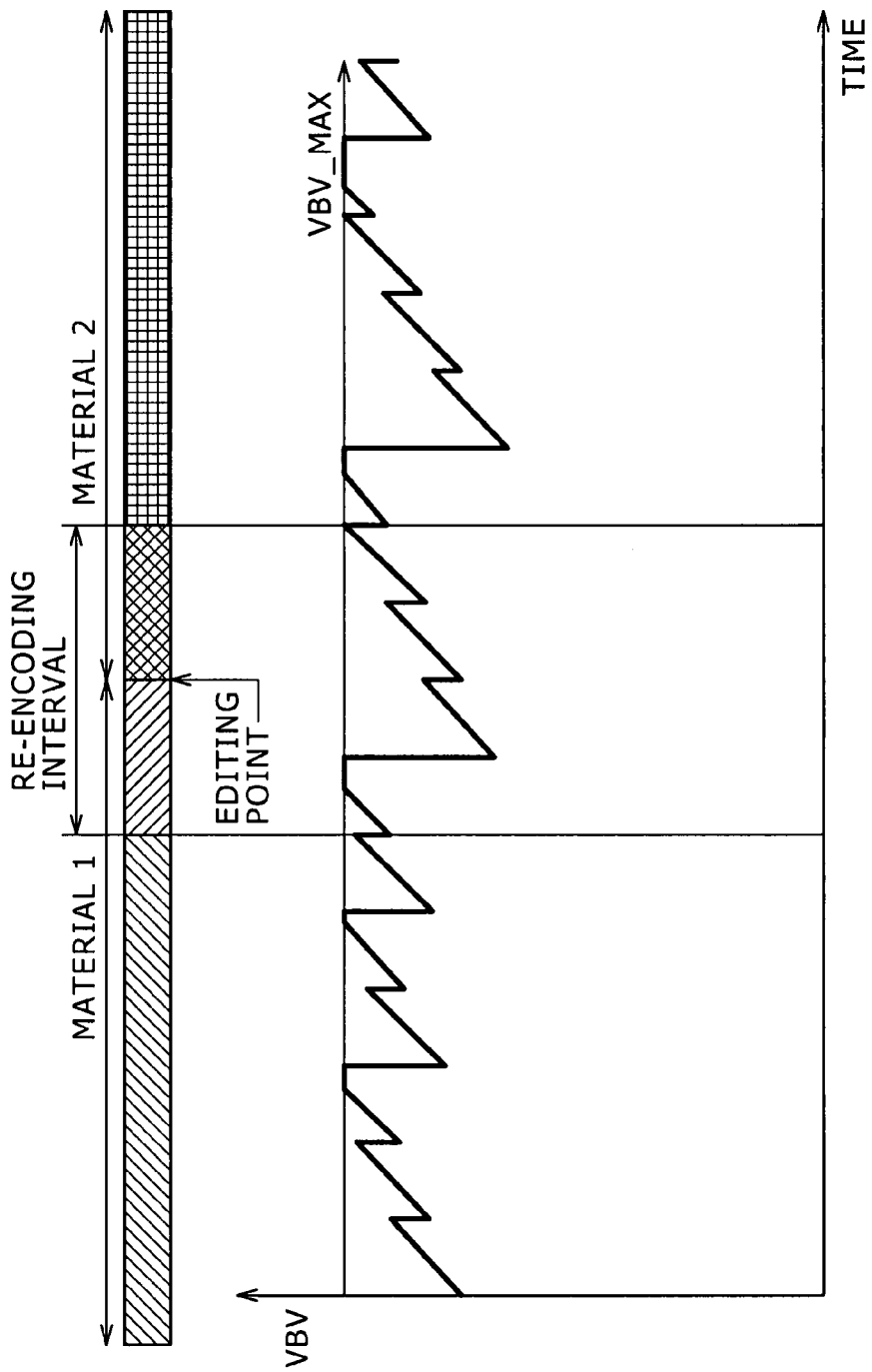
FIG. 34 is a view illustrating a re-encoding interval and a locus which indicates a buffer occupation amount.

According to an image compressed by the VBR method, since the buffer occupation amount does not exceed an upper limit thereto (the buffer occupation amount exhibits such a state that it clings to the VBV_MAX for a predetermined period of time) as shown in FIG. 34, the buffer does not fail. However, if the buffer occupation amount underflows, then the buffer fails and an influence is had on an image to be outputted.

In a case wherein a stream encoded by the CBR (Constant Bit Rate) method is handled, the buffer occupation amount can be calculated by calculating the position of an object picture in the buffer based on the values of bit_rate_value (Sequence_header), bit_rate_extension (Sequence_extension) and vbv_delay (picture_header). However, in the case of the VBR, since the value of the vbv_delay on which the calculation is based is its maximum value (0xFFFF), a correct buffer occupation amount cannot be calculated.

When an elementary stream in which reproduction time information is not described is handled in this manner, if an encoded stream can be decoded from the top thereof, then the encoder can regenerate an intended locus of the buffer occupation amount. However, from a common sense, decoding is not always performed from the top of a stream. Accordingly, the encoder must calculate such a virtual locus of the buffer occupation amount that a miss of an image by an underflow may not occur.

Figure 35:
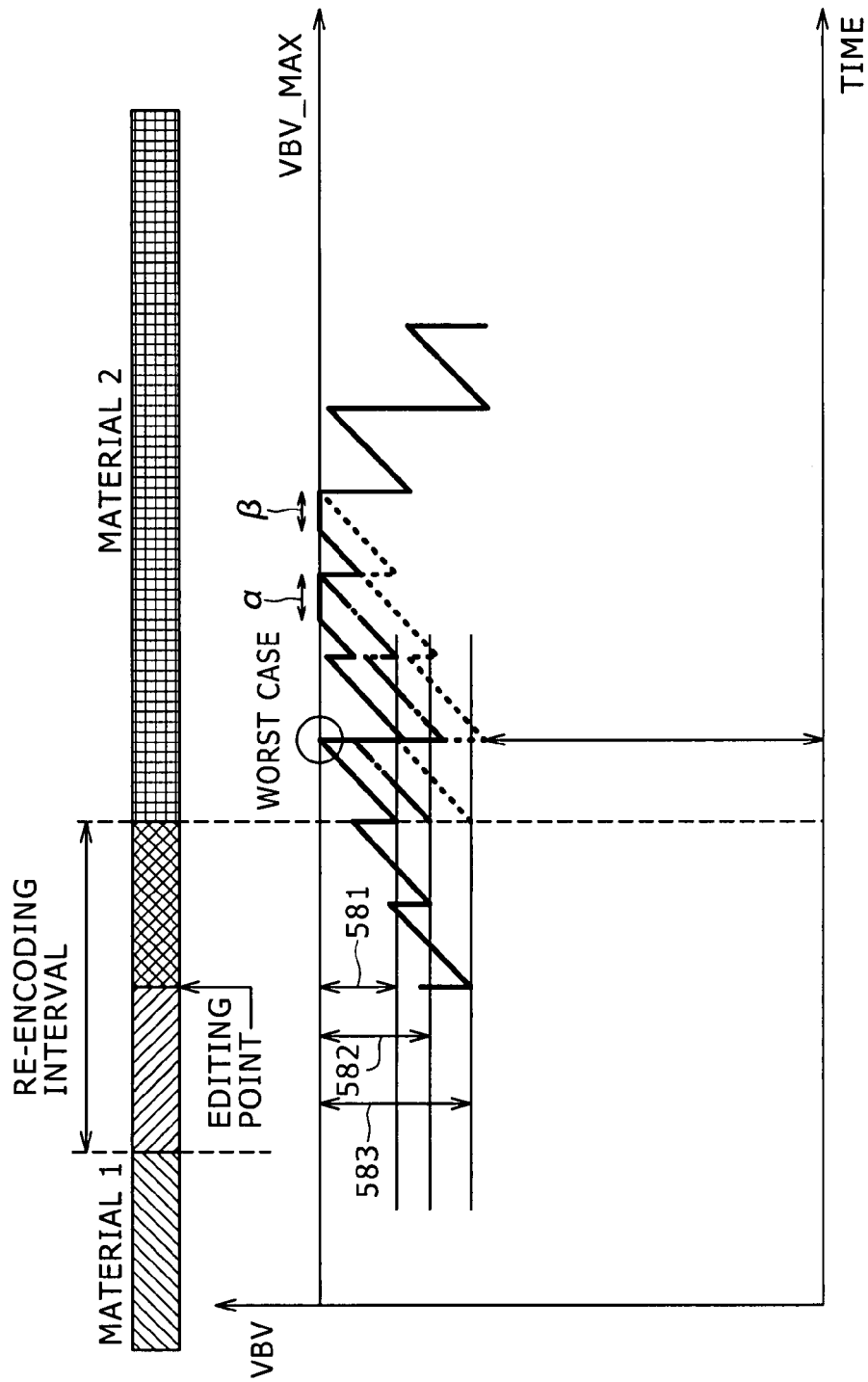
FIG. 35 is a view illustrating determination of a final buffer occupation amount in the re-encoding interval.

Thus, according to a first model state for analyzing the buffer occupation amount, detected by the generation code amount detection section 551, in the proximity of the splicing point between the range for which re-encoding is not performed and the re-encoding interval, the buffer occupation amount analysis section 552 calculates a virtual locus of the buffer occupation amount in the proximity of the splicing point between the last material 2 in the re-encoding interval and a portion of the material 2 which is not re-encoded taking a case wherein the buffer occupation amount at the first picture of the material 2 spliced to the re-encoding interval is the VBV_MAX as shown in FIG. 35 as the worst case wherein a sufficient code amount cannot be allocated in the proximity of the end point of the re-encoding interval.

Figure 36:
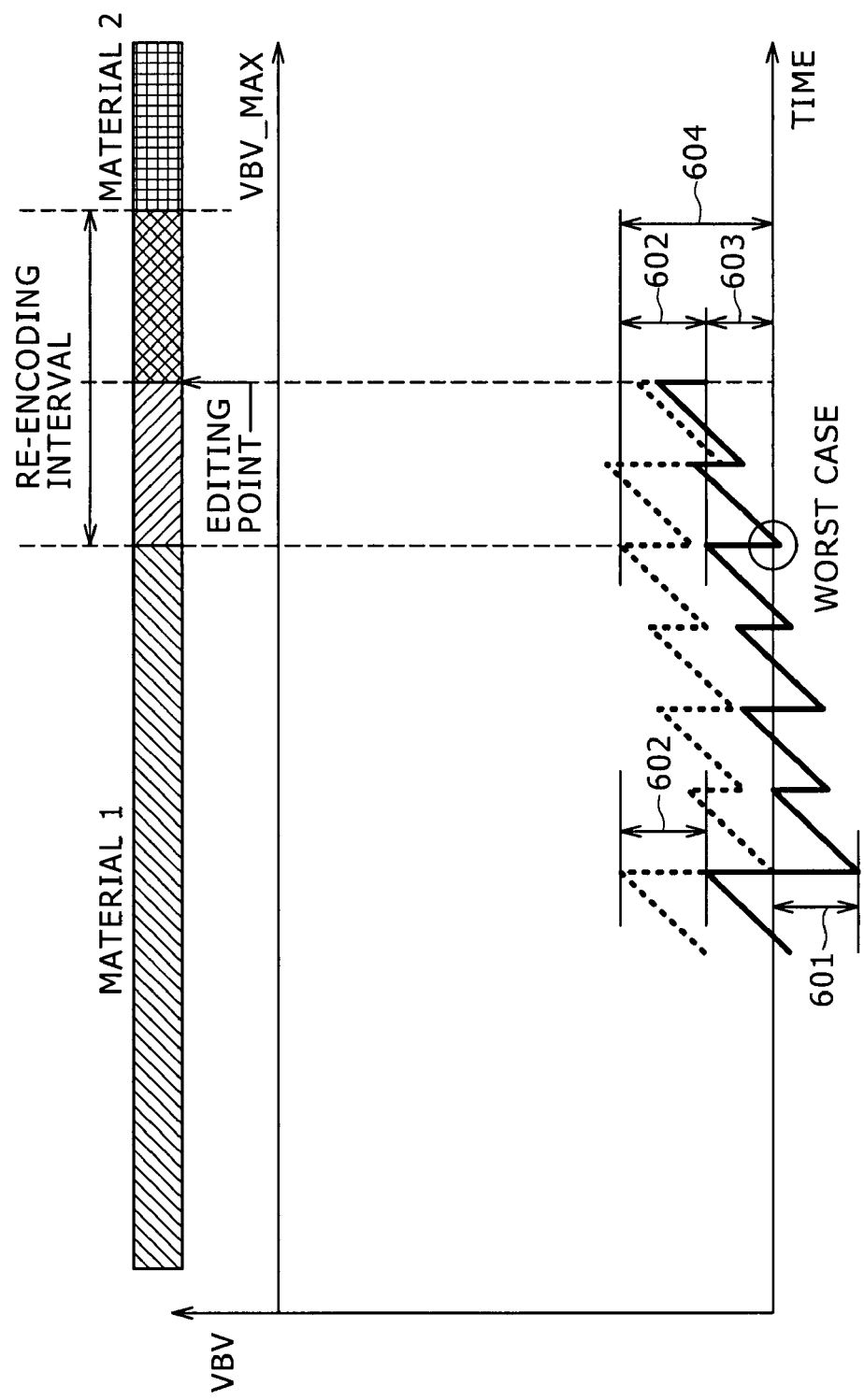
FIG. 36 is a view illustrating determination of a first buffer occupation amount in the re-encoding interval.

Meanwhile, according to a second model state for analyzing the buffer occupation amount in the proximity of the splicing point between the range for which re-encoding is not performed and the re-encoding interval, the buffer occupation amount analysis section 552 calculates a virtual locus of the buffer occupation amount in the proximity of the splicing point between a portion of the material 1 which is not re-encoded and another portion of the material 1 in the re-encoding interval taking a case wherein the buffer occupation amount at the splicing point between the re-encoding interval and the material 1 is zero as shown in FIG. 36 as the worst case wherein a sufficient code amount cannot be allocated in the proximity of the start point of the re-encoding interval.

Then, the buffer occupation amount analysis section 552 supplies the calculated virtual loci of the buffer occupation amount of the first mode and the second model to a buffer occupation amount determination section 553.

It is to be noted that, as the analysis range of the buffer occupation amount analysis section 552 increases, the possibility that better control can be achieved increases, and in the meantime, the processing time increases. The analysis range is suitably formed from one or two GOPs where it corresponds to a reproduction period of time of approximately one to two seconds or where compression encoded data of a material is encoded in accordance with the Long GOP method of the MPEG. However, a value which can be suitably set empirically or experimentally can be used for the analysis range.

Since the encoder performs encoding while it performs buffer management so that, even at a VBR, the prescription for the VBV buffer is observed, it is considered that, if the buffer occupation amount comes to its upper limit at any picture of the material 2 within a region for which re-encoding is not performed, which succeeds a re-encoding interval, then the buffer occupation amount after then does not become lower than a lower limit thereto. Accordingly, if buffer control in the re-encoding interval is performed so that the buffer occupation amount at the first frame spliced to the re-encoding interval of the material 2 corresponds to the upper limit as in the worst case illustrated in FIG. 35, then an editing process can be performed without any violation of the standards.

However, in the worst case described above, control must be performed such that the buffer occupation amount at the last of the re-encoding interval assumes some value within a range from a value lower by "maximum bit rate×1-frame time period" than the upper limit VBV_MAX to VBV_MAX. Therefore, the limitation to the code distribution within the re-encoding interval becomes very severe, resulting in the possibility that the picture quality may be deteriorated.

Thus, the buffer occupation amount determination section 553 searches whether or not there is a state wherein the buffer occupation amount clings to the VBV_MAX as indicated by α and β of FIG. 35 in the worst case wherein the buffer occupation amount VBV_MAX is exhibited at the first picture to be connected to the re-encoding interval of the material 2. Where there is a state wherein the buffer occupation amount clings to the VBV_MAX as indicated by α and β of FIG. 35, the virtual locus of the buffer occupation amount is corrected to a lower value only within the intervals indicated by α and β to lower the last value of the buffer occupation amount of the re-encoding interval while a state wherein the buffer occupation amount exhibits the upper limit among those pictures of the material within the interval for which re-encoding is not performed is determined. However, at this time, the buffer occupation amount determination section 553 corrects the virtual locus of the buffer occupation amount downwardly within a range within which no underflow occurs.

In particular, if the virtual locus of the buffer occupation amount is corrected downwardly only within the "period indicated by maximum bit rate×α" in FIG. 35, then if no underflow occurs, then the last value of the buffer occupation amount within the re-encoding interval can be controlled within the range of a region indicated by an arrow mark 582 which is greater than the region indicated by an arrow mark 581. Further, if the virtual locus of the buffer occupation amount is corrected downwardly only within the "period indicated by maximum bit rate×β", then if no underflow occurs, then the last value of the buffer occupation amount within the re-encoding interval can be controlled within the range of a region indicated by an arrow mark 583 which is further wider than the region indicated by the arrow mark 582.

By the control described, the lower limit value to the buffer occupation amount at the end point of the re-encoding interval can be reduced from that in the worst case (can be set to a lower value), and consequently, the upper limit value to the code amount which can be allocated to the last frame in the re-encoding can be increased. As a result, the degree of freedom in control of the buffer occupation amount in the re-encoding interval increases and control of the code distribution in the re-encoding interval is facilitated. Consequently, deterioration of the picture quality within the re-encoding interval can be prevented.

Further, as shown in FIG. 36, in the worst case wherein the buffer occupation amount at the splicing point between the re-encoding period and the material 1 becomes zero, only a code amount smaller than the code amount of "maximum bit rate×1-frame time period" can be allocated to the first frame in the re-encoding interval, and therefore, there is the possibility that the picture quality may be deteriorated.

The material 1 is a compressed image for which buffer management is performed so that the prescription for the VBV buffer may be observed. Therefore, if a picture at which the buffer occupation amount underflows exists on the virtual locus of the buffer occupation amount within the analysis range of the material 1 with reference to the worst case, then even if the virtual locus of the buffer occupation amount is corrected upwardly by an amount corresponding to the underflow, control wherein the prescription for the VBV buffer is observed can be performed within the re-encoding interval. In particular, if a picture at which the buffer occupation amount underflows exists on the virtual locus of the buffer occupation amount within the analysis range of the material 1 with reference to the worst case, then the buffer occupation amount determination section 553 corrects the virtual locus of the buffer occupation amount upwardly by an amount corresponding to the underflow to determine the first buffer occupation amount in the re-encoding range. Consequently, the upper limit to the buffer occupation amount at the start point of the re-encoding interval can be increased (can be set to a higher value) and the degree of freedom of the code amount which can be distributed to the first frame can be increased. As a result, deterioration of the picture quality can be prevented.

In particular, if the virtual locus of the buffer occupation amount is corrected upwardly as indicated by an arrow mark 602 by an amount corresponding to the buffer occupation amount indicated by an arrow mark 601 at which the buffer occupation amount within the analysis range of the material 1 underflows by a maximum amount in FIG. 36, then the first buffer occupation amount within the re-encoding range can be changed from a value within a range smaller than the code amount of "maximum bit rate×1-frame time period" indicated by an arrow mark 603 to allocation of a generation code amount within a range indicted by an arrow mark 604 corresponding to the code amount of "maximum bit rate×1-frame time period" indicated by the arrow mark 603+arrow mark 602. Consequently, deterioration of the picture quality can be prevented.

A command and control information production section 554 acquires the values of the buffer occupation amount at the top and the last of the re-encoding interval determined by the buffer occupation amount determination section 553 and produces an editing starting command from the acquired information and the information of the editing point designated by the user.

An editing process 3 executed by the editing apparatus 1 to which the present invention is applied is described with reference to a flow chart of FIG. 37.

At step S201, the CPU 11 receives an operation input of a user for instruction to start editing from the operation inputting section not shown.

At step S202, the CPU 11 controls the south bridge 15 based on the operation input of the user supplied thereto from the operation inputting section not shown to copy compression coded data of the material 1 and compression coded data of the material 2 from the HDD 16 and supply and store the copied data to and into the memory 18 through the north bridge 12, PCI bus 14 and PCI bridge 17. Further, the CPU 11 controls the south bridge 15 to supply information representative of an editing point and a decoding interval (or a re-encoding interval) and a command for instruction to start editing to the CPU 20 through the north bridge 12, PCI bus 14, PCI bridge 17 and control bus 19. The memory 18 acquires the compression coded data of the two editing materials.

At step S203, the CPU 20 determines a decoding range of the compression encoded editing material data based on the information representative of the editing point and the command for instruction to start editing, supplied thereto from the CPU 11. The process of determining the decoding range may be, for example, the decoding range determination process 1 described hereinabove with reference to FIG. 19 or the decoding range determination process 21 described hereinabove with reference to FIG. 21, which are executed at step S3 of FIG. 18. The CPU 20 supplies the determined decoding range to the CPU 11.

Figure 38:
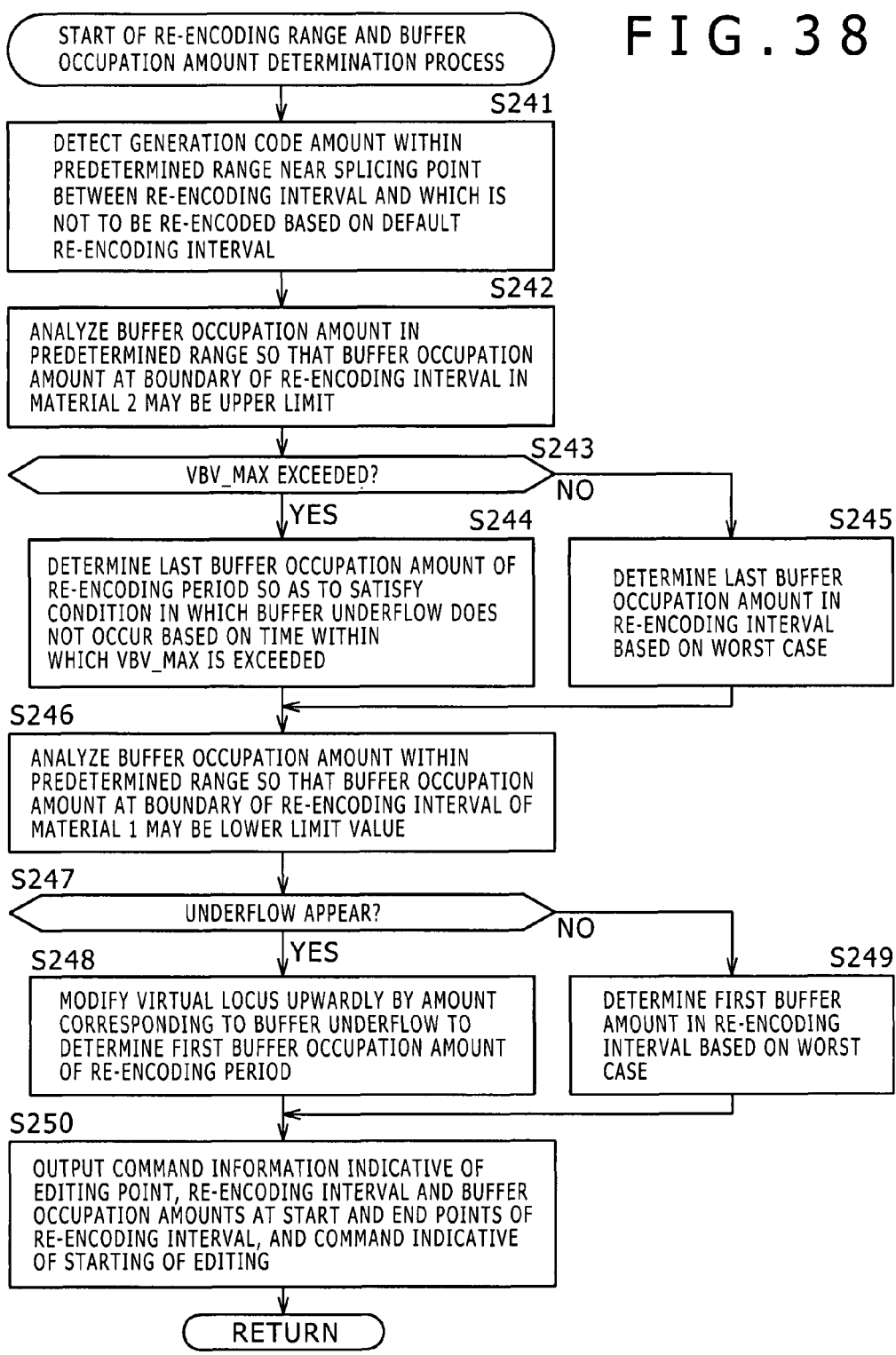
FIG. 38 is a flow chart illustrating a re-encoding and buffer occupation amount determination process.

At step S204, a buffer occupation amount determination process hereinafter described with reference to FIG. 38 is executed. The CPU 11 supplies information representative of buffer occupation amounts at the start point and the end point of the re-encoding interval to the CPU 20 through the north bridge 12, PCI bus 14, PCI bridge 17 and control bus 19.

At step S205, the CPU 20 controls the PCI bridge 17 to extract, from among the two compression coded editing material data stored in the memory 18, data within the ranges for which decoding is performed and data necessary for decoding and re-encoding the data within the ranges as occasion demands and supply the extracted data individually to the decoder 22 and the decoder 23.

Further, at this time, the CPU 20 controls the PCI bridge 17 to supply the compression coded editing material data at portions which are not to be re-encoded to the stream splicer 25. The PCI bridge 17 extracts the data within the determined decoding ranges and the data necessary to decode and re-encode the data in the ranges from within the two compression encoded editing material data stored in the memory 18 and supply the extracted data individually to the decoder 22 and the decoder 23. Further, the compression encoded editing material data at the portions for which re-encoding is not performed is supplied to the stream splicer 25.

Further, at this time, as occasion demands, the CPU 20 can acquire information, for example, regarding the type of an effect to be applied to an image within the re-encoding range or the degree of difficulty in encoding of pictures included in the re-encoding range.

At step S206, the CPU 20 controls the decoder 22 and the decoder 23 to decode the data in the determined decoding ranges. The decoder 22 and the decoder 23 decode the compression coded editing material data supplied thereto and supply resulting data to the effect/switch 26 under the control of the CPU 20.

At step S207, the CPU 20 controls the effect/switch 26 to splice the decoded data with each other at the editing point and apply an effect to the resulting data as occasion demands. The effect/switch 26 splices the non-compressed decoded image material supplied thereto at the editing point and apply an effect to the resulting data as occasion demands under the control of the CPU 20. Then, the resulting data are supplied to the encoder 27.

At step S208, the CPU 20 supplies the information representative of the buffer occupation amounts at the start point and the end point of the re-encoding interval and controls the encoder 27 to re-encode the image data decoded and spliced at the editing point. The encoder 27 performs re-encoding of the image data within the re-encoding interval from among the image data decoded and spliced at the editing point based on the information representative of the buffer occupation amounts at the start point and the end point of the re-encoding interval under the control of the CPU 20 in such a manner that the prescription for the VBV buffer is satisfied. The encoder 27 supplies the re-encoded image data to the stream splicer 25.

At step S209, the stream splicer 25 splices the compressed image data of the portion for which re-encoding is performed and the portion for which re-encoding is not performed with each other, and the processing is ended.

Through such a process as described above, by partly decoding portions of two image materials (compressed image data) in the proximity of an editing point, splicing the decoded non-compressed image signals at the predetermined editing point, re-encoding the resulting image signal and then splicing the re-encoded image signal to compressed image data in a portion for which decoding or re-encoding is not performed, editing of the compressed image data can be implemented.

It is to be noted that, if the decoding range determination process 1 described hereinabove with reference to FIG. 19 is executed as a process of determining a decoding range at step S202, then processes basically similar to those in the re-encoding and splicing process 1 described hereinabove with reference to FIG. 20 are executed at steps S208 and S209. Further, if the decoding range determination process 2 described hereinabove with reference to FIG. 21 is executed as a process of determining a decoding range at step S202, then processes basically similar to those of the re-encoding and splicing process 2 described hereinabove with reference to FIG. 22 are executed at steps S208 and S209.

Further, at this time, the encoder 27 performs re-encoding in such a manner that the prescription for the VBV buffer is satisfied based on the information representative of the buffer occupation amounts at the start point and the end point of the set re-encoding interval. Therefore, the degree of freedom in allocation of the generation code amount increases when compared with that in a conventional case, and deterioration of the picture quality can be prevented.

Figure 37:
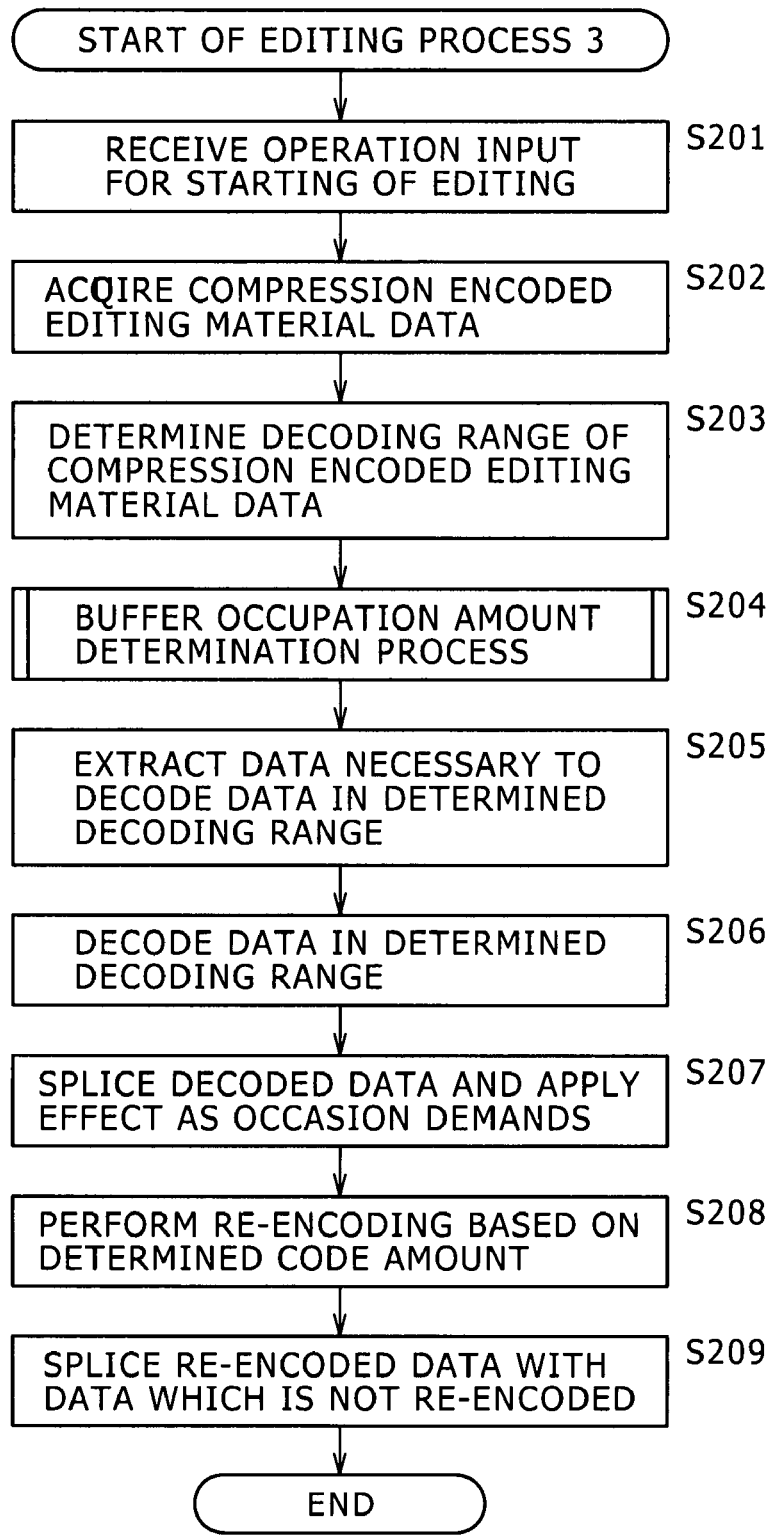
FIG. 37 is a flow chart illustrating an editing process 3.

Now, the buffer occupation amount determination process executed at step S204 of FIG. 37 is described with reference to a flow chart of FIG. 38.

At step S241, the generation code amount detection section 551 detects the generation code amounts of the material 1 and the material 2 within predetermined ranges in the proximity of a splicing point within intervals for which re-encoding is performed and intervals for which re-encoding is not performed based on the re-encoding intervals determined at step S203 and supplies the detected generation code amounts to the buffer occupation amount analysis section 552.

At step S242, the buffer occupation amount analysis section 552 analyzes the buffer occupation amount in a predetermined range in the worst case wherein the buffer occupation amount at a picture next to the boundary of the re-encoding interval in the material 2 becomes an upper limit similarly as described hereinabove with reference to FIG. 35 to determine a virtual locus of the buffer occupation amount in the worst case, and supplies the determined virtual locus to the buffer occupation amount determination section 553.

At step S243, the buffer occupation amount determination section 553 decides whether or not the virtual locus of the analyzed buffer occupation amount in the worst case has a portion in which the virtual locus of the buffer occupation amount exceeds the VBV_MAX.

If it is decided at step S243 that the virtual locus of the buffer occupation amount has a portion in which it exceeds the VBV_MAX, then the buffer occupation amount determination section 553 decides, at step S244, the last buffer occupation amount within the re-encoding interval based on the period of time (for example, $\alpha$, $\beta$ in FIG. 35) of the portion in which the virtual locus of the buffer occupation amount exceeds the VBV_MAX so that the condition in which a buffer underflow does not occur may be satisfied. Then, the processing advances to step S246.

If it is decided at step S243 that the virtual locus of the buffer occupation amount does not have a portion in which it exceeds the VBV_MAX, then the buffer occupation amount determination section 553 determines the last buffer occupation amount within the re-encoding interval based on the virtual locus of the buffer occupation amount in the worst case at step S245.

After the process at step S244 or step S245 comes to an end, at step S246, the buffer occupation amount analysis section 552 analyzes the buffer occupation amount within a predetermined range in the worst case wherein the buffer occupation amount on the boundary of the re-encoding interval in the material 1 becomes a lower limit as described hereinabove with reference to FIG. 36 to determine a virtual locus of the buffer occupation amount in the worst case. Then, the buffer occupation amount analysis section 552 supplies the determined virtual locus to the buffer occupation amount determination section 553.

At step S247, the buffer occupation amount determination section 553 decides whether or not an underflow occurs with the virtual locus of the analyzed buffer occupation amount in the worst case.

If it is decided at step S247 that an underflow occurs, then the buffer occupation amount determination section 553 corrects the virtual locus by an amount corresponding to the buffer underflow as described hereinabove with reference to FIG. 36 to determine the first buffer occupation amount in the re-encoding interval at step S248. Then, the processing advances to step S250.

If it is decided at step S247 that an underflow does not occur, then the buffer occupation amount determination section 553 determines the first buffer occupation amount in the re-encoding interval based on the virtual locus of the buffer occupation amount in the worst case at step S249.

After the process at step S248 or step 2471 comes to an end, the command and control information production section 554 produces information representative of buffer occupation amounts at the start point and the end point of the re-encoding interval and outputs the produces information to the CPU 20 at step S250. Thereafter, the processing returns to step S204 of FIG. 37 and then advances to step S205.

Through such a process as described above, when editing of an image compressed in accordance with the variable bit rate method is performed, a re-encoding interval and buffer occupation amounts at a start point and an end point of the re-encoding interval with which buffer control in the re-encoding interval is facilitated and the picture quality can be enhanced can be determined without analyzing all of data of materials.

By the process described above, editing of an image compressed in accordance with the variable bit rate method can be performed by decoding and re-encoding only of part of the image in the proximity of an editing point.

Further, when an image compressed in accordance with the variable bit rate method is edited, since a transition state of the buffer occupation amount of the virtual buffer in the proximity of a splicing point between the re-encoding interval and another interval for which re-encoding is not performed is examined so that the code amount to be allocated to pictures in the re-encoding interval can be increased, the control is facilitated and deterioration of the picture quality can be prevented to obtain an edited image of high picture quality.

It is to be noted that, also in the process described hereinabove with reference to the flow charts of FIGS. 37 and 38, the decoding range may be determined separately from the re-encoding range based on the re-encoding range. In particular, the decoding range may be considered as a range same as the re-encoding range or a greater range including the re-encoding range.

As described above, a process of splicing first compressed image data and second compressed image data with each other at an editing point to edit them can be controlled, and particularly in the case of compressed image data of a VBR having no time information, the buffer occupation amounts at a start point and an end point of a re-encoding range of the first compressed image data and the second compressed image data decoded and spliced with each other at the editing point can be set so that the degree of freedom of the generation code amount to be allocated to the re-encoding range is increased.

The series of processes described above can be executed also by software. Where the series of processes is executed by software, a program which constructs the software is installed from a recording medium into a computer incorporated in hardware for exclusive use or, for example, a personal computer for universal use which can execute various functions by installing various programs. In this instance, for example, the editing apparatus 1 described hereinabove with reference to FIG. 4 or the editing apparatus 401 described hereinabove with reference to FIG. 24 is formed from such a personal computer 701 as shown in FIG. 39.

Figure 39:
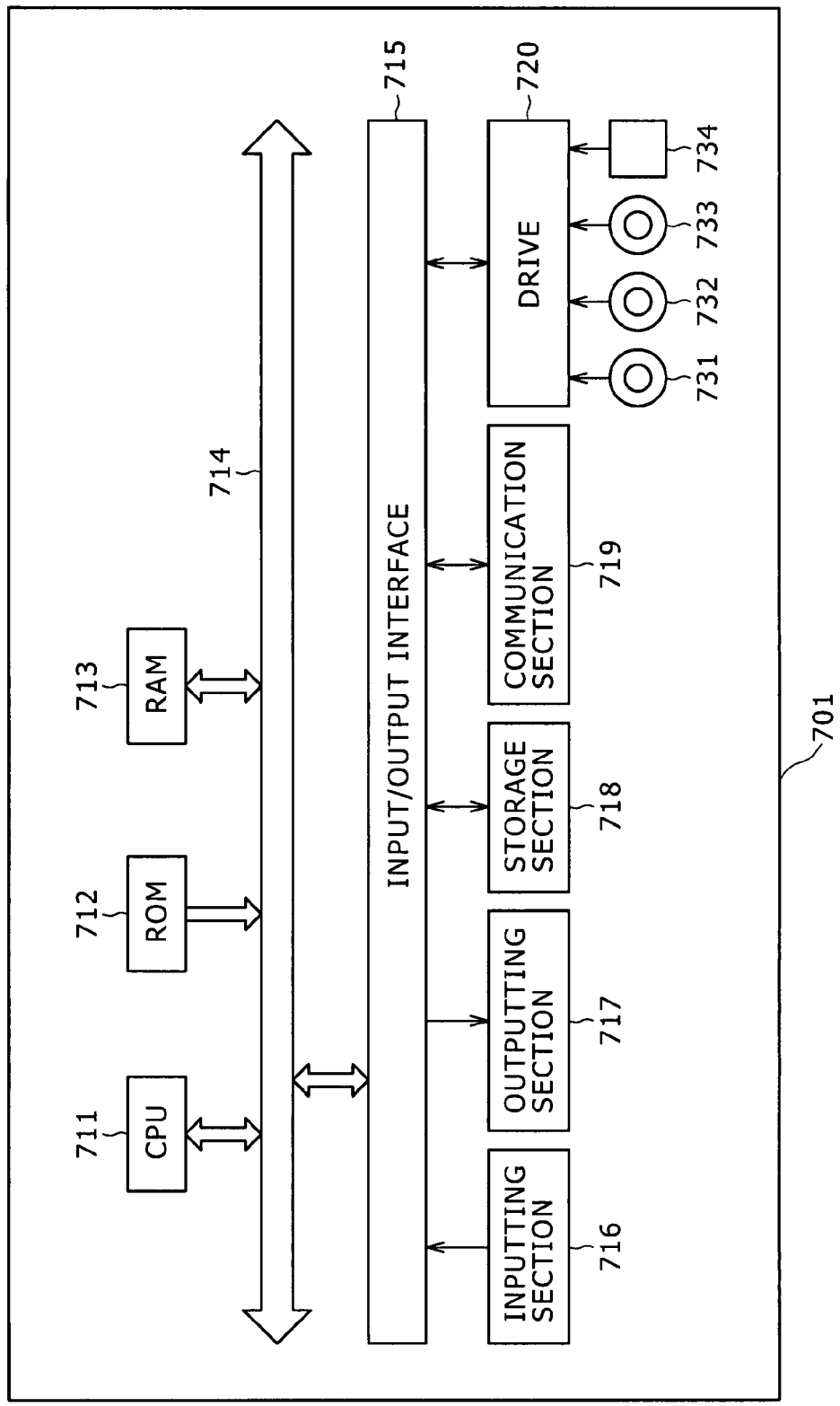
FIG. 39 is a block diagram showing a configuration of a personal computer.

Referring to FIG. 39, a CPU (Central Processing Unit) 711 executes various processes in accordance with a program stored in a ROM (Read Only Memory) 712 or a program loaded from a storage section 718 into a RAM (Random Access Memory) 713. Also data necessary for the CPU 711 to execute the various processes are suitably stored into the RAM 713.

The CPU 711, ROM 712 and RAM 713 are connected to one another by a bus 714. Also an input/output interface 715 is connected to the bus 714.

An inputting section 716 including a keyboard, a mouse and so forth, an outputting section 717 including a display unit, a speaker and so forth, a storage section 718 formed from a hard disk or the like, a communication section 719 including a modem and a terminal adapter are connected to the input/output interface 715. The communication section 719 performs a communication process through a network including the Internet.

Further, as occasion demands, a drive 720 is connected to the input/output interface 715. A magnetic disk 731, an optical disk 732, a magneto-optical disk 733, a semiconductor memory 734 or the like is suitably loaded into the drive 720, and a computer program read from the loaded medium is installed into the storage section 718 as occasion demands.

Where the series of processes is executed by software, a program which constructs the software is installed from a network or a recording medium into a computer incorporated in hardware for exclusive use or, for example, a personal computer for universal use which can execute various functions by installing various programs.

The recording medium is formed as a package medium such as, as shown in FIG. 39, a magnetic disc 731 (including a floppy disc), an optical disc 732 (including a CD-ROM (Compact Disc-Read Only Memory) and a DVD (Digital Versatile Disk)), or a magneto-optical disc 733 (including an MD (Mini Disc) (trademark)), or a semiconductor memory 734 which has the program recorded thereon or therein and is distributed to provide the program to a user separately from an apparatus body. Else, the recording medium is formed as a ROM 712, a hard disk included in the storage section 718 or the like in which the program is stored and which is supplied to a user in a state wherein the program is incorporated in an apparatus body.

Further, in the present specification, the steps which describe the program recorded in a recording medium may be but need not necessarily be processed in a time series in the order as described, and include processes which are executed in parallel or individually without being processed in a time series.

It is to be noted that, while it is described in the foregoing description of the embodiments that the editing apparatus 1 or the editing apparatus 401 includes a decoder and an encoder, the present invention can be applied also where the decoder and the encoder are formed as apparatus independent of each other. For example, as shown in FIG. 40, a decoding apparatus 771 which decodes stream data into a base band signal and an encoding apparatus 772 which encodes the base band signal into stream data are formed as apparatus independent of each other.

At this time, the decoding apparatus 771 decodes compressed encoded data of an image material and supplies the decoded data to the encoding apparatus 772. Further, the decoding apparatus 771 can receive supply of compression encoded data produced by editing after partial encoding of the decoded data supplied thereto by the encoding apparatus 772 to which the present invention is applied and perform a decoding process to convert the received compressed encoded data into a base band signal. A stream after editing converted into the base band signal is, for example, supplied to and displayed on a predetermined display apparatus or is outputted to some other apparatus, by which a necessary process is applied to the stream.

Further, the present invention can be applied also where, in the embodiments described above, the decoders 22 to 24 do not fully decode compression encoded data supplied thereto and the corresponding encoder 27 partly encodes a corresponding portion of the data decoded but not fully.

For example, where the decoders 22 to 24 perform only decoding and dequantization for VLC codes but do not execute inverse DCT transform, the encoder 27 performs quantization and variable length encoding processes but does not perform a DCT transform process. The present invention can naturally be applied also to an encoder which performs such partial encoding (encoding from an intermediate stage).

Further, the present invention can be applied also where, in the embodiments described hereinabove, base band signals fully decoded by the decoders 22 to 24 are encoded to an intermediate stage by the encoder 27 (for example, in a case wherein, although DCT transform and quantization are performed, a variable length encoding process is not performed) or, because the decoders 22 to 24 do not perform full decoding (for example, perform only decoding and dequantization for VLC codes but do not execute inverse DCT transform), the encoder 27 encodes the data encoded to an intermediate stage further to another intermediate stage (for example, performs quantization but does not perform a variable length encoding process).

Further, the present invention can be applied also where the decoding apparatus 771 shown in FIG. 40 does not fully decode stream data supplied thereto and the corresponding encoding apparatus 772 partly encodes the corresponding portion of the data decoded but not fully.

For example, where the decoding apparatus 771 performs only decoding and dequantization for VLC codes but does not execute inverse DCT transform, the encoding apparatus 772 performs quantization and variable length encoding processes but does not perform a DCT conversion process. The present invention can naturally be applied to the decoding process of the decoding apparatus 771 which performs such a partial decoding process as just described (decoding to an intermediate stage) and the encoding process of the encoding apparatus 772 which performs such partial encoding (encoding from the intermediate stage).

Further, the present invention can be applied also to a case wherein the encoding apparatus 772 encodes a base band signal fully decoded by the decoding apparatus 771 to an intermediate stage (for example, performs DCT conversion and quantization but does not perform a variable length encoding process) or another case wherein, since the decoding apparatus 771 does not fully decode (for example, performs only decoding and dequantization for VLC codes but does not execute inverse DCT transform), the encoding apparatus 772 encodes the data encoded to an intermediate stage further to a different intermediate stage (for example, performs quantization but does not perform a variable length encoding process).

Furthermore, the present invention can be applied to a transcoder 781 which includes an encoding apparatus 451 which performs such partial decoding as described above (executes some of the steps of the decoding process) and an encoding apparatus 772 which performs partial encoding (executes some of the steps of the encoding process). Such a transcoder 781 as just described is used in such a case that an editing apparatus 782 which performs editing such as, for example, splicing, that is, an editing apparatus having a function which can be executed by the stream splicer 25 or the effect/switch 26 of the editing apparatus 1 or the editing apparatus 401 described hereinabove, is utilized.

Further, while the CPU 11 and the CPU 20 in the embodiments described hereinabove are formed in separate forms from each other, the form is not limited to this, but also another form wherein the CPU 11 and the CPU 20 are formed as an single CPU which controls the entire editing apparatus 1 or editing apparatus 401 is possible. Similarly, while the memory 13 and the memory 21 in the embodiments described hereinabove are formed in separate forms from each other, the form is not limited to this, but also another form wherein the memory 13 and the memory 21 are formed as a single memory in the editing apparatus 1 or editing apparatus 401 is possible.

Furthermore; while the HDD 16, decoders 22 to 24, stream splicer 25, effect/switch 26 and encoder 27 in the embodiments described above are connected to each other through bridges and a bus such that they are integrated as an editing apparatus, the present invention is not limited to this, but, for example, some of the components mentioned may be connected by a wire or by radio from the outside or the components may otherwise be connected to each other in various other connection schemes.

Further, while, in the embodiments described above, compressed materials for editing are stored in a HDD, the present invention is not limited to this but can be applied also where an editing process is performed using materials for editing recorded in or on various recording media such as, for example, an optical disk, a magneto-optical disk, a semiconductor memory and a magnetic disk.

Further, while, in the embodiments described hereinabove, the decoders 22 to 24, stream splicer 25, effect/switch 26 and encoder 27 are incorporated in the same extension card (for example, a PCI card or a PCI-Express card), the form of incorporation is not limited to this, but where the transfer rate between cards is high thanks to a technique such as, for example, the PCI-Express, the components may be incorporated in separate extension cards from each other.

The present invention can be applied not only to an information processing apparatus according to the MPEG system but also information processing apparatus of any other type which have a similar encoding or decoding algorithm.

It is to be noted that embodiments of the present invention are not limited to the embodiments described hereinabove but can be modified without departing from the spirit or scope of the following claims.

The invention claimed is:

1. An information processing apparatus for executing a process of splicing first compressed image data with second compressed image data, the apparatus comprising:
    a decoding device configured to perform a decoding process for a first decoding interval including a first editing point set to the first compressed image data to produce a first non-compressed image signal and performing a decoding process for a second decoding interval including a second editing point set to the second compressed image data to produce a second non-compressed image signal;
    a re-encoding device configured to perform a re-encoding process for a predetermined re-encoding interval of a third non-compressed image signal wherein the first and second non-compressed image signals are spliced at the first and second editing points to produce third compressed image data;
    a control device configured to set the re-encoding interval extended from a basic encoding interval based on a generation code amount upon the re-encoding process by said re-encoding device to control the re-encoding process by said re-encoding device; and
    an editing device configured to alternatively output compressed image data in an interval for which the re-encoding process is not performed from within the first and second compressed image data and the third compressed image data produced by the re-encoding by said re-encoding device to produce edited editing compressed image data,
    wherein said control device controls allocation of a generation code amount in the re-encoding process in the re-encoding interval by said re-encoding device, and sets, where a generation code amount to be allocated to the basic encoding interval from within the re-encoding interval is smaller than a predetermined amount, the re-encoding interval extended from the basic encoding interval to control the re-encoding process by said re-encoding device.

2. The information processing apparatus according to claim 1, wherein said control device controls the allocation of the generation code amount in the re-encoding process in the re-encoding interval by said re-encoding device so that the generation code amount to be allocated to the basic encoding interval becomes greater than the predetermined amount.

3. The information processing apparatus according to claim 2, wherein said control device controls the allocation of the generation code amount in the re-encoding interval based on a difference value in occupancy between a start point and an end point of the re-encoding interval so that the code amount to be allocated to the reference encoding range is increased.

4. The information processing apparatus according to claim 2, wherein said control device controls the allocation of the generation code amount in the re-encoding interval based on a value which increases in proportion to the number of pictures in the reference encoding interval but increases substantially in inverse proportion to the number of pictures in the re-encoding interval so that the code amount to be allocated to the reference encoding range is increased.

5. The information processing apparatus according to claim 2, wherein, where an effect is to be performed for the reference encoding range, said control device controls the allocation of the generation code amount in the re-encoding process in the re-encoding interval by said re-encoding device in response to a type of the effect to be performed for the reference encoding range so that the generation code amount in the reference encoding range is increased.

6. The information processing apparatus according to claim 2, wherein said control device controls the allocation of the generation code amount in the re-encoding process of the re-encoding interval by said re-encoding device based on a rate of rise of a degree of difficulty in encoding of the reference encoding range so that the generation code amount in the reference encoding range is increased.

7. The information processing apparatus according to claim 1, wherein said control device controls the allocation of the generation code amount in the re-encoding interval so that the generation code amount to be allocated to any interval other than the reference encoding interval from within the re-encoding interval is decreased.

8. The information processing apparatus according to claim 1, wherein, where an effect is to be performed for the reference encoding range, said control device sets the re-encoding interval extended from the basic encoding range in response to a type of the effect to be performed for the reference encoding interval to control the re-encoding process by said re-encoding device.

9. The information processing apparatus according to claim 1, wherein said control device sets the re-encoding interval extended from the basic encoding interval based on a rate of rise of a degree of difficulty in encoding of the reference encoding range to control the re-encoding process by said re-encoding device.

10. The information processing apparatus according to claim 1, wherein said control device acquires information regarding the occupancy of the first and second compressed image data and controls the allocation of the generation code amount in the re-encoding process in the re-encoding interval by said re-encoding device based on the information regarding the occupancy.

11. The information processing apparatus according to claim 10, wherein the information regarding the occupancy is information regarding the occupancy of pictures corresponding to top and end positions of the re-encoding interval.

12. The information processing apparatus according to claim 10, wherein the information regarding the occupancy is multiplexed in a user data region of the first and second compressed image data, and said control device acquires the information regarding the occupancy multiplexed in the user data region of the first and second compressed image data.

13. The information processing apparatus according to claim 12, wherein said control device acquires information with which an apparatus which has encoded pictures corresponding to top and end positions of the re-encoding interval from within the first and second compressed image data in the past can be specified, and detects a position at which the information regarding the occupancy is described using the acquired information with which the apparatus is specified.

14. The information processing apparatus according to claim 12, wherein said control device acquires information indicative of a picture type of pictures corresponding to top and end positions of the re-encoding interval from within the first and second compressed image data, and detects a position at which the information regarding the occupancy is described using the acquired information indicative of the picture type.

15. The information processing apparatus according to claim 14, wherein said control device decides whether or not the first and second compressed image data are format converted and acquires, where it is decided that the first and second compressed image data are format converted, information indicative of a picture type of pictures corresponding to top and end positions of the re-encoding interval and then detects a position at which the information regarding the occupancy is described using the acquired information indicative of the picture types.

16. The information processing apparatus according to claim 10, wherein the information regarding the occupancy is recorded in an associated relationship with the first and second compressed image data on a predetermined recording medium, and said control device acquires the information regarding the occupancy from the recording medium.

17. The information processing apparatus according to claim 1, further comprising:
an acquisition device configured to acquire a code amount of the first compressed image data in the proximity of a start point of the re-encoding range and the second compressed image data in the proximity of an end point of the first range;
an analysis device configured to analyze, based on the code amounts acquired by said acquisition device, a first locus of a virtual buffer occupation amount where it is assumed that an occupation amount of a virtual buffer at the start point reaches a lower limit value when the re-encoding process is performed for the first compressed image data in the proximity of the start point and analyzing a second locus of the virtual buffer occupation amount where it is assumed that the occupation amount of the virtual buffer at a picture next to the end point reaches an upper limit value when the re-encoding process is performed for the second compressed image data in the proximity of the end point; and
a determination device configured to determine, based on the first and second loci analyzed by said analysis device, the upper limit value to the occupation amount of the virtual buffer at the start point and the lower limit value to the occupation amount of the virtual buffer at the end point when the first range is re-encoded.

18. The information processing apparatus according to claim 17, wherein said determination device determines an occupation amount of the virtual buffer at the end point in a third locus obtained by correcting the second locus in a direction in which the occupation amount of the virtual buffer decreases by a code amount determined from a period of time in which the occupation amount of the virtual buffer reaches a maximum value in a region which is not included in the re-encoding range from within the second locus and an integrated value of maximum bit rates as a lower limit value to the occupation amount of the virtual buffer at the end point when the re-encoding process is performed for the re-encoding range.

19. An information processing apparatus for executing a process of splicing first compressed image data with second compressed image data, the apparatus comprising:
    a decoding device configured to perform a decoding process for a first decoding interval including a first editing point set to the first compressed image data to produce a first non-compressed image signal and performing a decoding process for a second decoding interval including a second editing point set to the second compressed image data to produce a second non-compressed image signal;
    a re-encoding device configured to perform a re-encoding process for a predetermined re-encoding interval of a third non-compressed image signal wherein the first and second non-compressed image signals are spliced at the first and second editing points to produce third compressed image data;
    a control device configured to set the re-encoding interval extended from a basic encoding interval based on a generation code amount upon the re-encoding process by said re-encoding device to control the re-encoding process by said re-encoding device;
    an editing device configured to alternatively output compressed image data in an interval for which the re-encoding process is not performed from within the first and second compressed image data and the third compressed image data produced by the re-encoding by said re-encoding device to produce edited editing compressed image data;
    an acquisition device configured to acquire a code amount of the first compressed image data in the proximity of a start point of the re-encoding range and the second compressed image data in the proximity of an end point of the first range;
    an analysis device configured to analyze, based on the code amounts acquired by said acquisition device, a first locus of a virtual buffer occupation amount where it is assumed that an occupation amount of a virtual buffer at the start point reaches a lower limit value when the re-encoding process is performed for the first compressed image data in the proximity of the start point and analyzing a second locus of the virtual buffer occupation amount where it is assumed that the occupation amount of the virtual buffer at a picture next to the end point reaches an upper limit value when the re-encoding process is performed for the second compressed image data in the proximity of the end point; and
    a determination device configured to determine, based on the first and second loci analyzed by said analysis device, the upper limit value to the occupation amount of the virtual buffer at the start point and the lower limit value to the occupation amount of the virtual buffer at the end point when the first range is re-encoded,
    wherein said determination device determines an occupation amount of the virtual buffer at the start point in a third locus obtained by correcting the first locus in a direction in which the occupation amount of the virtual buffer increases by a code amount of a maximum underflow in a region which is not included in the re-encoding range from within the first locus as an upper limit value to the occupation amount of the virtual buffer at the start point when the re-encoding process is performed for the re-encoding range.

20. An information processing method for an information processing apparatus which executes a process of splicing first compressed image data with second compressed image data, the method comprising:
    a re-encoding interval setting step of setting a re-encoding interval extended from a basic encoding interval based on a generation code amount upon a re-encoding process;
    a decoding step of performing a decoding process for a first decoding interval including a first editing point set to the first compressed image data to produce a first non-compressed image signal and performing a decoding process for a second decoding interval including a second editing point set to the second compressed image data to produce a second non-compressed image signal;
    a re-encoding step of performing a re-encoding process for the re-encoding interval set by the process at the re-encoding interval setting step in a third non-compressed image signal wherein the first and second non-compressed image signals are spliced at the first and second editing points to produce a third compressed image data; and
    an editing step of alternatively outputting compressed image data in an interval for which the re-encoding process is not performed from within the first and second compressed image data and the third compressed image data produced by the re-encoding process through the process at the re-encoding step to produce edited editing compressed image data,
    allocating of the generation code amount in the re-encoding process in the re-encoding interval is controlled and set, where a generation code amount to be allocated to the basic encoding interval from within the re-encoding interval is smaller than a predetermined amount, the re-encoding interval extended from the basic encoding interval to control the re-encoding process by said re-encoding step.

21. A non-transitory computer-readable storage medium having stored thereon a program for causing a computer to execute a process of splicing first compressed image data with second compressed image data, the process comprising:
    a re-encoding interval setting step of setting a re-encoding interval extended from a basic encoding interval based on a generation code amount upon a re-encoding process;
    a decoding step of performing a decoding process for a first decoding interval including a first editing point set to the first compressed image data to produce a first non-compressed image signal and performing a decoding process for a second decoding interval including a second editing point set to the second compressed image data to produce a second non-compressed image signal;
    a re-encoding step of performing a re-encoding process for the re-encoding interval set by the process at the re-encoding interval setting step in a third non-compressed image signal wherein the first and second non-compressed image signals are spliced at the first and second editing points to produce a third compressed image data; and an editing step of alternatively outputting compressed image data in an interval for which the re-encoding process is not performed from within the first and second compressed image data and the third compressed image data produced through the re-encoding process by the process at the re-encoding step to produce edited editing compressed image data, allocating of the generation code amount in the re-encoding process in the re-encoding interval is controlled and set, where a generation code amount to be allocated to the basic encoding interval from within the re-encoding interval is smaller than a predetermined amount, the re-encoding interval extended from the basic encoding interval to control the re-encoding process by said re-encoding step.

22. An information processing apparatus for executing a process of splicing and re-encoding first compressed image data with second compressed image data, the apparatus comprising:

decoding device configured to perform a decoding process for a first decoding interval including a first editing point set to the first compressed image data to produce a first non-compressed image signal and performing a decoding process for a second decoding interval including a second editing point set to the second compressed image data to produce a second non-compressed image signal;

re-encoding device configured to perform a re-encoding process for a predetermined re-encoding interval of a third non-compressed image signal wherein the first and second non-compressed image signals are spliced at the first and second editing points to produce third compressed image data; and control device configured to set the re-encoding interval extended from a basic encoding interval based on a generation code amount upon the re-encoding process by said re-encoding device to control the re-encoding process by said re-encoding device, wherein said control device controls allocation of a generation code amount in the re-encoding process in the re-encoding interval by said re-encoding device, and sets, where a generation code amount to be allocated to the basic encoding interval from within the re-encoding interval is smaller than a predetermined amount, the re-encoding interval extended from the basic encoding interval to control the re-encoding process by said re-encoding device.

23. An information processing method for an information processing apparatus which executes a process of splicing and re-encoding first compressed image data and second compressed image data, the method comprising:

a re-encoding interval setting step of setting a re-encoding interval extended from a basic encoding interval based on a generation code amount upon the re-encoding process;

a decoding step of performing a decoding process for a first decoding interval including a first editing point set to the first compressed image data to produce a first non-compressed image signal and performing a decoding process for a second decoding interval including a second editing point set to the second compressed image data to produce a second non-compressed image signal; and a re-encoding step of performing the re-encoding process for the re-encoding interval set by the process at the re-encoding interval setting step in a third non-compressed image signal wherein the first and second non-compressed image signals are spliced at the first and second editing points to produce a third compressed image data, allocating of the generation code amount in the re-encoding process in the re-encoding interval is controlled and set, where a generation code amount to be allocated to the basic encoding interval from within the re-encoding interval is smaller than a predetermined amount, the re-encoding interval extended from the basic encoding interval to control the re-encoding process by said re-encoding step.

24. A non-transitory computer-readable storage medium having stored thereon a program for causing a computer to execute a process of splicing and re-encoding first compressed image data and second compressed image data, the process comprising:

a re-encoding interval setting step of setting a re-encoding interval extended from a basic encoding interval based on a generation code amount upon the re-encoding process;

a decoding step of performing a decoding process for a first decoding interval including a first editing point set to the first compressed image data to produce a first non-compressed image signal and performing a decoding process for a second decoding interval including a second editing point set to the second compressed image data to produce a second non-compressed image signal; and a re-encoding step of performing the re-encoding process for the re-encoding interval set by the process at the re-encoding interval setting step in a third non-compressed image signal wherein the first and second non-compressed image signals are spliced at the first and second editing points to produce a third compressed image data, allocating of the generation code amount in the re-encoding process in the re-encoding interval is controlled and set, where a generation code amount to be allocated to the basic encoding interval from within the re-encoding interval is smaller than a predetermined amount, the re-encoding interval extended from the basic encoding interval to control the re-encoding process by said re-encoding step.

* * * * *